United States Patent
Tsunashima et al.

(10) Patent No.: US 7,627,232 B2
(45) Date of Patent: Dec. 1, 2009

(54) REPRODUCTION APPARATUS, DATA PROCESSING SYSTEM, REPRODUCTION METHOD, PROGRAM, AND STORAGE MEDIUM

(75) Inventors: Shuji Tsunashima, Tokyo (JP); Shojiro Shibata, Kanagawa (JP); Mototsugu Takamura, Kanagawa (JP); Kyohei Koyabu, Kanagawa (JP); Shinjiro Kakita, Kanagawa (JP)

(73) Assignee: Sony Corporation, Tokyo (JP)

( * ) Notice: Subject to any disclaimer, the term of this patent is extended or adjusted under 35 U.S.C. 154(b) by 766 days.

(21) Appl. No.: 11/257,309

(22) Filed: Oct. 25, 2005

(65) Prior Publication Data

US 2006/0088295 A1   Apr. 27, 2006

(30) Foreign Application Priority Data

Oct. 26, 2004   (JP) .............................. 2004-311597
Aug. 24, 2005   (JP) .............................. 2005-243293

(51) Int. Cl.
*H04N 7/26* (2006.01)
*H04N 5/91* (2006.01)
*H04N 7/12* (2006.01)
*H04N 7/16* (2006.01)
*H04N 7/173* (2006.01)

(52) U.S. Cl. .......................... 386/111; 386/68; 386/95; 386/112; 348/390.1; 375/240.13; 375/240.15; 375/240.23; 375/240.25; 375/240.26; 725/134; 725/142

(58) Field of Classification Search ................ 386/111, 386/112, E5.052, E9.013, E9.015, E9.052, 386/68, 95; 348/390.1; 375/240.13, 240.15, 375/240.23, 240.25, 240.26, E7.093, E7.094, 375/E7.144, E7.15, E7.151, E7.163, E7.169, 375/E7.179, E7.211, E7.222; 725/134, 142

See application file for complete search history.

(56) References Cited

U.S. PATENT DOCUMENTS

| 5,510,840 | A * | 4/1996 | Yonemitsu et al. ...... 375/240.15 |
| 5,699,117 | A * | 12/1997 | Uramoto et al. .......... 348/390.1 |
| 7,245,821 | B2 * | 7/2007 | Okada ......................... 386/68 |
| 2002/0092030 | A1 * | 7/2002 | Gu .............................. 725/134 |
| 2003/0099293 | A1 * | 5/2003 | Okada et al. ........... 375/240.13 |

FOREIGN PATENT DOCUMENTS

| JP | 9-327020 | 12/1997 |
| JP | 11-205739 | 7/1999 |
| JP | 11-313283 | 11/1999 |
| JP | 2000-83215 | 3/2000 |
| JP | 2002-218396 | 8/2002 |
| JP | 2003-199042 | 7/2003 |
| JP | 2004-208319 | 7/2004 |

* cited by examiner

*Primary Examiner*—Thai Tran
*Assistant Examiner*—Syed Y Hasan
(74) *Attorney, Agent, or Firm*—Oblon, Spivak, McClelland, Maier & Neustadt, L.L.P.

(57) ABSTRACT

A reproduction apparatus for successively decoding and reproducing a plurality of picture data, comprising a reproduction memory and a decoder for successively decoding the plurality of picture data in an order in accordance with a designated reproduction direction, writing the decoding results in the reproduction memory, and reproducing and outputting the decoding results read from the reproduction memory, the decoder holding the storage of the decoding results in the reproduction memory even after the decoding results stored in the reproduction memory are no longer used when continuing reproduction in the designated reproduction direction and, when receiving as input a reversal command of the reproduction direction, performing the reproduction and output using the decoding results already stored in the reproduction memory before the input of the reversal command.

18 Claims, 49 Drawing Sheets

FIG. 33

```
struct PicDat {
    int cur_p;      // CURRENT BANK PPOINTER
    int fore_p;     // FORE PREDICTED PICTURE BANK POINTER
    int back_p;     // BACK PREDICTED PICTURE BANK POINTER
    int gop_no;     // GOP NUMBER
    int time;       // TIME FOR STARTING REPRODUCTION
    char valid;     // SET REPRODUCTION VALID/INVALID
}
```

PICTURE PROPERTY DATA PP

FIG. 47
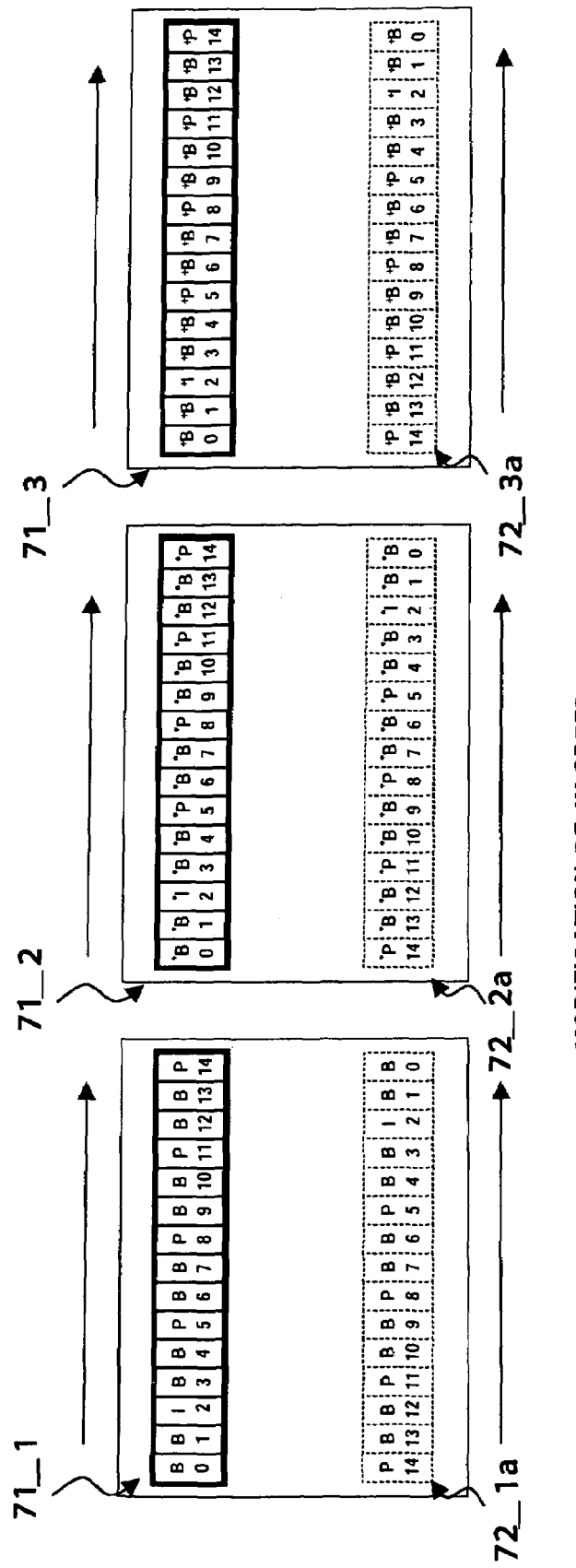
MODIFICATION OF 1X SPEED
 PICTURE PROPERTY DATA INDICATING VALID IN BUFFER IN SELECTION

REPRODUCTION APPARATUS, DATA PROCESSING SYSTEM, REPRODUCTION METHOD, PROGRAM, AND STORAGE MEDIUM

CROSS REFERENCES TO RELATED APPLICATIONS

The present invention contains subject matter related to Japanese Patent Application No. 2004-311597 filed in the Japan Patent Office on Oct. 26, 2004, and Japanese Patent Application No. 2005-243293 filed in the Japan Patent Office on Aug. 24, 2005, entire contents of which being incorporated herein by reference.

BACKGROUND OF THE INVENTION

1. Field of the Invention

The present invention relates to a reproduction apparatus, data processing system, reproduction method, program, and storage medium for reproducing reproduced data.

2. Description of the Related Art

For example, there is a reproduction apparatus decoding and reproducing reproduced data encoded by the MPEG (Moving Picture Experts Group) scheme. This reproduction apparatus, for example, decodes I, P, and B picture data forming the reproduced data in an order corresponding to the reference relationship of the picture data and the reproduction direction and outputs the decoding results in the order of display in accordance with the reproduction direction for reproduction and output. In this reproduction apparatus, for example, when receiving a reversal command for reversing the reproduction direction, the decoding results generated up to then are all cleared, decoding is started in the order in accordance with the reversed reproduction direction, and those decoding results are reproduced and output in a display order in accordance with the reversed reproduction direction. For reference, see Japanese Patent Publication (A) No. 2003-101967.

However, in this reproduction apparatus of the related art, since the decoding results generated up to receiving the reversal command are all cleared and picture data is decoded in accordance with the reversed reproduction direction immediately after reversal of the reproduction direction, a long time is taken from when receiving the reversal command to when obtaining the reproduction and output after reversal, therefore there is the disadvantage that the response is poor.

SUMMARY OF THE INVENTION

An object of the present invention is to provide a reproduction apparatus, data processing system, reproduction method, program, and storage medium able to shorten, compared with the related art, the time from when receiving a command for reversal of the reproduction direction to when obtaining reproduction and output after reversal when successively decoding and reproducing a plurality of picture data.

According to a first aspect of the invention, there is provided a reproduction apparatus for successively decoding and reproducing a plurality of picture data, comprising a reproduction memory and a decoder for successively decoding the plurality of picture data in an order in accordance with a designated reproduction direction, writing the decoding results in the reproduction memory, and reproducing and outputting the decoding results read from the reproduction memory, the decoder holding the storage of the decoding results in the reproduction memory even after the decoding results stored in the reproduction memory are no longer used when continuing reproduction in the designated reproduction direction and, when receiving as input a reversal command of the reproduction direction, performing the reproduction and output using the decoding results already stored in the reproduction memory before the input of the reversal command.

The mode of operation of the first aspect of the present invention is as follows: The decoder successively decodes a plurality of picture data in an order in accordance with a designated reproduction direction, writes the decoding results in the reproduction memory, and reproduces and outputs the decoding results read from the reproduction memory. At this time, the decoder holds the storage of the decoding results in the reproduction memory even after the decoding results stored in the reproduction memory are no longer used when continuing reproduction in the designated reproduction direction. When receiving as input a reversal command of the reproduction direction, the decoder performs the reproduction and output using the decoding results already stored in the reproduction memory before the input of the reversal command.

According to a second aspect of the invention, there is provided a data processing system comprising a data processing apparatus for outputting a plurality of picture data forming reproduced data to a reproduction apparatus and a reproduction apparatus for successively and reproducing the plurality of picture data input from the data processing apparatus, the reproduction apparatus comprising a reproduction memory and a decoder for successively decoding the plurality of picture data in order by an order according to a designated reproduction direction, writing the decoding results in the reproduction memory, and reproducing and outputting the decoding results read from the reproduction memory, and the decoder holding the storage of the decoding results in the reproduction memory even after the decoding results stored in the reproduction memory are no longer used when continuing reproduction in the designated reproduction direction and, when receiving as input a reversal command of the reproduction direction, performing the reproduction and output using the decoding results already stored in the reproduction memory before the input of the reversal command.

According to a third aspect of the invention, there is provided a reproduction method successively decoding a plurality of picture data, comprising a first step of successively decoding the plurality of picture data in an order in accordance with a designated reproduction direction and writing the decoding results in a reproduction memory and a second step of reading and reproducing and outputting the decoding results written in the reproduction memory at the first step, the first step making the reproduction memory hold the storage of the decoding results even after the decoding results stored in the reproduction memory are no longer used when continuing reproduction in the designated reproduction direction and the second step performing reproduction and output using the decoding results already stored in the reproduction memory before input of the reversal command when receiving as input the reversal command of the reproduction direction.

According to a fourth aspect of the invention, there is provided a program executed by a reproduction apparatus successively decoding a plurality of picture data, comprising a first routine of successively decoding the plurality of picture data in an order in accordance with a designated reproduction direction and writing the decoding results in a reproduction memory and a second routine of reading and reproducing and outputting the decoding results written in the reproduction memory at the first routine, the first routine making the reproduction memory hold the storage of the decoding results even after the decoding results stored in the reproduction memory are no longer used when continuing reproduction in the designated reproduction direction and the second routine using the decoding results already stored in the reproduction memory before input of a reversal command for reproduction and output when receiving as input the reversal command of the reproduction direction.

According to a fifth aspect of the invention, there is provided a storage medium storing a program executed by a reproduction apparatus successively decoding a plurality of picture data, the program comprising a first routine of successively decoding the plurality of picture data in an order in accordance with a designated reproduction direction and writing the decoding results in a reproduction memory and a second routine of reading and reproducing and outputting the decoding results written in the reproduction memory at the first routine, the first routine making the reproduction memory hold the storage of the decoding results even after the decoding results stored in the reproduction memory are no longer used when continuing reproduction in the designated reproduction direction and the second routine using the decoding results already stored in the reproduction memory before input of a reversal command for reproduction and output when receiving as input the reversal command of the reproduction direction.

According to a sixth aspect of the invention, there is provided a data processing apparatus comprising a data processing means for outputting a plurality of picture data forming reproduced data to a reproduction apparatus and a reproducing means for successively decoding and reproducing the plurality of picture data input from the data processing means, the reproducing means comprising a reproduction memory and a decoder for successively decoding the plurality of picture data in order by an order according to a designated reproduction direction, writing the decoding results in the reproduction memory, and reproducing and outputting the decoding results read from the reproduction memory, and the decoder holding the storage of the decoding results in the reproduction memory even after the decoding results stored in the reproduction memory are no longer used when continuing reproduction in the designated reproduction direction and, when receiving as input a reversal command of the reproduction direction, performing the reproduction and output using the decoding results already stored in the reproduction memory before the input of the reversal command.

According to the present invention, it is possible to provide a reproduction apparatus, data processing system, reproduction method, program, and storage medium able to reduce, compared with the past, the time from which a command for reversal of the reproduction direction is received to when reproduction and output after reversal are obtained in the case of successively decoding a plurality of picture data.

BRIEF DESCRIPTION OF THE DRAWINGS

These and other objects and features of the present invention will become clearer from the following description of the preferred embodiments given with reference to the attached drawings, wherein:

FIG. 33 is a view explaining the format of picture property data in a second embodiment of the present invention;

FIG. 47 is a view for explaining another method of use of a scheduling buffer in the case where a transient command occurs while the reproduction apparatus shown in FIG. 31 is engaged in 1× speed reproduction in the forward direction;

DESCRIPTION OF THE PREFERRED EMBODIMENTS

Below, data processing systems according to embodiments of the present invention will be explained.

First Embodiment

Figure 1:
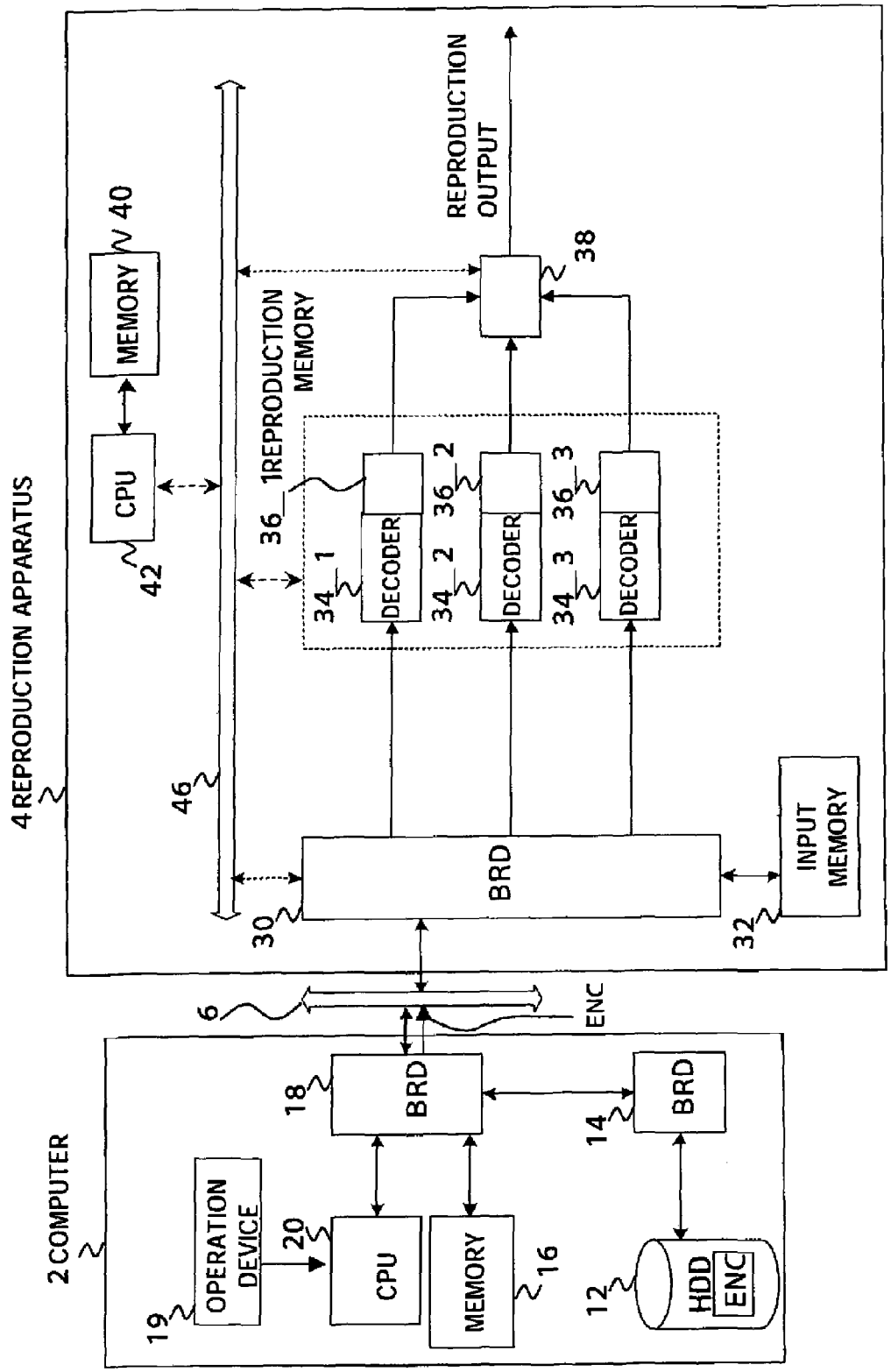
FIG. 1 is a view of the overall configuration of a data processing system according to a first embodiment of the present invention.

FIG. 1 is a view of the overall configuration of a data processing system 1 according to an embodiment of the present invention. As shown in FIG. 1, the data processing system 1, for example, has a computer 2 and a reproduction apparatus 4.

[Computer 2]

Figure 2:
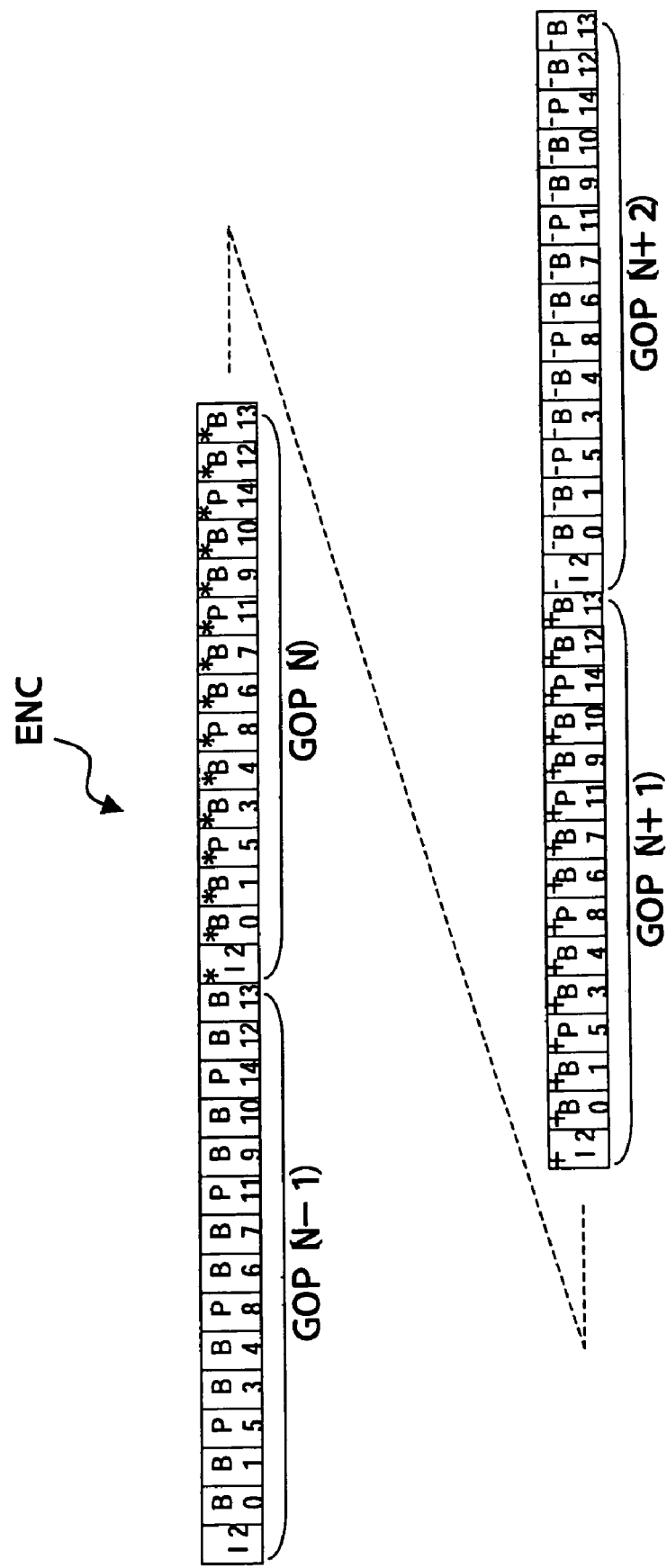
FIG. 2 is a view for explaining reproduced data ENC to be decoded by the data processing system shown in FIG. 1.

As shown in FIG. 1, the computer 2 has an HDD 12, a bridge 14, a memory 16, a bridge 18, an operation device 19, and a CPU 20. The HDD 12 for example stores reproduced data ENC encoded by the MPEG scheme. The reproduced data ENC, as shown in FIG. 2, is comprised of a plurality of GOP (groups of pictures) successively decoded in order at the reproduction apparatus 4. In the example shown in FIG. 2, it is decoded in the order of GOP(N−1), (N), (N+1), (N+2). Each GOP is comprised of I, P, and B, that is, three types' of, picture data (frame data). Further, each GOP includes a single I picture data. In the present embodiment, for example, a so-called "long GOP" with a relatively large number of picture data in the GOP is used. Note that, in the drawings of this application, picture data belonging to the GOP(N−1) is not given any symbol at the top left, picture data belonging to the GOP(N) is given an asterisk at the top left, picture data belonging to the GOP(N+1) is given a "+" mark at the top left, picture data belonging to the GOP(N+2) is given a "−" mark at the top left, picture data belonging to the GOP(N−2) is given a "#" at the top left, and picture data belonging to the GOP(N−3) is given a """ at the top left. Further, in the drawings, the numerals appended to the right or bottom of the "I", "P", and "B" show the order in which the decoding results of the picture data are reproduced and output.

The I picture data is picture data of an intra- (in-frame) encoded image and is decoded independently from other picture data. Further, the P picture data is picture data of the frame predictively encoded in the forward direction and is decoded with reference to the I or P picture data positioned time-wise in the past (previous display order). Note that the "I and P picture data" is also referred to as the "anchor picture data". Further, the B picture data is picture data of the frame predictively encoded in two directions and is decoded while referring to the I or P picture data positioned time-wise in front or in back (display order in front or back). Note that the read rate of the HDD 12 is slower than the maximum reproduction rate of the reproduction apparatus 4.

The bridge 14 provides an expansion function of the bridge 18 and is provided with a PCI expansion slot or IDE (Integrated Drive Electronics) slot etc. The bridge 14 basically has the same functions as the bridge 18, but has a narrower bandwidth than the bridge 18 and has lower speed access devices than the devices connected to the bridge 18 connected to it.

The memory 16 is for example a semiconductor memory and stores the programs and data used for the processing by the CPU 20. The operation device 19 is a keyboard, mouse, or other operating means and outputs an operation signal corresponding to user operations to the CPU 20. The operation device 19 receives an operation for designating a reproduction point of the reproduced data ENC, an operation for issuing a reproduction start command of the designated reproduction point, and a transient command operation in accordance with user operations based on a not shown operation screen and outputs an operation signal showing the same to the CPU 20. The bridge 18 has the bridge 14, memory 16, PCI bus 6, and CPU 20 connected to it and converts data along with transfer through the CPU 20 address bus and data bus.

The CPU 20, for example, executes a program read from the memory 16 to centrally control the operation of the computer 2. When the CPU 20 receives as input an operation signal from the operation device 19 indicating an operation for designating a reproduction point, it reads the GOP including the picture data of the designated reproduction point from the HDD 12 and outputs it through the bridge 18 and PCI bus 6 to the reproduction apparatus 4. Further, when the CPU 20 receives as input an operation signal indicating a reproduction start command operation from the operation device 19, it outputs a reproduction start command designating a reproduction point through the bridge 18 and PCI bus 6 to the reproduction apparatus 4. Further, when the CPU 20 receives as input an operation signal indicating a transient command operation from the operation device 19, it outputs the transient command through the bridge 18 and PCI bus 6 to the reproduction apparatus 4. Further, the CPU 20 outputs GOPs to the reproduction apparatus 4 so that a GOP one position in display order before the GOP including picture data of the reproduction point in the reproduction apparatus 4 in the GOPs in the reproduced data ENC and a GOP one position in display order after it are stored in the input memory 32 of the reproduction apparatus 4.

[Reproduction Apparatus 4]

As shown in FIG. 1, the reproduction apparatus 4, for example, has a PCI bridge 30, an input memory 32, decoders 34_1 to 34_3, reproduction memories 36_1 to 36_3, a selector 38, a control memory 40, a CPU 42, and a control bus 46. Note that the control memory 40 stores a predetermined program (program of the present invention) and the CPU 42 reads and executes that program to perform the following processing. The predetermined program may be stored in a semiconductor memory or other control memory 40 or may be stored on an HDD, optical disk, or other storage medium.

The PCI bridge 30 is provided with a memory for buffering the GOPs and commands input via the PCI bus 6 from the computer 2. Further, the bridge 18 is provided with a dynamic memory access (DMA) transfer function. The input memory 32 is an SDRAM or other semiconductor memory and temporarily stores GOPs input via the PCI bridge 30.

The decoder 34_1, in accordance with the control of the CPU 42, receives as input the reproduced data ENC read from the input memory 32 through the PCI bridge 30, decodes it by the MPEG scheme, and writes the results into the reproduction memory 36_1. Specifically, the decoder 34_1, under the control of the CPU 42, decodes the I picture data read from the input memory 32 without referring to the decoding results of other picture data. Further, the decoder 34_1, under the control of the CPU 42, decodes the P picture data read from the input memory 32 by referring to the decoding results of the I or P picture data positioned time-wise in the past and already having decoding results stored in the respective reproduction memory 36_1.

Figure 3:
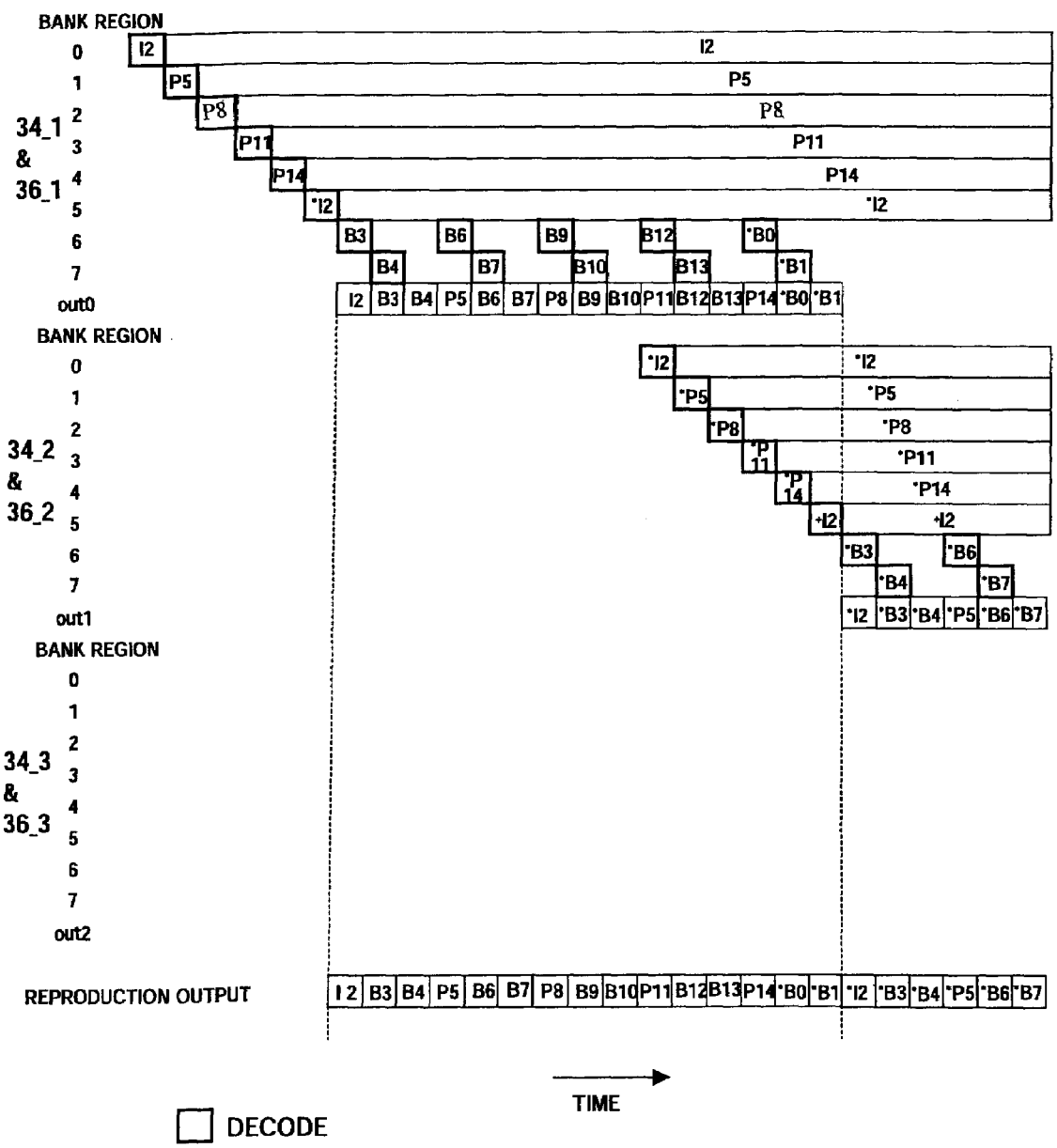
FIG. 3 is a view of decoding by decoders 34_1, 34_2, and 34_3, the storage states of reproduction memories 36_1 to 36_3, and reproduction and output in the case of reproducing reproduced data ENC shown in FIG. 2 in a forward direction.
Figure 4:
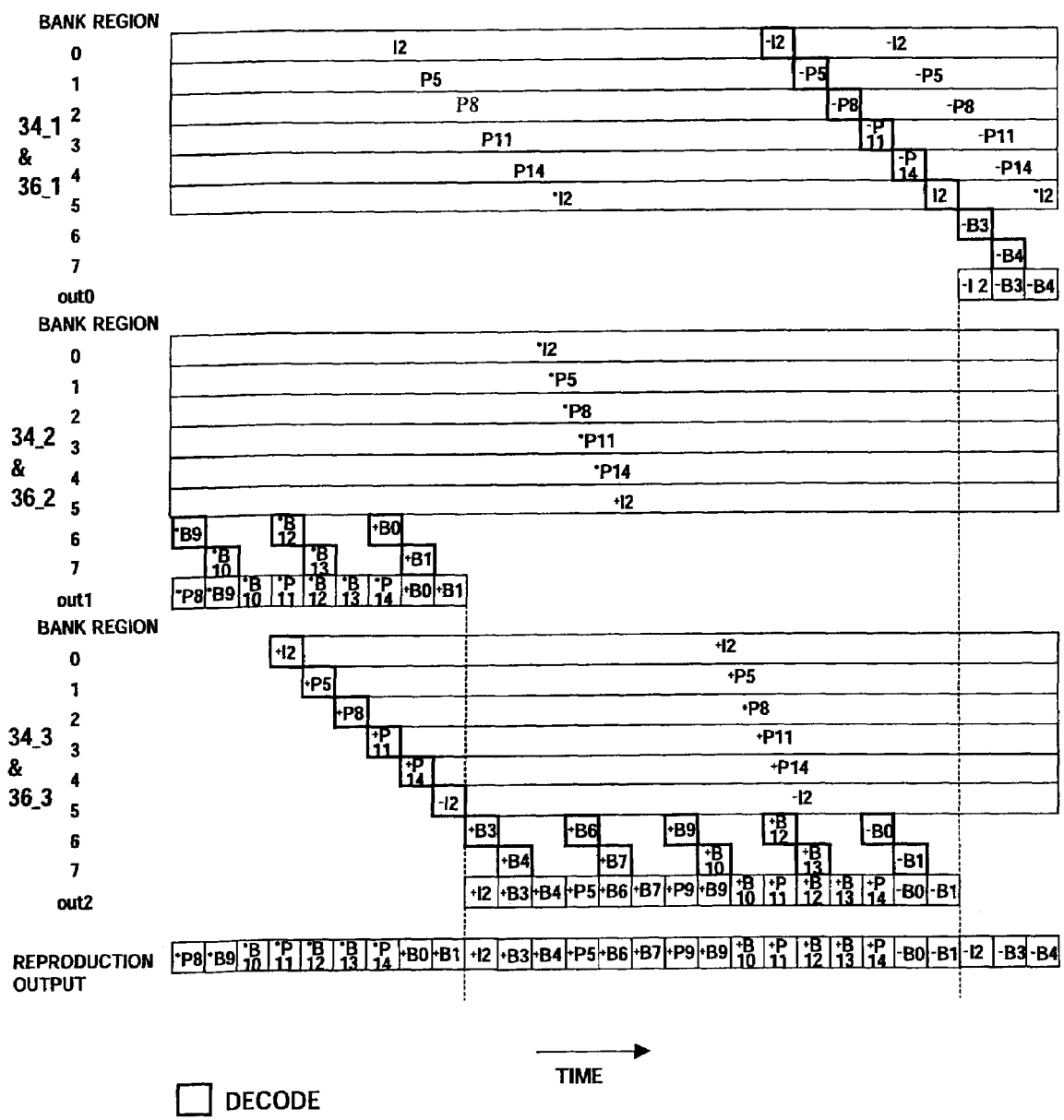
FIG. 4 is a view following FIG. 3 of decoding by decoders 34_1, 34_2, and 34_3, the storage states of reproduction memories 36_1 to 36_3, and reproduction and output in the case of reproducing reproduced data ENC shown in FIG. 2 in a forward direction.

FIG. 3 and FIG. 4 are views showing the decoding by the decoders 34_1, 34_2, and 34_3 when reproducing reproduced data ENC in the forward direction, the states of storage of the reproduction memories 36_1 to 36_3, and the reproduction and output. In FIG. 3, FIG. 4, and the later explained corresponding drawings, the bank regions "0" to "7" shown linked with the decoder 34_1 are bank regions defined in the reproduction memory 36_1, the bank regions "0" to "7" shown linked with the decoder 34_2 are bank regions defined in the reproduction memory 36_2, and the bank regions "0" to "7" shown linked with the decoder 34_3 are bank regions defined in the reproduction memory 36_3. Further, "out0", "out1", and "out2" show decoding results output from the decoders 34_1, 34_2, and 34_3 to the selector 38. Further, the bottommost "reproduction and output" show reproduction and output from the selector 38. Further, in FIG. 3, FIG. 4, and the later explained corresponding drawings, parts shown surrounded by bold lines show the decoding by the decoders 34_1, 34_2, and 34_3.

As shown in FIG. 3 and FIG. 4, the decoder circuit 34_1 holds in the reproduction memory 36_1 the storage of the decoding results of the I and P picture data no longer used for reproduction and output in the case of continuing reproduction in the reproduction direction designated from the CPU 42 in accordance with a decode command from the CPU 42. For example, the decoder 34_1 holds the decoding results of I2, P5, P8, P11, P14, *I2 even after finishing the reproduction and output of the GOP(N−1). Due to this, as explained below, when a transient command occurs, it can perform reproduction and output right after the transient by using the decoding results held in storage in the reproduction memory 36_1 without decoding it again. That is, when a transient command occurs, the decoder 34_1 can use the decoding results of the I and P picture data already stored in the reproduction memory 36_1 before the transient command is issued for the reproduction and output. Specifically, for the I and P picture data, the decoder 34_1 reads and reproduces and outputs the decoding results of the I and P picture data already stored in the reproduction memory 36_1 after a transient command in accordance with a display command from the CPU 42. Further, for the B picture data, the decoder 34_1 performs decoding referring to the decoding results of the I and P picture data forming anchor picture data of that B picture data already stored in the reproduction memory 36_1 after a transient command in accordance with a decode command from the CPU 42 and reproduces and outputs the decoding results in accordance with a display command from the CPU 42.

Further, the decoder 34_1, as shown in FIG. 3, decodes the I and P picture data in the GOP being decoded before the B picture data in accordance with a decode command from the CPU 42 and writes the decoding results in the reproduction memory 36_1.

The decoders 34_2 and 34_3 have the same configurations as the decoder 34_1. They decode the image data input via the PCI bridge 30 by the MPEG scheme and write the results in their respective reproduction memories 36_2 and 36_3.

Below, the method of writing the decoding results in the reproduction memories 36_1, 36_2, and 36_3 by the decoders 34_1, 34_2, and 34_3 will be explained. As shown in FIG. 3 and FIG. 4, each of the reproduction memories 36_1, 36_2, and 36_3 has eight bank regions "0" to "7". In this embodiment, as shown in FIG. 3 and FIG. 4, among the eight bank regions provided at each of the reproduction memories 36_1, 36_2, and 36_3, the six bank regions "0" to "5" are used fixed as storage regions for exclusively storing the decoding results of the I and P picture data and the two bank regions "6" and "7" are used fixed as storage regions for storing the decoding results of the B picture data. That is, the reproduction memories 36_1 to 36_3 simultaneously store the decoding results of all of the I and P picture data decoded at the respective decoders 34_1, 34_2, and 34_3. This storage is held until the decoders are written with the decoding results of the I and P picture data of the GOP to be next decoded.

When decoding the reproduced data ENC shown in FIG. 2, the decoder 34_1, for example as shown in FIG. 3, writes the I2, P5, P8, P11, and P14 picture data in the GOP(N−1) and the I2 picture data in the GOP(N) in the bank regions "0" to "5" in the reproduction memory 36_1. Further, the decoder 34_2, for example as shown in FIG. 3 and FIG. 4, writes the I2, P5, P8, P11, and P14 picture data in the GOP(N) and the I2 picture data in the GOP(N+1) in the bank regions "0" to "5" in the reproduction memory 36_2. Further, the decoder 34_3, for example as shown in FIG. 3, writes the I2, P5, P8, P11, and P14 picture data in the GOP(N+1) and the I2 picture data in the GOP(N+2) in the bank regions "0" to "5" in the reproduction memory 36_3.

Further, the decoder 34_1, when decoding the B picture data in the GOP(N−1), refers to the decoding results of the I and P picture data stored in the bank regions "0" to "5" of the reproduction memory 36_1. Further, the decoder 34_2, when decoding the B picture data in the GOP(N), refers to the decoding results of the I and P picture data stored in the bank regions "0" to "5" of the reproduction memory 36_2. Further, the decoder 34_3, when decoding the B picture data in the GOP(N+1), refers to the decoding results of the I and P picture data stored in the bank regions "0" to "5" of the reproduction memory 36_3. Note that the decoders 34_1, 34_2, and 34_3 successively overwrite the decoding results of the B picture data which the banks "6" and "7" of the reproduction memories 36_1 to 36_3 store with the decoding results of the B picture data three pictures after that B picture data. Due to this, there is no need to provide banks regions corresponding to all of the B picture data in a GOP, and the reproduction memories 36_1 to 36_3 can be made small in size.

The selector 38, under the control of the CPU 42, switches and selectively reproduces and outputs the decoding results read from the reproduction memories 36_1, 36_2, and 36_3.

The CPU 42 performs the following processing on the basis of the programs and data stored in the control memory 40, and centrally controls the operation of the reproduction apparatus 4. The CPU 42 writes the GOP input from the computer 2 (reproduced data ENC) to the input memory 32. Further, the CPU 42 performs the scheduling processing for determining the order of decoding the picture data in GOPs in units of GOPs. The CPU 42 makes the decoders 34_1, 34_2, and 34_3 execute the following decoding based on the results of the scheduling processing. The CPU 42 reads the picture data from the input memory 32 and outputs it to the decoders 34_1, 34_2, and 34_3 so that the I and P picture data belonging to the same GOP and the B picture data referring to decoding results of the I and P picture data are decoded by the same decoders 34_1, 34_2, and 34_3. The CPU 42 for example reads the I and P picture data in the GOP(N−1) and the B picture data in the GOP(N) decoded with reference to decoding results of the I and P picture data via the PCI bridge 30 from the input memory 32 and outputs it to the decoder 34_1. Here, in the present embodiment, the B picture data refers to an open GOP decoded with reference to decoding results of I and P picture data of different GOPs. Specifically, for example, the B0 and B1 picture data in the GOP(N) shown in FIG. 2 are decoded with reference to decoding results of the I and P picture data in the GOP(N−1). Accordingly, the CPU 42 outputs the B0 and B1 picture data in the GOP(N) to the decoder 34_1. Further, the CPU 42 for example reads the I and P picture data in the GOP(N) and the B picture data in the GOP(N+1) decoded with reference to decoding results of the I and P picture data via the PCI bridge 30 from the input memory 32 and outputs them to the decoder 34_2. Further, the CPU 42 for example reads the I and P picture data in the GOP(N+1) and the B picture data in the GOP(N+2) decoded with reference to decoding results of the I and P picture data via the PCI bridge 30 from the input memory 32 and outputs them to the decoder 34_3. The CPU 42, for example, when receiving as input a reproduction start command from the CPU 20 of the computer 2, makes the decoders 34_1, 34_2, and 34_3 decode the plurality of GOPs including the reproduction point. At this time, the CPU 42 controls the decoding of the B picture data by the decoders 34_1, 34_2, and 34_3, the read operation from the decoders 34_1, 34_2, and 34_3 to the selector 38, and the selection operation of the selector 38 so that the reproduction and output are carried out at the designated rate in the direction designated from that reproduction point.

Below, an example of the operation of the data processing system 1 shown in FIG. 1 will be explained.

FIRST EXAMPLE OF OPERATION

Figure 5:
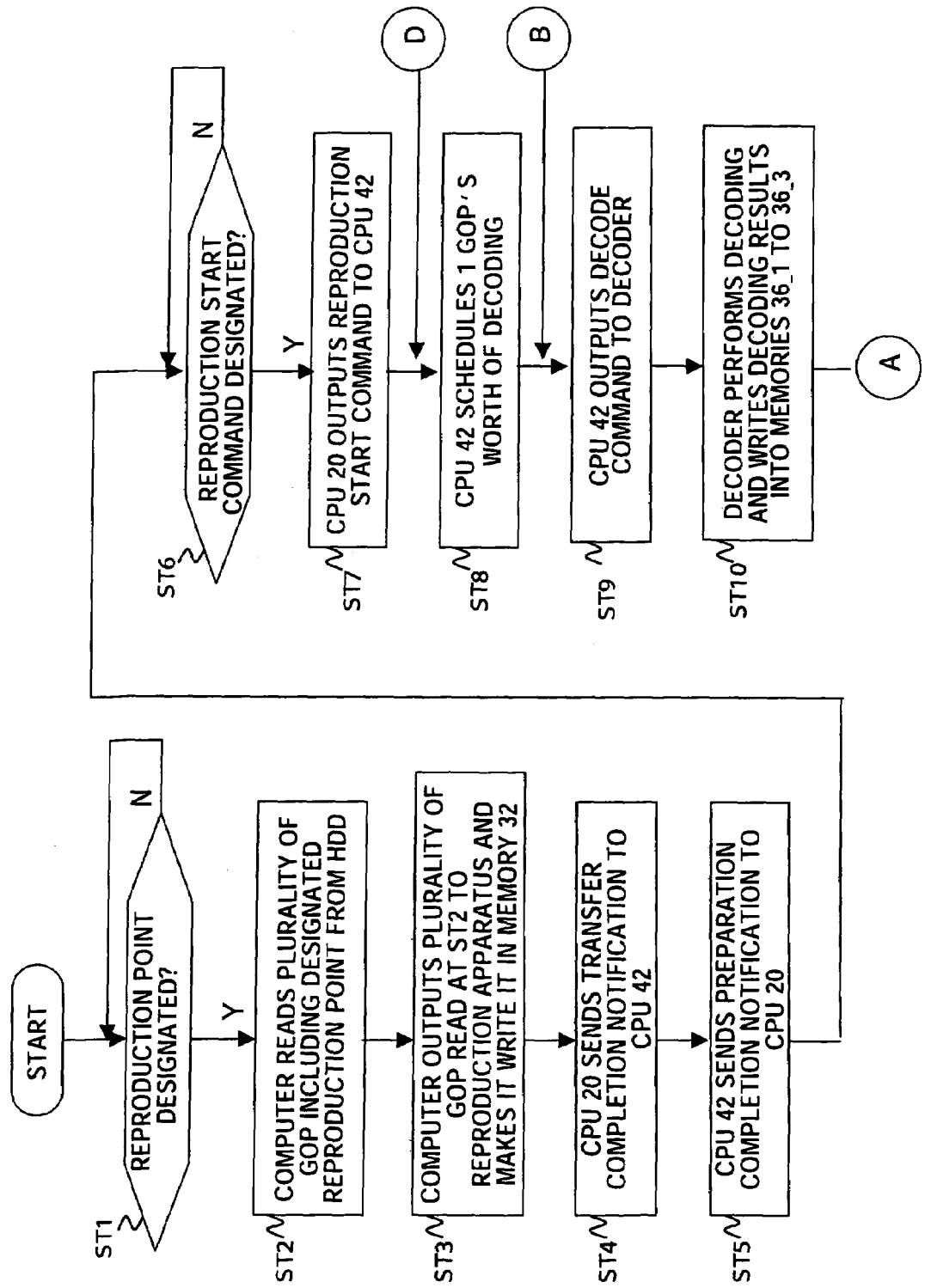
FIG. 5 is a flow chart for explaining an example of the overall operation of the data processing system shown in FIG. 1.
Figure 6:
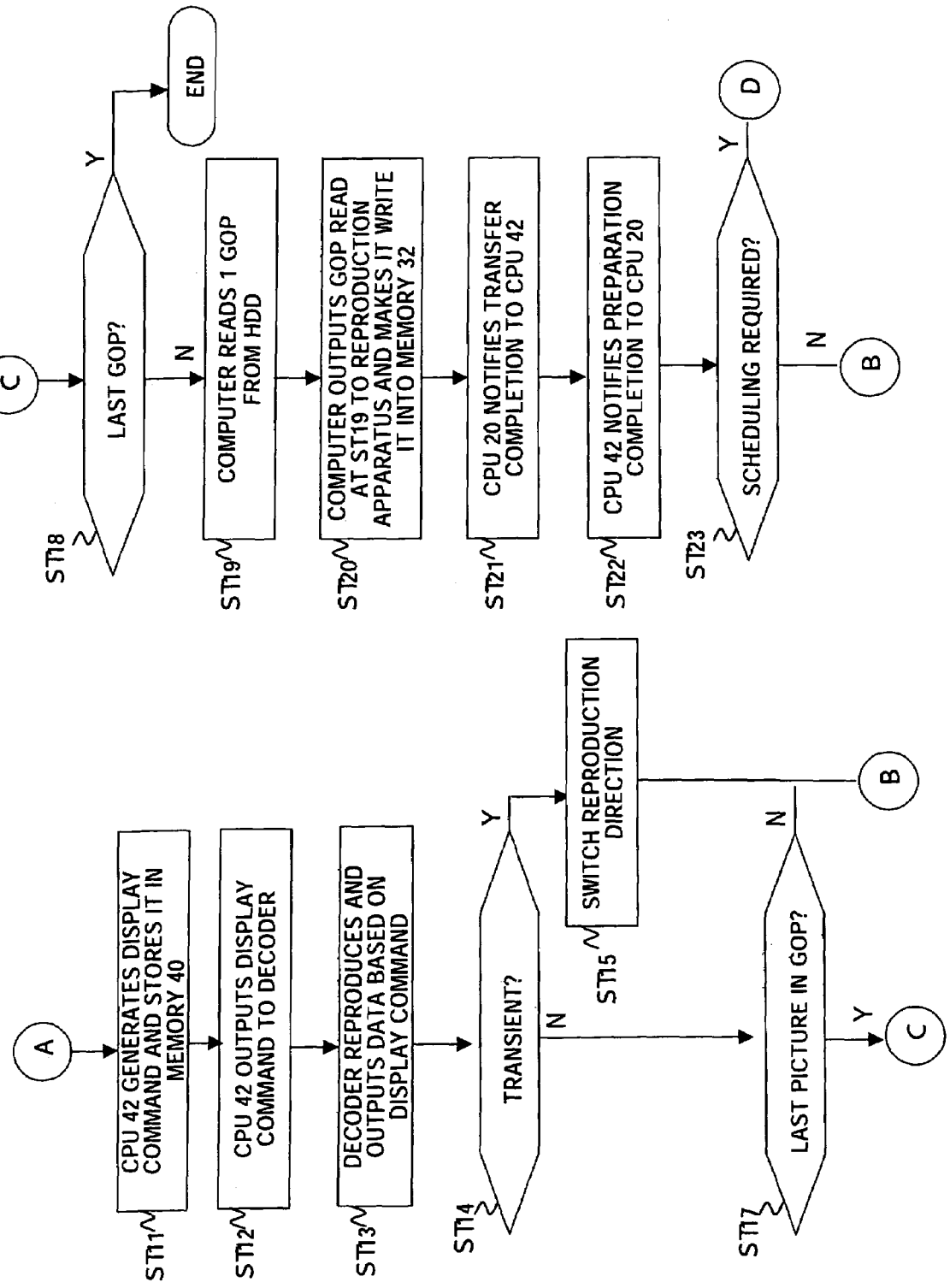
FIG. 6 is a flow chart following FIG. 5 for explaining an example of the overall operation of the data processing system shown in FIG. 1.

Below, an example of the operation from when the image data to be reproduced is designated by the computer 2 to when the reproduction and output are carried out at the reproduction apparatus 4 will be explained. FIG. 5 and FIG. 6 are flow charts for explaining the example of the operation.

Step ST1:
The CPU 20 of the computer 2 judges if an operation signal indicating an operation for designation of a reproduction point in the reproduced data ENC has been input from the operation device 19. It proceeds to step ST2 when judging it has been designated, while repeats the processing of step ST1 when judging it has not.

Step ST2:
The CPU 20 of the computer 2 reads from the HDD 12 the GOP including the picture data of the reproduction point designated at step ST1 and the surrounding GOPs or a total of three (plurality of) GOPs.

Step ST3:
The CPU 20 of the computer 2 outputs the plurality of GOPs read at step ST2 through the bridge 18 and PCI bus 6 to the reproduction apparatus 4. The CPU 42 of the reproduction apparatus 4 writes the GOPs input from the computer 2 through the PCI bridge 30 into the input memory 32.

Step ST4:
The CPU 20 of the computer 2 outputs a transfer completion notification to the CPU 42 of the reproduction apparatus 4. This transfer completion notification shows the identification data of the GOPs output (transferred) at step ST3 from the computer 2 to the reproduction apparatus 4, the addresses in the input memory 32 where the GOPs are written, and the sizes of the data of the GOPs. Further, the transfer completion notification shows the identification data of each picture data in the output GOP, the address in the input memory 32 where the picture data has been written, and the size of the picture data. The CPU 42 writes that transfer completion notification in the memory 40.

Step ST5:
The CPU 42 of the reproduction apparatus 4, after finishing the processing of step ST4, outputs a preparation completion notification to the CPU 20 of the computer 2.

Step ST6:
The CPU 20 of the computer 2 judges if an operation signal indicating a reproduction start command operation designating a reproduction point has been input from the operation device 19. It proceeds to step ST7 when judging it has been input, while repeats the processing of step ST6 when judging it has not.

Step ST7:
When judging input, the CPU 20 of the computer 2 outputs a reproduction start command designating a reproduction point to the CPU 42 of the reproduction apparatus 4.

Step ST8:
The CPU 42 of the reproduction apparatus 4 performs scheduling for determining the order of decoding the picture data in a GOP stored in the input memory 32 including picture data of a reproduction point indicated by the reproduction start command input at step ST7 in accordance with the relationship of inter-reference between the picture data and the reproduction direction.

Step ST9:
The CPU 42 of the reproduction apparatus 4 outputs a decode command indicating the picture data to be decoded next to the decoders 34_1, 34_2, and 34_3 based on the results of scheduling at step ST8 or later explained step ST16. Note that, since the decoding results of the I and P picture data to be reproduced and output next have been already stored in the reproduction memories 36_1 to 36_3, the CPU 42 does not output the decode command for the I and P picture data, but outputs only the display command at step ST12 during a processing time of several picture data right after the transient command. Note that, the CPU 42, for the B picture data, outputs the decode command only in a case where the decoding results are not stored in the reproduction memories 36_1 to 36_3.

Step ST10:
The decoders 34_1, 34_2, and 34_3 read the picture data indicated by the decode command input at step ST9 from the input memory 32 and decode and write the decoding results to the reproduction memories 36_1 to 36_3.

Step ST11:
The CPU 42 of the reproduction apparatus 4 identifies the decoding results to be reproduced and output next based on the designated reproduction direction and the scheduling results, generates the display command indicating the decoding results and the switch command of the selector 38 for performing the desired reproduction and output, and writes this to the control memory 40.

Step ST12:
The CPU 42 of the reproduction apparatus 4 outputs the display command generated at step ST11 to the decoders 34_1, 34_2, and 34_3 and outputs the switch command to the selector 38.

Step ST13:
The decoders 34_1, 34_2, and 34_3 read decoding results shown by the display command input at step ST12 from the reproduction memories 36_1 to 36_3 and outputs them to the selector 38. Further, the selector 38 switches and selectively reproduces and outputs decoding results input from the decoders 34_1, 34_2, and 34_3 on the basis of the switch command input at step ST12.

Step ST14:
The CPU 20 of the computer 2, when judging that an operation signal indicating a transient command operation is input from the operation device 19, proceeds to step ST15, while if otherwise, proceeds to step ST17.

Step ST15:
The CPU 20 of the computer 2 outputs the transient command (reproduction direction switch command) to the CPU 42 of the reproduction apparatus 4. After the transient command is generated, the CPU 20 and CPU 42 perform the processing based on the reproduction direction after the switch. The reproduction apparatus 4 performs the processing of steps ST9 to ST15 explained above in units of picture data.

Step ST17:
The CPU 20 and CPU 42 judge whether or not the picture data after performing the processing of steps ST9 to ST15 explained above is the last picture data in the GOP, proceed to step ST18 when judging it to be the last picture data, while if otherwise, returns to step ST9 and performs the processing for the next picture data.

Step ST18:

The CPU 20 and CPU 42 judge if the GOP to which the processed picture data belongs is the last GOP in the reproduced data ENC. If judging that it is the last GOP, they end the processing, while if otherwise, they proceed to step ST19.

Step ST19:

The CPU 20 of the computer 2 reads a next GOP from the HDD 12 in accordance with the reproduction direction.

Step ST20:

The CPU 20 of the computer 2 outputs the GOP read at step ST19 via the bridge 18 and PCI bus 6 to the reproduction apparatus 4. The CPU 42 of the reproduction apparatus 4 writes the GOP input from the computer 2 through the PCI bridge 30 into the input memory 32.

Step ST21:

The CPU 20 of the computer 2 outputs the transfer completion notification of the GOP output at step ST20 to the CPU 42 of the reproduction apparatus 4. The CPU 42 writes the transfer completion notification in the control memory 40.

Step ST22:

The CPU 42 of the reproduction apparatus 4 outputs a preparation completion notification to the CPU 20 of the computer 2 after the end of the processing at step ST21.

Step ST23:

The CPU 42 of the reproduction apparatus 4, for example, judges whether or not the scheduling of the GOP including the picture data of the reproduction point next in accordance with the reproduction direction has finished (that is, whether or not the scheduling is required). When judging the scheduling is not finished, it proceeds to step ST8, while if otherwise, it proceeds to step ST9.

SECOND EXAMPLE OF OPERATION

In the example of operation, the decoding of step ST10 shown in FIG. 5 will be explained in detail. The CPU 42 of the reproduction apparatus 4, for example, reads the picture data included in the GOP stored in the input memory 32 as explained above by using FIG. 3 and FIG. 4 on the basis of the results of the scheduling and outputs it to the decoders 34_1, 34_2, and 34_3. Then, the decoders 34_1, 34_2, and 34_3 perform the decoding as explained above and write decoding results into the reproduction memories 36_1, 36_2, and 36_3.

The reproduction apparatus 4 decodes the I and P picture data of each GOP in the decoders 34_1, 34_2, and 34_3 preceding the B picture data as shown in FIG. 3 and FIG. 4 and writes the results into the fixed bank regions in the reproduction memories 36_1, 36_2, and 36_3. By this, if there is time for decoding 1 picture's (1 frame's) worth of data after that write operation, any picture data in the GOP being processed can be reproduced and output. That is, when a transient command is generated at step ST14 shown in FIG. 6, the reproduction and output of the picture data in the reproduction direction after the switching at steps ST9 to ST13 next can be quickly performed. For example, when decoding and reproducing and outputting the B9 picture data in the GOP (N−1) shown in FIG. 3, the decoding results of the P8 and P11 picture data in the GOP(N−1) are required. Further, in order to decode the P8 picture data, the decoding results of the P5 picture data are required, and in order to decode the P5 picture data, the decoding results of the I2 picture data are required. Accordingly, in order to decode the P9 picture data, decoding results of the I2, P5, P8, and P11 picture data are required. According to the reproduction apparatus 4, as shown in FIG. 3, by storing the I and P picture data in the reproduction memory 36_1, if the decoder 34_1 receives as input the B9 picture data of the GOP(N−1), the decoder 34_1 can quickly perform the processing of decoding and reproducing and outputting the B9 picture data by using the P8 and P11 picture data already stored in the bank regions "2" and "3" of the reproduction memory 36_1. Due to this, transient reproduction free from time lag can be performed.

THIRD EXAMPLE OF OPERATION

Figure 7:
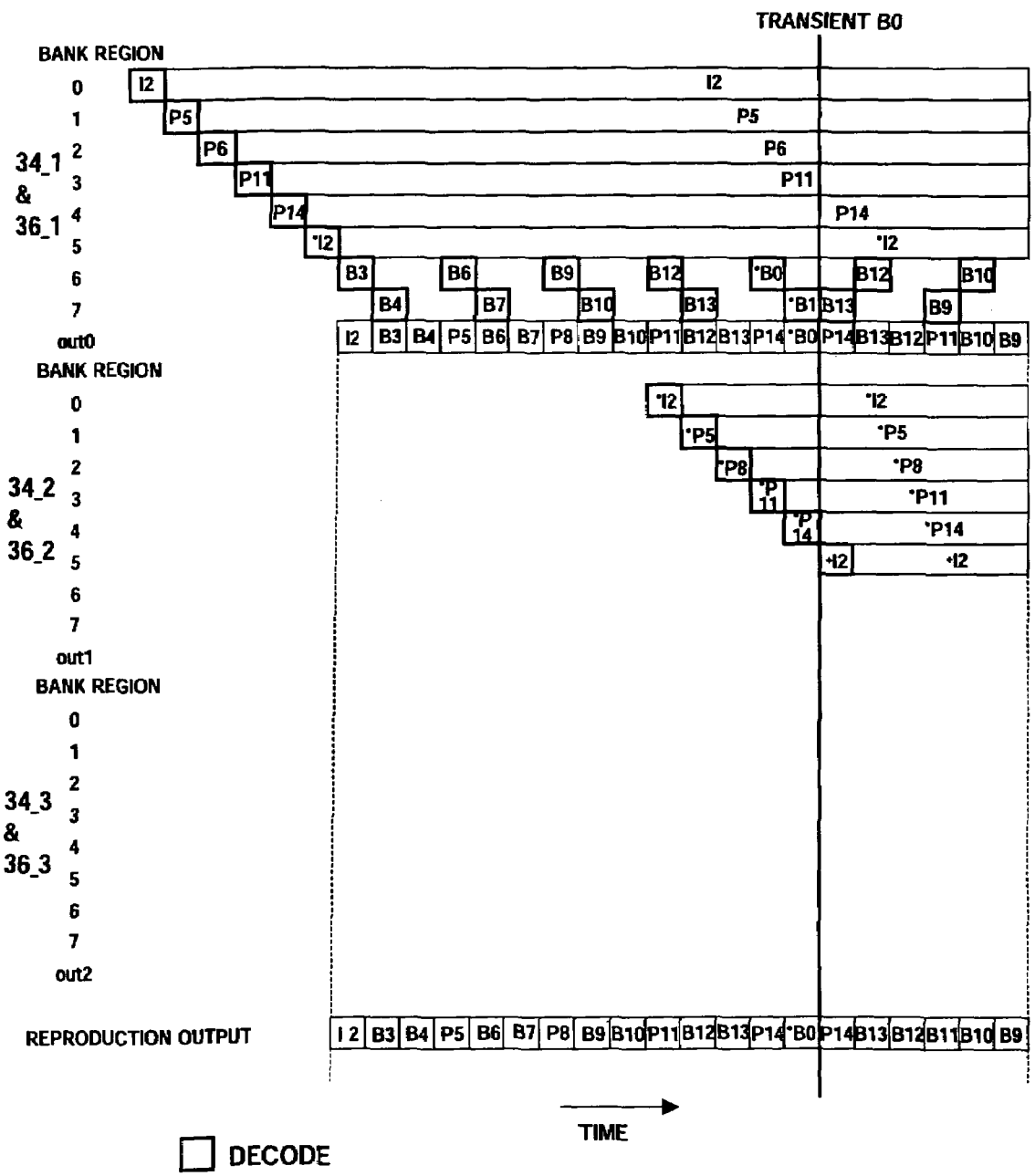
FIG. 7 is a view for explaining the operation of a reproduction apparatus in the case where a transient command occurs right after reproducing and outputting B0 picture data of the GOP(N) in the forward reproduction shown in FIG. 3 and FIG. 4.
Figure 8:
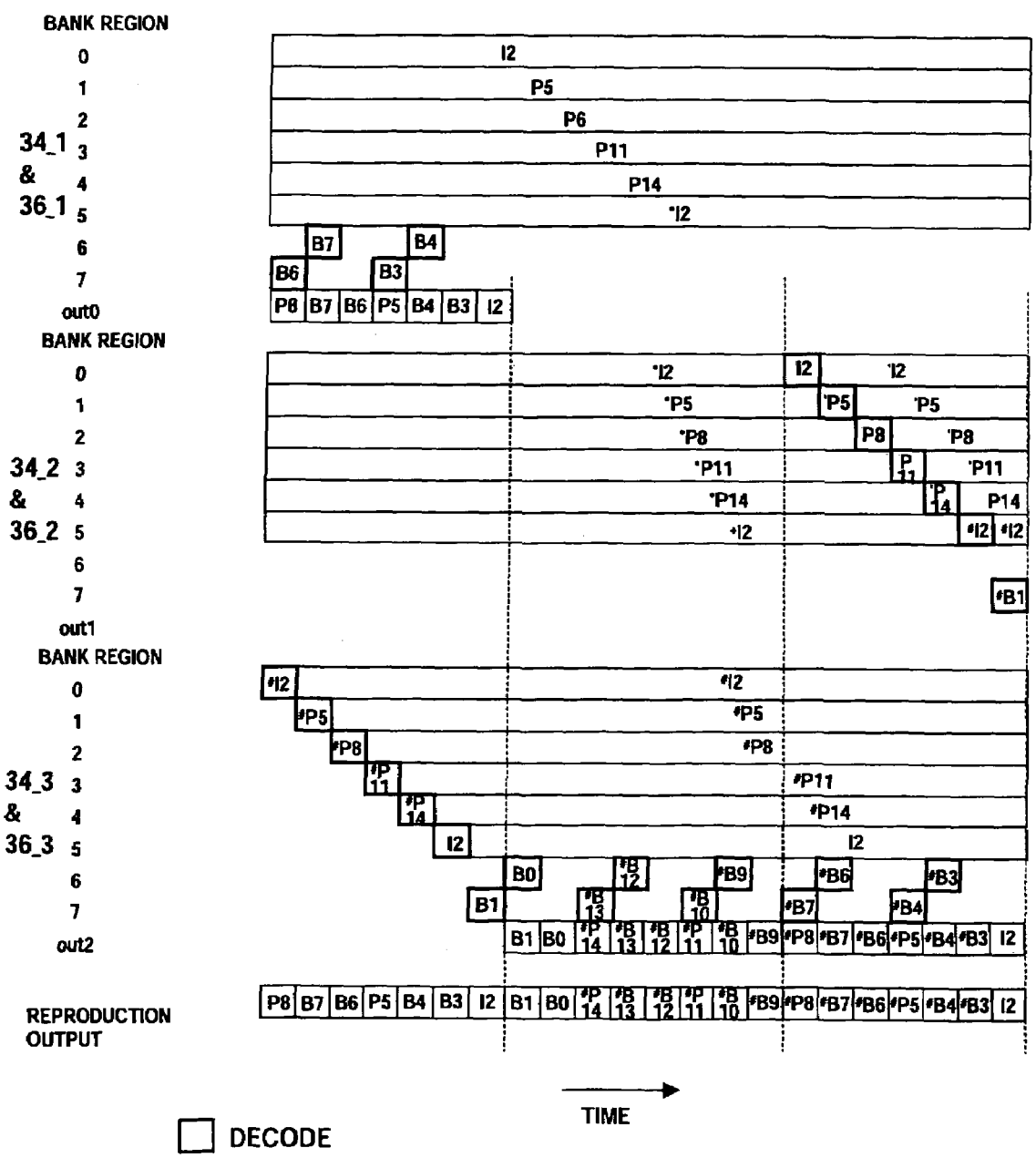
FIG. 8 is a view following FIG. 7 for explaining the operation of a reproduction apparatus in the case where a transient command occurs right after reproducing and outputting B0 picture data of the GOP(N) in the forward reproduction shown in FIG. 3 and FIG. 4.

Below, an example of operation where a transient command is generated in the forward (FWD) reproduction direction will be explained. FIG. 7 and FIG. 8 are diagrams for explaining the operation of the reproduction apparatus 4 where a transient command is generated right after the B0 picture data of the GOP(N) is reproduced and output in the forward reproduction shown in FIG. 3 and FIG. 4. After the decoder 34_1 reproduces and outputs the decoding results of the B0 picture data of the GOP(N), it reads the decoding results of the P14 picture data of the GOP(N−1) from the reproduction memory 36_1 and reproduces and outputs it. Further, the decoder 34_1 reads the B13 picture data from the input memory 32 parallel to the reproduction and output of the P14 picture data and decodes and writes the decoding results into the reproduction memory 36_1. Due to this, the decoder 34_1 can reproduce and output the decoding results of the B13 picture data following the reproduction and output of the decoding results of the P14 picture data and can perform the transient reproduction free from the time lag. Next, the decoder 34_1 reads the decoding results of the B13 picture data of the GOP(N−1) from the reproduction memory 36_1 and outputs them to the selector 38. Further, the reproduction apparatus 4 receives as input the GOP(N−2) from the computer 2 at step ST19 shown in FIG. 6 after the transient and writes it into the input memory 32, performs the scheduling at step ST8, and then makes the decoder 34_3 decode it.

Figure 9:
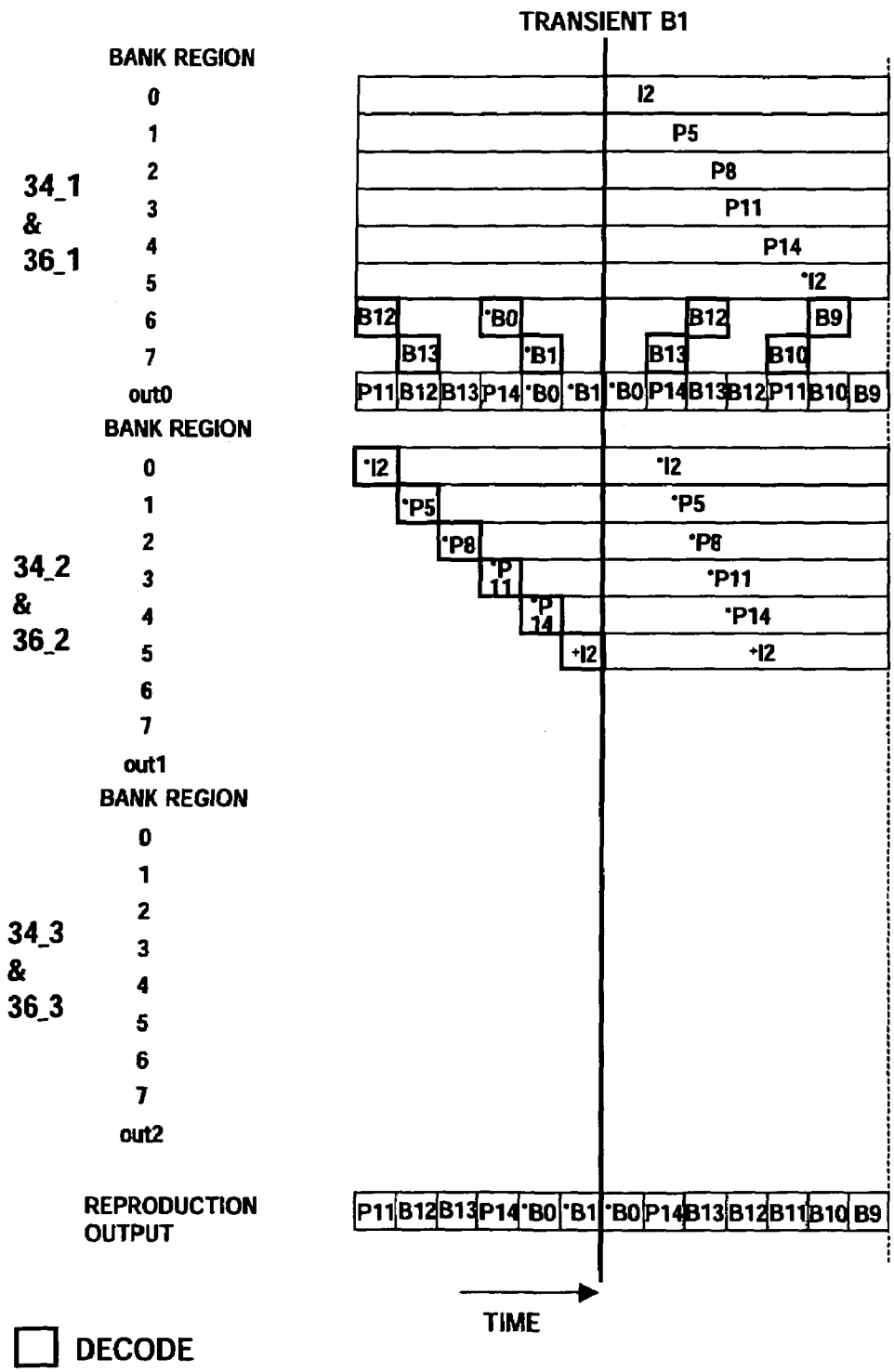
FIG. 9 is a view for explaining the operation of a reproduction apparatus in the case where a transient command occurs right after reproducing and outputting B1 picture data of the GOP(N) in the forward reproduction shown in FIG. 3 and FIG. 4.

FIG. 9 is a diagram for explaining the operation of the reproduction apparatus 4 where a transient command is generated right after the B1 picture data of the GOP(N) is reproduced and output in the forward reproduction shown in FIG. 3 and FIG. 4. The decoder 34_1 reads the decoding results of the B0 picture data of GOP(N) from the reproduction memory 36_1 and reproduces and outputs them following the reproduction and output of the decoding results of the B1 picture data of GOP(N). Due to this, following the reproduction and output of the decoding results of the B1 picture data of GOP(N), the decoding results of the B0 picture data of the GOP(N) corresponding to the transient reproduction can be reproduced and output. Thereafter, the decoder 34_1 decodes the B13 picture data of the GOP(N−1) and, at the same time, reads the P14 picture data of the GOP(N−1) from the decoder 34_1 and reproduces and outputs it.

Figure 10:
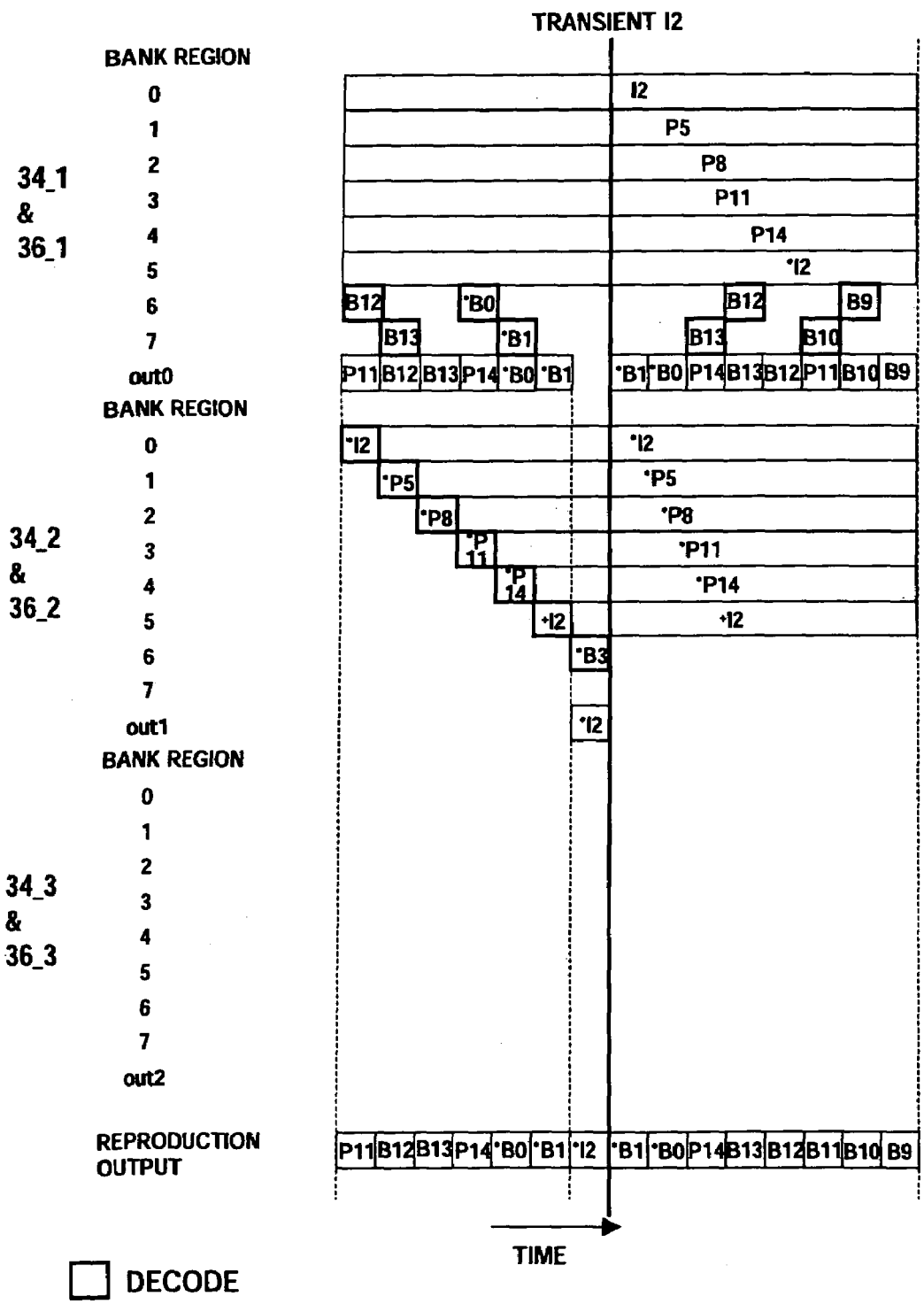
FIG. 10 is a view for explaining the operation of a reproduction apparatus in the case where a transient command occurs right after reproducing and outputting I2 picture data of the GOP(N) in the forward reproduction shown in FIG. 3 and FIG. 4.

FIG. 10 is a diagram for explaining the operation of the reproduction apparatus 4 where a transient command is generated right after the I2 picture data of the GOP(N) is reproduced and output in the forward reproduction shown in FIG. 3 and FIG. 4. Following the reproduction and output of the decoding results of the I2 picture data of the GOP(N) by the decoder 34_2, the decoder 34_1 reads the decoding results of the B1 picture data of the GOP(N) from the reproduction memory 36_1 and reproduces and outputs it. Due to this, transient reproduction can be performed without a time lag. Thereafter, the decoder 34_1 reads the decoding results of the B0 picture data of the GOP(N) from the reproduction memory 36_1 and reproduces and outputs it.

Figure 11:
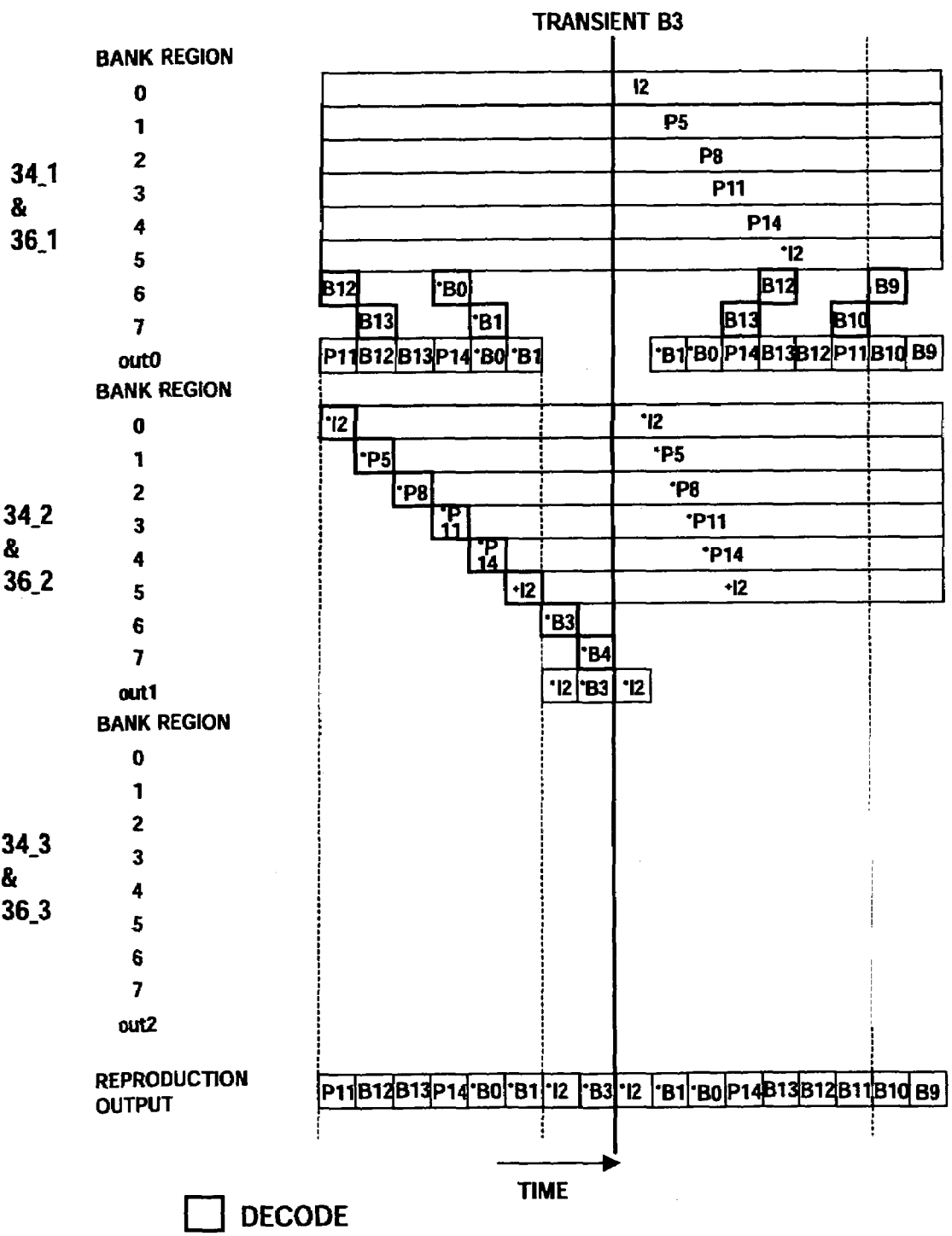
FIG. 11 is a view for explaining the operation of a reproduction apparatus in the case where a transient command occurs right after reproducing and outputting B3 picture data of the GOP(N) in the forward reproduction shown in FIG. 3 and FIG. 4.

FIG. 11 is a diagram for explaining the operation of the reproduction apparatus 4 where a transient command is generated right after the B3 picture data of the GOP(N) is reproduced and output in the forward reproduction shown in FIG. 3 and FIG. 4. The decoder 34_2 reads the decoding results of the I2 picture data of the GOP(N) from the reproduction memory 36_2 and reproduces and outputs it following the reproduction and output of the decoding results of the B3 picture data of the GOP(N). Due to this, the transient reproduction can be performed without a time lag. Thereafter, the decoder 34_1 reads the decoding results of the B1 picture data of the GOP(N) from the reproduction memory 36_1 and reproduces and outputs it.

Figure 12:
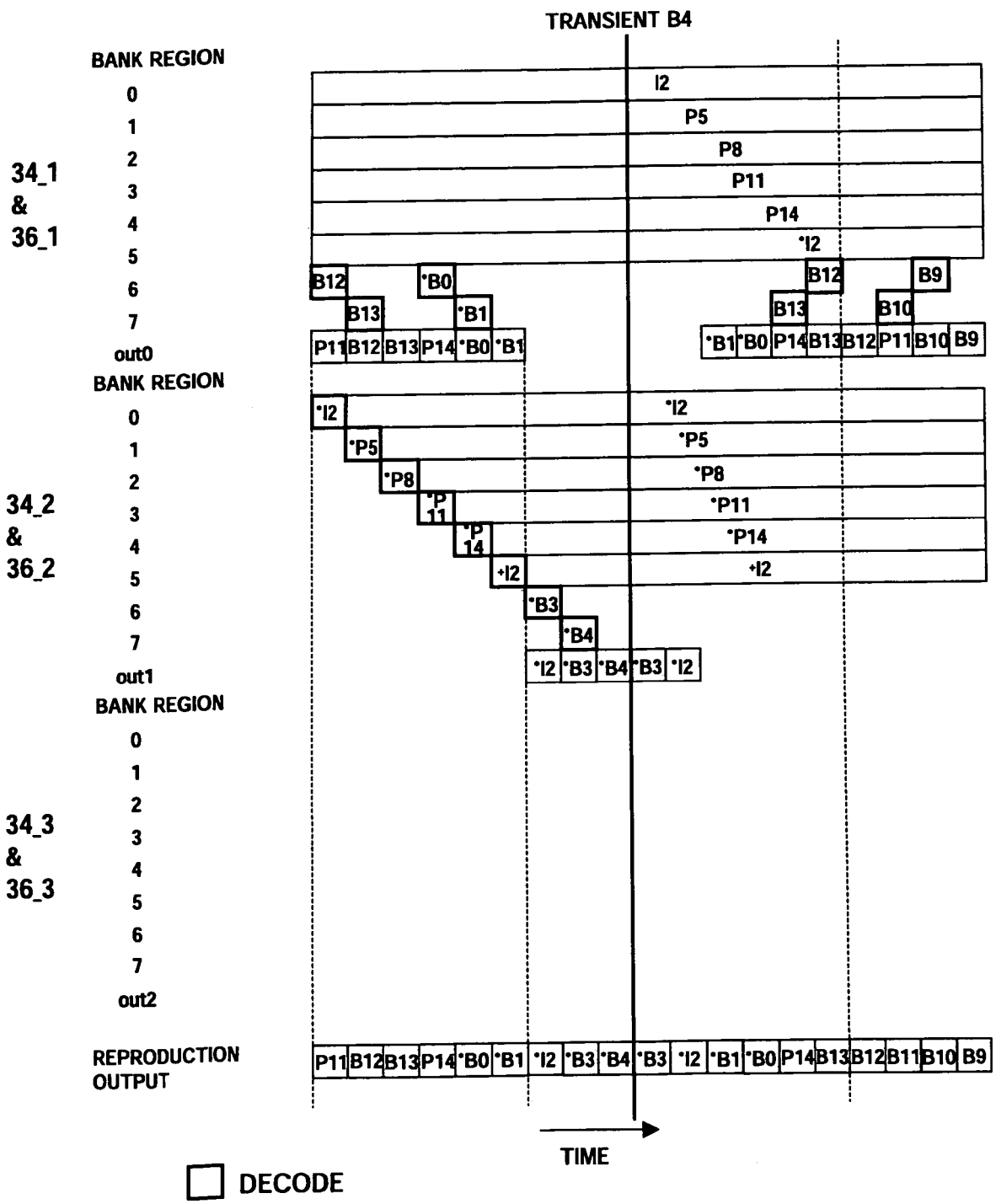
FIG. 12 is a view for explaining the operation of a reproduction apparatus in the case where a transient command occurs right after reproducing and outputting B4 picture data of the GOP(N) in the forward reproduction shown in FIG. 3 and FIG. 4.

FIG. 12 is a diagram for explaining the operation of the reproduction apparatus 4 where a transient command is generated right after the B4 picture data of the GOP(N) is reproduced and output in the forward reproduction shown in FIG. 3 and FIG. 4. The decoder 34_2 reads the decoding results of the B3 picture data of the GOP(N) from the reproduction memory 36_2 and reproduces and outputs it following the reproduction and output of the decoding results of the B4 picture data of the GOP(N). Due to this, transient reproduction can be performed without a time lag. Thereafter, the decoder 34_2 reads the decoding results of the I2 picture data of the GOP(N) from the reproduction memory 36_2 and reproduces and outputs it. Next, the decoder 34_1 reads the decoding results of the B1 picture data from the reproduction memory 36_1 and reproduces and outputs it.

Figure 13:
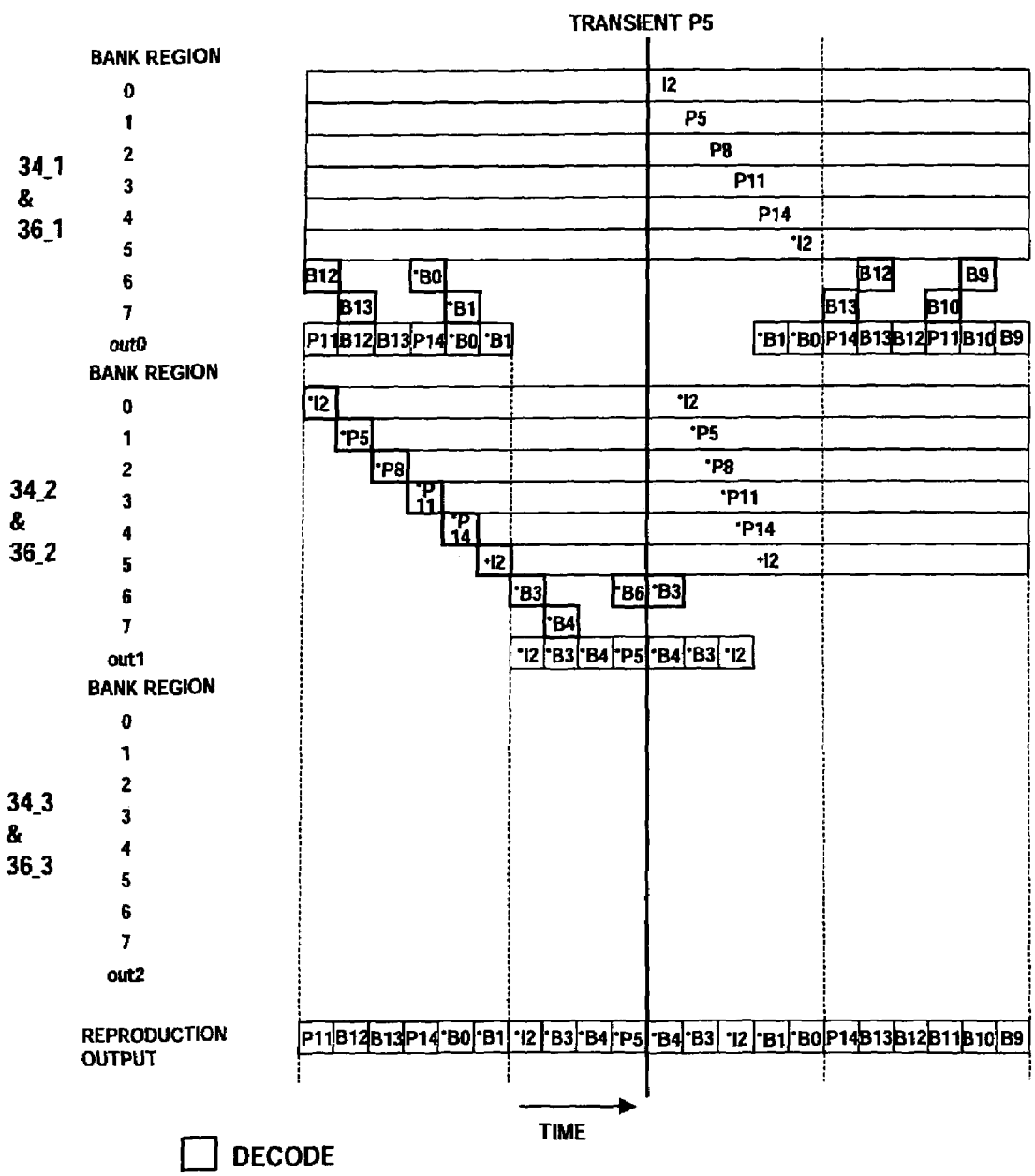
FIG. 13 is a view for explaining the operation of a reproduction apparatus in the case where a transient command occurs right after reproducing and outputting P5 picture data of the GOP(N) in the forward reproduction shown in FIG. 3 and FIG. 4.

FIG. 13 is a diagram for explaining the operation of the reproduction apparatus 4 where a transient command is generated right after the P5 picture data of the GOP(N) is reproduced and output in the forward reproduction shown in FIG. 3 and FIG. 4. The decoder 34_2 reads the decoding results of the B4 picture data of the GOP(N) from the reproduction memory 36_2 and reproduces and outputs it following the reproduction and output of the decoding results of the P5 picture data of the GOP(N). Further, the decoder 34_2 decodes the B3 picture data read from the memory 32 parallel to the reproduction processing and writes the decoding results into the reproduction memory 36_2. Due to this, transient reproduction can be performed without a time lag. Thereafter, the decoder 34_2 reads the decoding results of the B3 picture data of the GOP(N) from the reproduction memory 36_2 and reproduces and outputs it.

Figure 14:
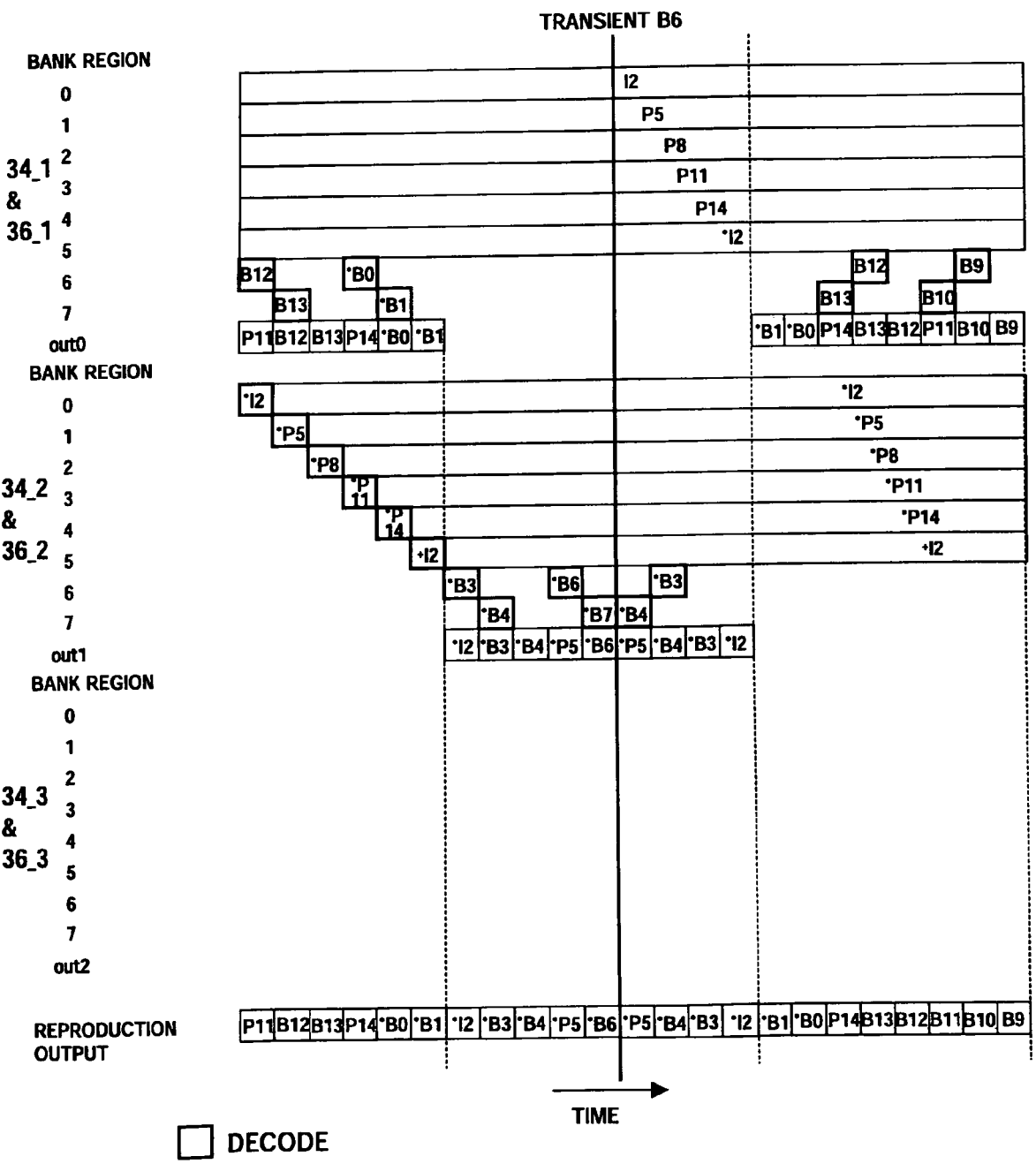
FIG. 14 is a view for explaining the operation of a reproduction apparatus in the case where a transient command occurs right after reproducing and outputting B6 picture data of the GOP(N) in the forward reproduction shown in FIG. 3 and FIG. 4.

FIG. 14 is a diagram for explaining the operation of the reproduction apparatus 4 where a transient command is generated right after the B6 picture data of the GOP(N) is reproduced and output in the forward reproduction shown in FIG. 3 and FIG. 4. The decoder 34_2 reads the decoding results of the P5 picture data of the GOP(N) from the reproduction memory 36_2 and reproduces and outputs it following the reproduction and output of the decoding results of the B6 picture data of the GOP(N). Further, the decoder 34_2 decodes the B4 picture data in the GOP(N) read from the memory 32 parallel to the reproduction processing and writes the decoding results into the reproduction memory 36_2. Due to this, transient reproduction can be performed without a time lag. Thereafter, the decoder 34_2 reads the decoding results of the B4 picture data of the GOP(N) from the reproduction memory 36_2 and reproduces and outputs it.

Figure 15:
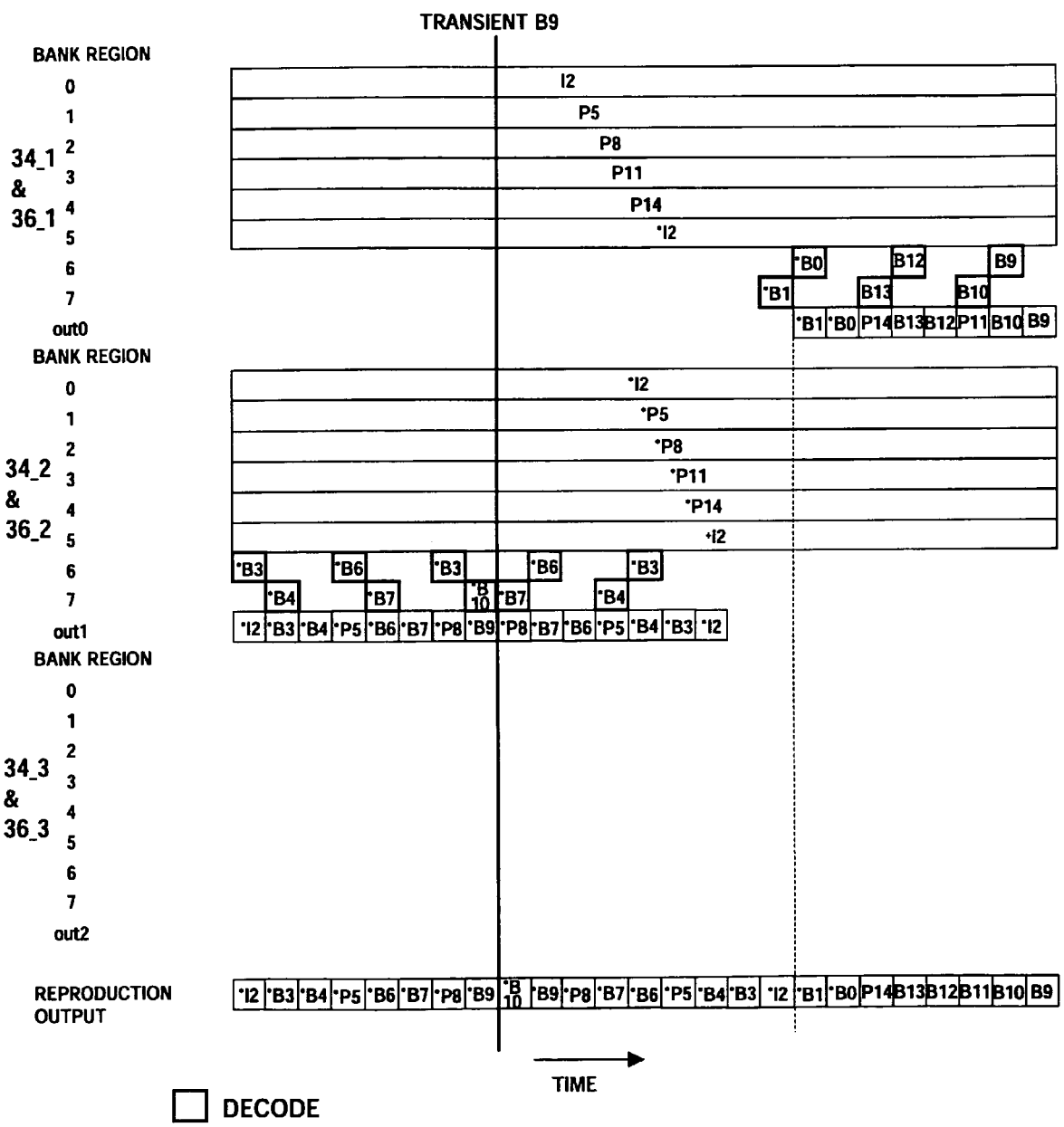
FIG. 15 is a view for explaining the operation of a reproduction apparatus in the case where a transient command occurs right after reproducing and outputting B9 picture data of the GOP(N) in the forward reproduction shown in FIG. 3 and FIG. 4.

FIG. 15 is a diagram for explaining the operation of the reproduction apparatus 4 where a transient command is generated right after the B9 picture data of the GOP(N) is reproduced and output in the forward reproduction shown in FIG. 3 and FIG. 4. The decoder 34_2 reads the decoding results of the B10 picture data of the GOP(N) from the reproduction memory 36_2 and reproduces and outputs it following the reproduction and output of the decoding results of the B9 picture data of the GOP (N). Further, the decoder 34_2 decodes the B7 picture data read from the memory 32 parallel to the reproduction processing and writes the decoding results into the reproduction memory 36_2. Due to this, transient reproduction can be performed without a time lag. Thereafter, the decoder 34_2 reads the decoding results of the B9 picture data of the GOP(N) from the reproduction memory 36_2 and reproduces and outputs it.

Figure 16:
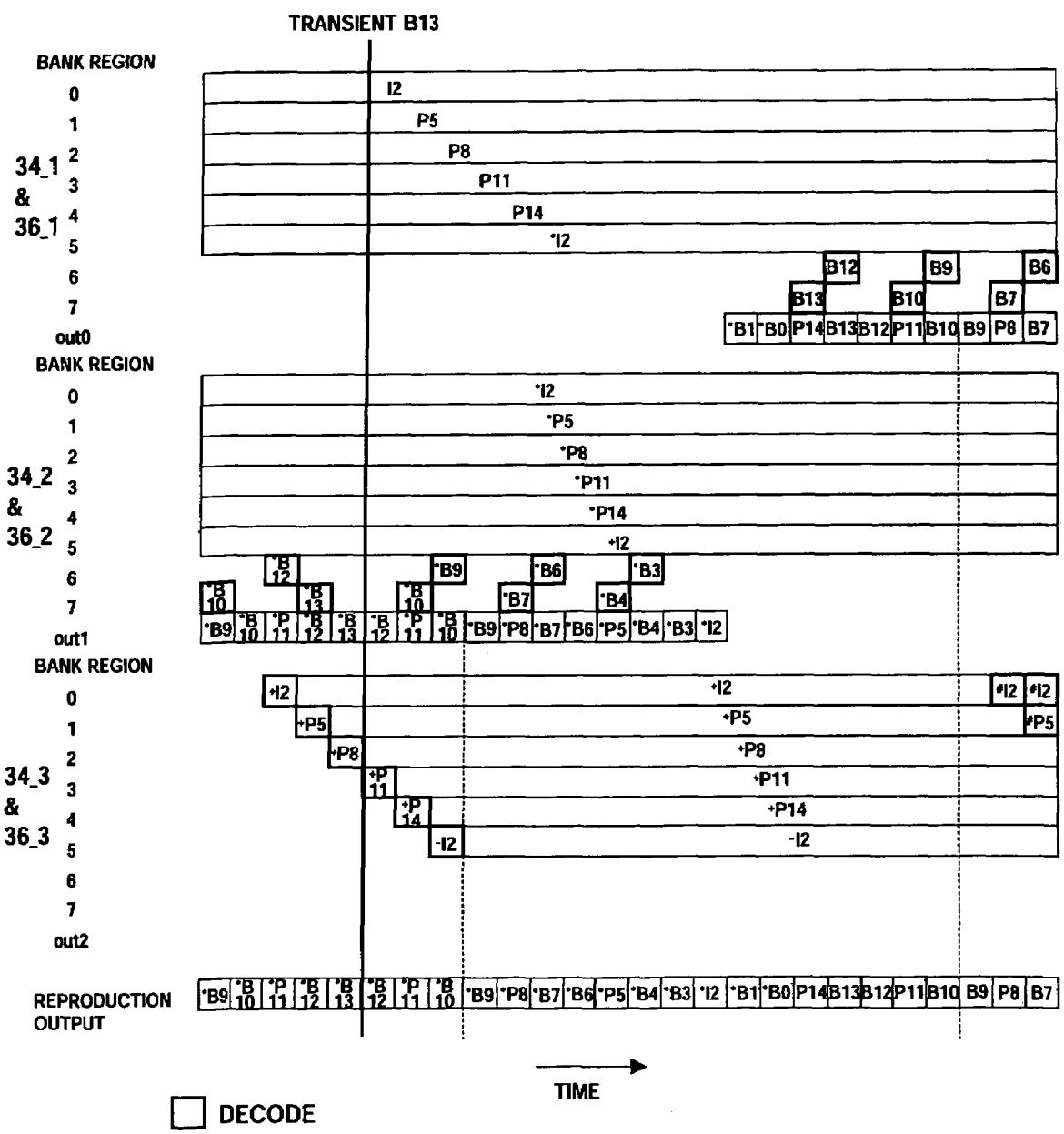
FIG. 16 is a view for explaining the operation of a reproduction apparatus in the case where a transient command occurs right after reproducing and outputting B13 picture data of the GOP(N) in the forward reproduction shown in FIG. 3 and FIG. 4.

FIG. 16 is a diagram for explaining the operation of the reproduction apparatus 4 where a transient command is generated right after the B13 picture data of the GOP(N) is reproduced and output in the forward reproduction shown in FIG. 3 and FIG. 4. The decoder 34_2 reads the decoding results of the B12 picture data of the GOP(N) from the reproduction memory 36_2 and reproduces and outputs it following the reproduction and output of the decoding results of the B13 picture data of the GOP(N). Due to this, transient reproduction can be performed without a time lag. Next, the decoder 34_2 reads the decoding results of the P11 picture data read from the reproduction memory 36_2 and reproduces and outputs it. The decoder 34_2 reads the decoding results of the B10 picture data of the GOP(N) parallel to the reproduction and output and reproduces and outputs it.

Figure 17:
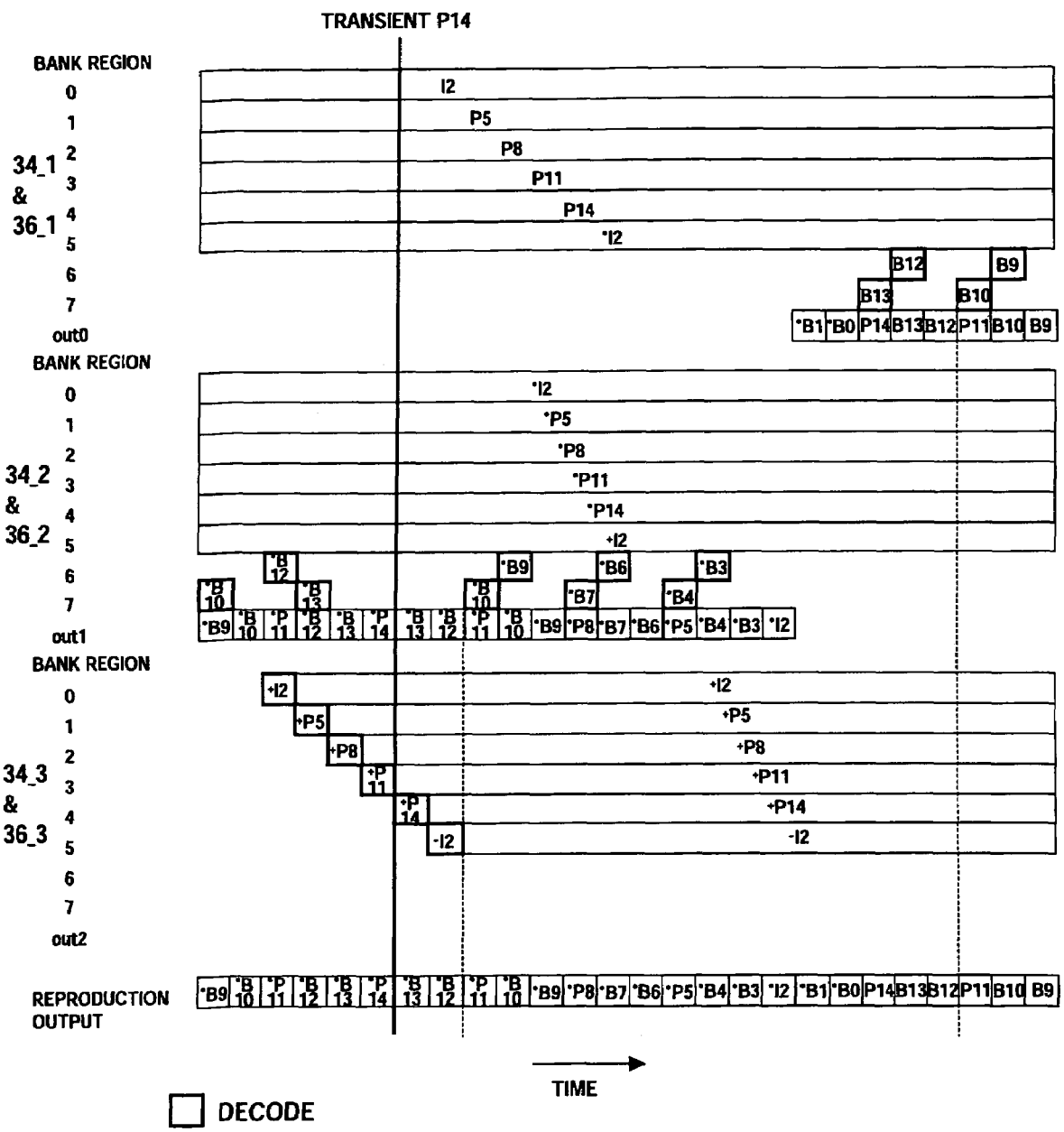
FIG. 17 is a view for explaining the operation of a reproduction apparatus in the case where a transient command occurs right after reproducing and outputting P14 picture data of the GOP(N) in the forward reproduction shown in FIG. 3 and FIG. 4.

FIG. 17 is a diagram for explaining the operation of the reproduction apparatus 4 where a transient command is generated right after the P14 picture data of the GOP(N) is reproduced and output in the forward reproduction shown in FIG. 3 and FIG. 4. The decoder 34_2 reads the decoding results of the B13 picture data of the GOP(N) from the reproduction memory 36_2 and reproduces and outputs it following the reproduction and output of the decoding results of the P14 picture data of the GOP(N). Due to this, transient reproduction can be performed without a time lag. Next, the decoder 34_2 reads the decoding results of the B12 picture data from the reproduction memory 36_2 and reproduces and outputs it.

As explained above, according to the reproduction apparatus 4, even where a transient command is generated right after the reproduction and output of any picture data in the GOP(N), transient reproduction can be performed without a time lag.

FOURTH EXAMPLE OF OPERATION

Figure 18:
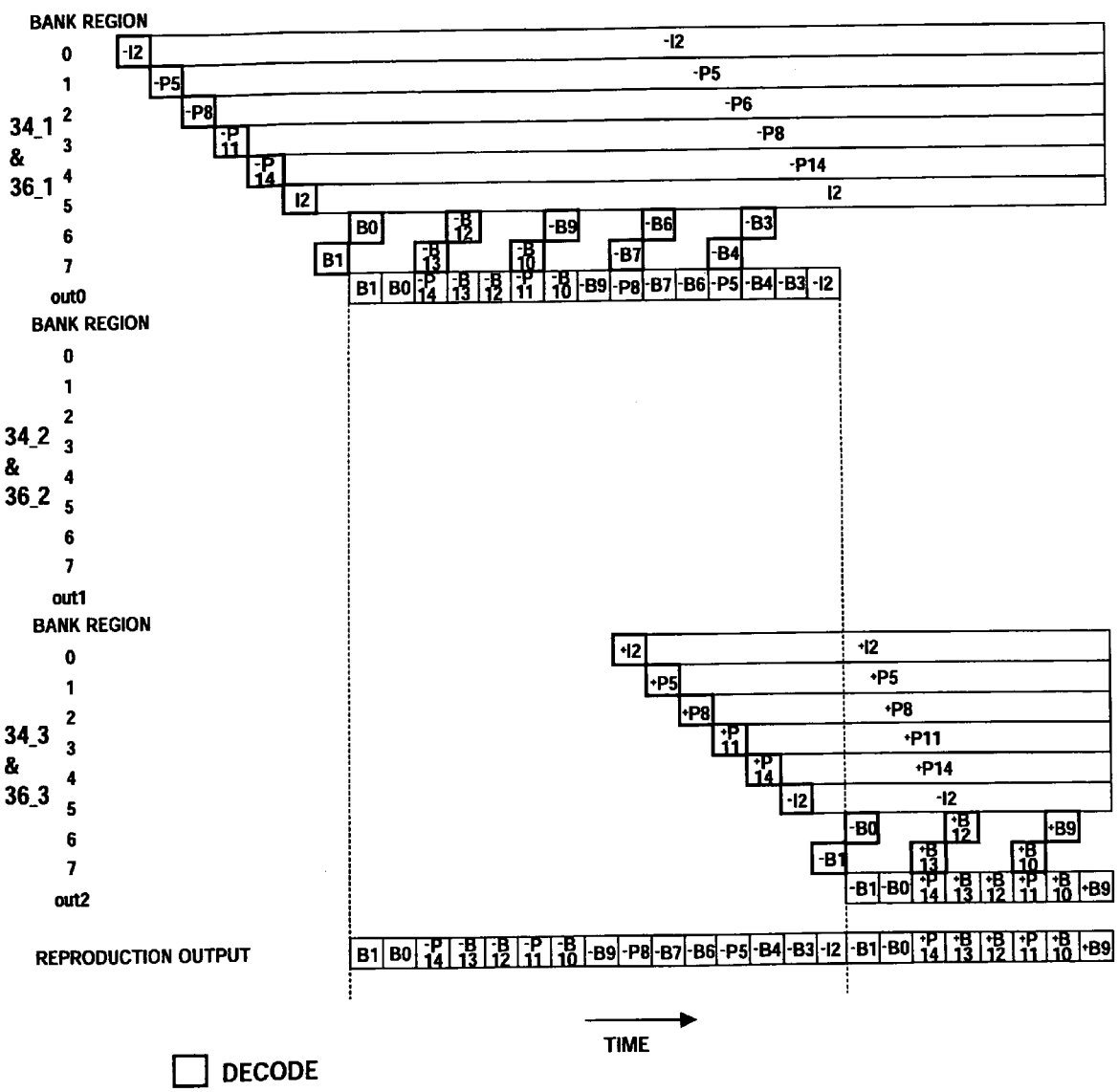
FIG. 18 is a view of decoding by decoders 34_1, 34_2, and 34_3, the storage states of reproduction memories 36_1 to 36_3, and reproduction and output in the case of reproducing reproduced data ENC in a reverse direction.
Figure 19:
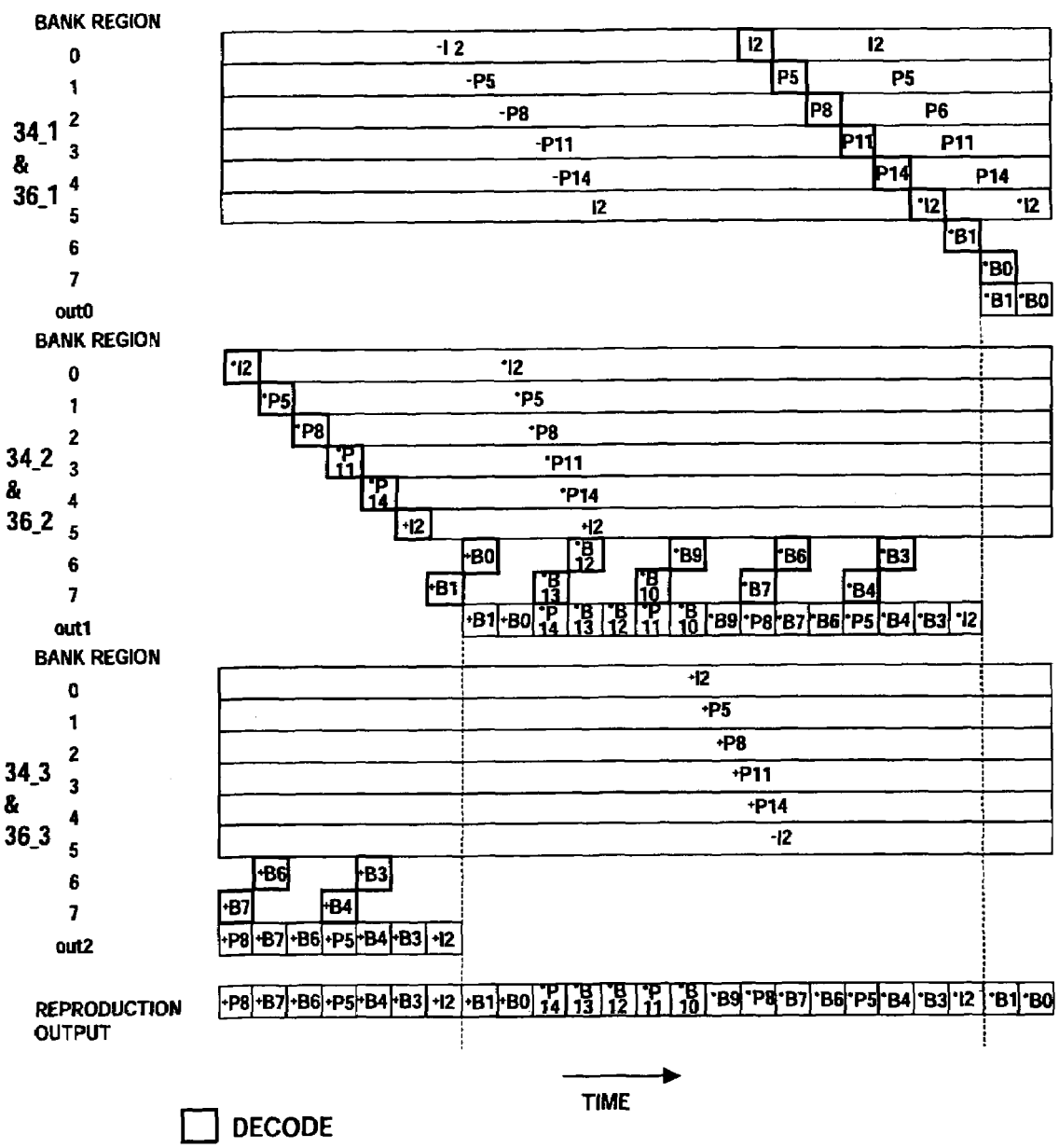
FIG. 19 is a view following FIG. 18 of decoding by decoders 34_1, 34_2, and 34_3, the storage states of reproduction memories 36_1 to 36_3, and reproduction and output in the case of reproducing reproduced data ENC in a reverse direction.

In this example of operation, a case where the reproduction apparatus 4 performs reverse (REV) reproduction will be explained. FIG. 18 and FIG. 19 are diagrams showing the decoding of the decoders 34_1, 34_2, and 34_3 where the reproduced data ENC is reproduced in the reverse (REV) direction, storage states of the reproduction memories 36_1 to 36_3, and the reproduction and output. As shown in FIG. 18 and FIG. 19, the decoder 34_1 first decodes the I and P picture data of the GOP(N+2) and the I2 picture data of the GOP(N+3) where the reverse reproduction is performed and writes the decoding results into the bank regions "0" to "5" of the decoder 34_1. Thereafter, the decoder 34_1 successively decodes the B1 and B0 picture data of the GOP(N+3) and the B13, B12, B10, B9, B7, B6, B4, and B3 picture data of the GOP(N+2). Then, the decoder 34_1 successively reproduces and outputs the decoding results of the B1 and B0 picture data of the GOP(N+3) and the decoding results of the P14, B13, B12, P11, B10, B9, P8, B7, B6, P5, B4, B3, and I2 picture data of the GOP(N+2). Further, the decoders 34_2 and 34_3 perform the same processing as that of the decoder 34_1 except that the GOP(N) and GOP(N+1) are decoded at timings shown in FIG. 18 and FIG. 19.

FIFTH EXAMPLE OF OPERATION

Figure 20:
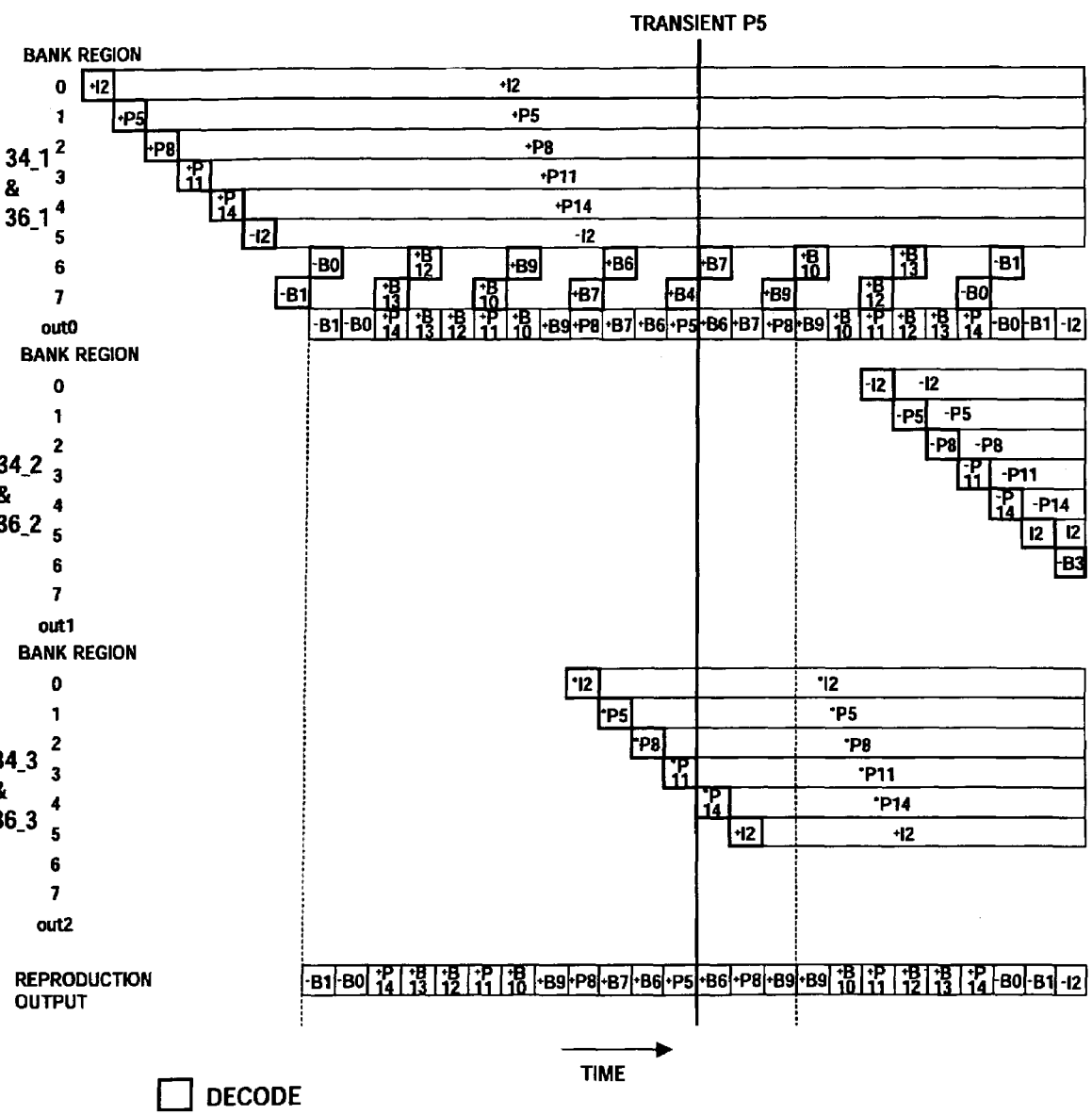
FIG. 20 is a view for explaining the operation of a reproduction apparatus in the case where a transient command occurs right after reproducing and outputting P5 picture data of the GOP(N+1) in reverse reproduction.
Figure 21:
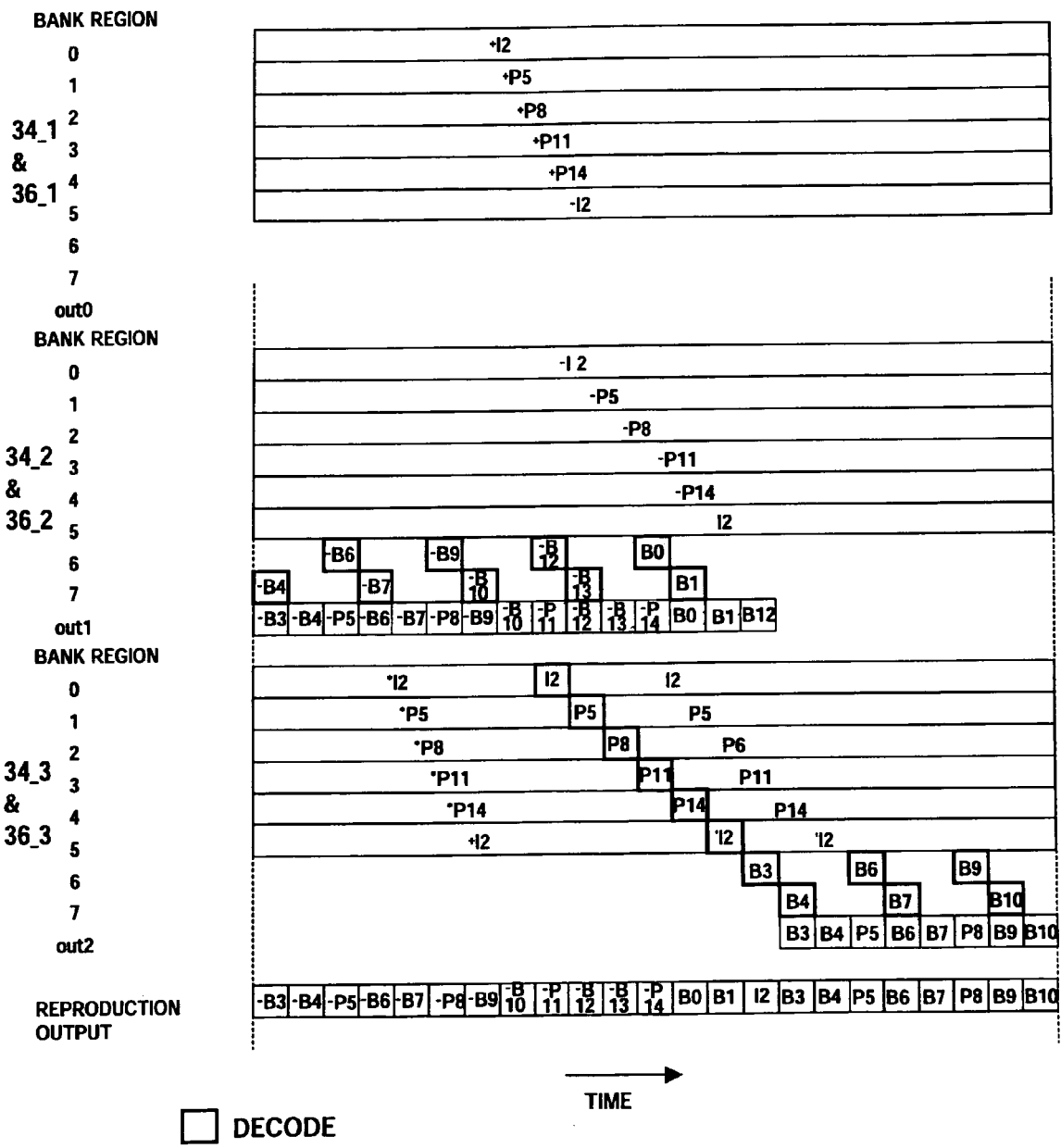
FIG. 21 is a view following FIG. 20 for explaining the operation of a reproduction apparatus in the case where a transient command occurs right after reproducing and outputting P5 picture data of the GOP(N+1) in reverse reproduction.

Below, an example of the operation of the reproduction apparatus 4 where a transient command is generated in the reverse (REV) reproduction direction will be explained. FIG. 20 and FIG. 21 are diagrams for explaining the operation of the reproduction apparatus 4 where a transient command is generated right after the reproduction and output of the P5 picture data of the GOP(N+1) in the reverse reproduction. The decoder 34_1 reads the decoding results of the B6 picture data of the GOP(N+1) from the reproduction memory 36_1 following the reproduction and output of the decoding results of the P5 picture data of the GOP(N+1) and reproduces and outputs it. Due to this, transient reproduction can be performed without a time lag. Parallel to that, the decoder 34_1 decodes the B7 picture data of the GOP(N+1) stored in the input memory 32 with reference to the I and P picture data stored in the memory 36_1 and writes it into the reproduction memory 36_1. Further, the reproduction apparatus 4 receives as input the GOP(N+2) from the computer 2 at step ST19 shown in FIG. 6 after the transient and writes it into the input memory 32, performs the scheduling in step ST8, and then makes the decoder 34_2 decode it.

Figure 22:
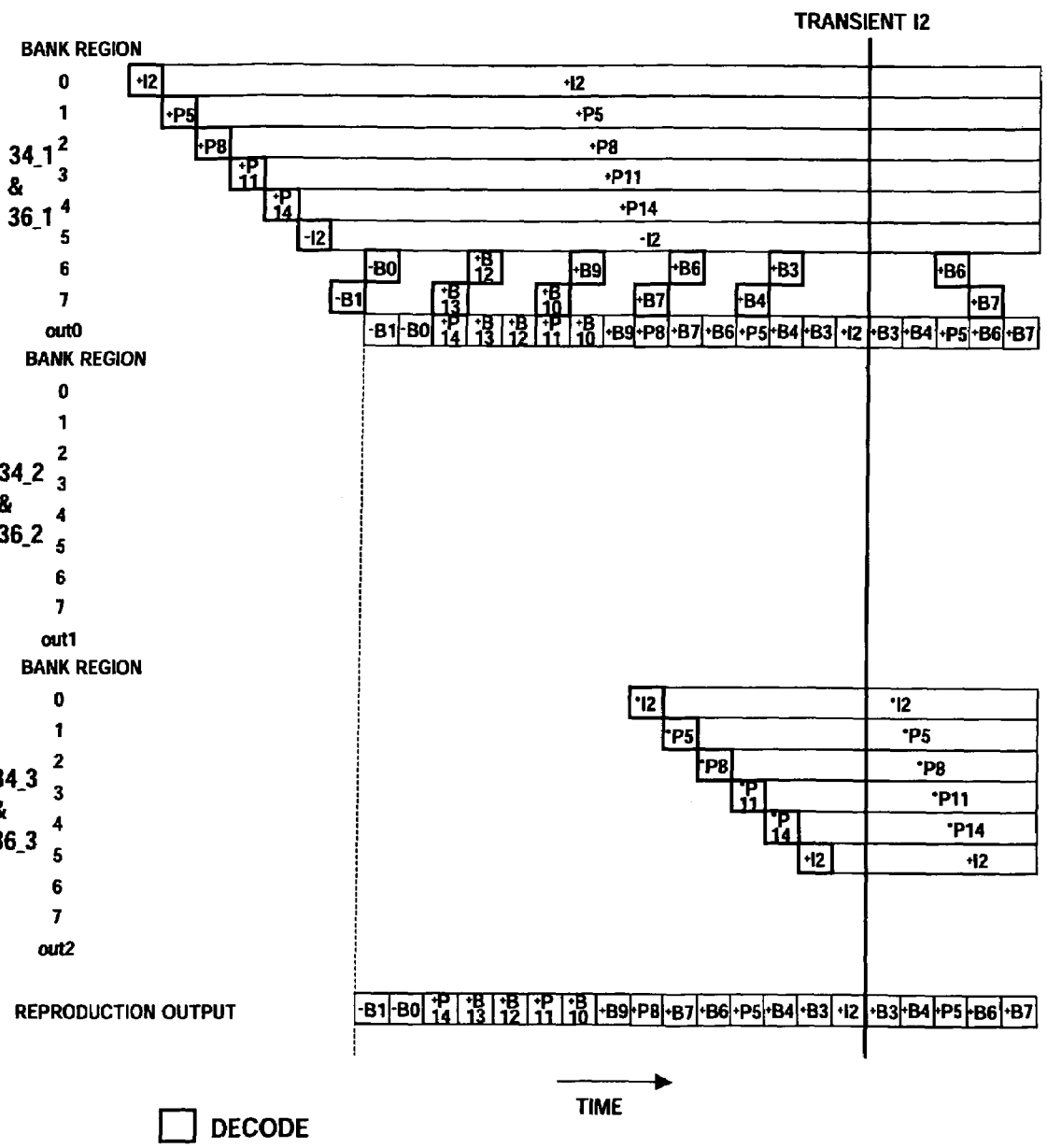
FIG. 22 is a view for explaining the operation of a reproduction apparatus in the case where a transient command occurs right after reproducing and outputting I2 picture data of the GOP(N+1) in reverse reproduction.

FIG. 22 is a diagram for explaining the operation of the reproduction apparatus 4 where a transient command is generated right after the reproduction and output of the I2 picture data of the GOP(N+1) in the reverse reproduction. The decoder 34_1 reads the decoding results of the B3 picture data of the GOP(N+1) from the reproduction memory 36_1 following the reproduction and output of the decoding results of the I2 picture data of the GOP(N+1) and reproduces and outputs it. Due to this, the transient reproduction can be performed without a time lag.

Figure 23:
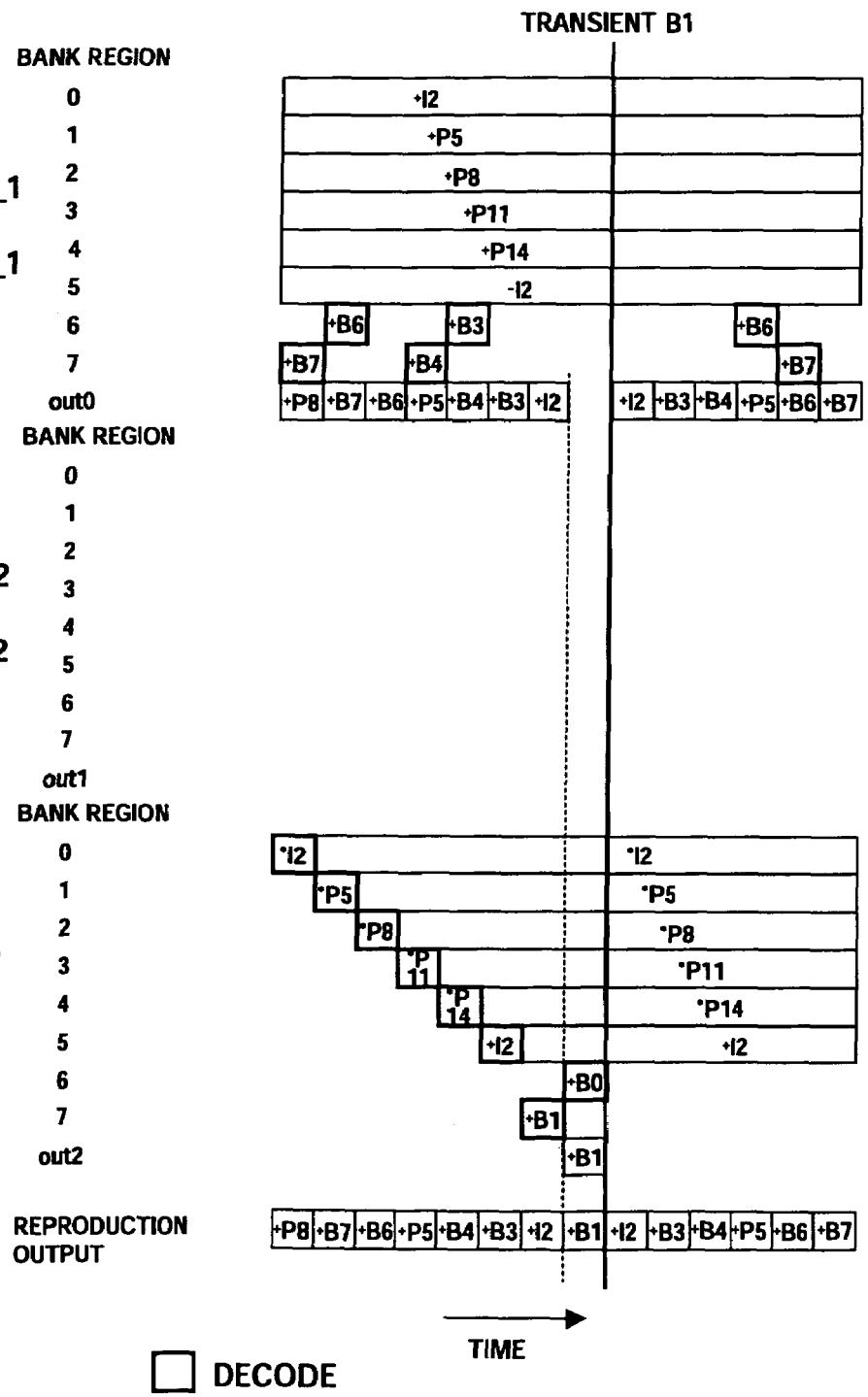
FIG. 23 is a view for explaining the operation of a reproduction apparatus in the case where a transient command occurs right after reproducing and outputting B1 picture data of the GOP(N+1) in reverse reproduction.

FIG. 23 is a diagram for explaining the operation of the reproduction apparatus 4 where a transient command is generated right after the reproduction and output of the B1 picture data of the GOP(N+1) in the reverse reproduction. The decoder 34_1 reads the decoding results of the I2 picture data of the GOP(N+1) from the reproduction memory 36_1 and reproduces and outputs it following the reproduction and output of the decoding results of the B1 picture data of the GOP(N+1) by the decoder 34_3. Due to this, the transient reproduction can be performed without a time lag.

Figure 24:
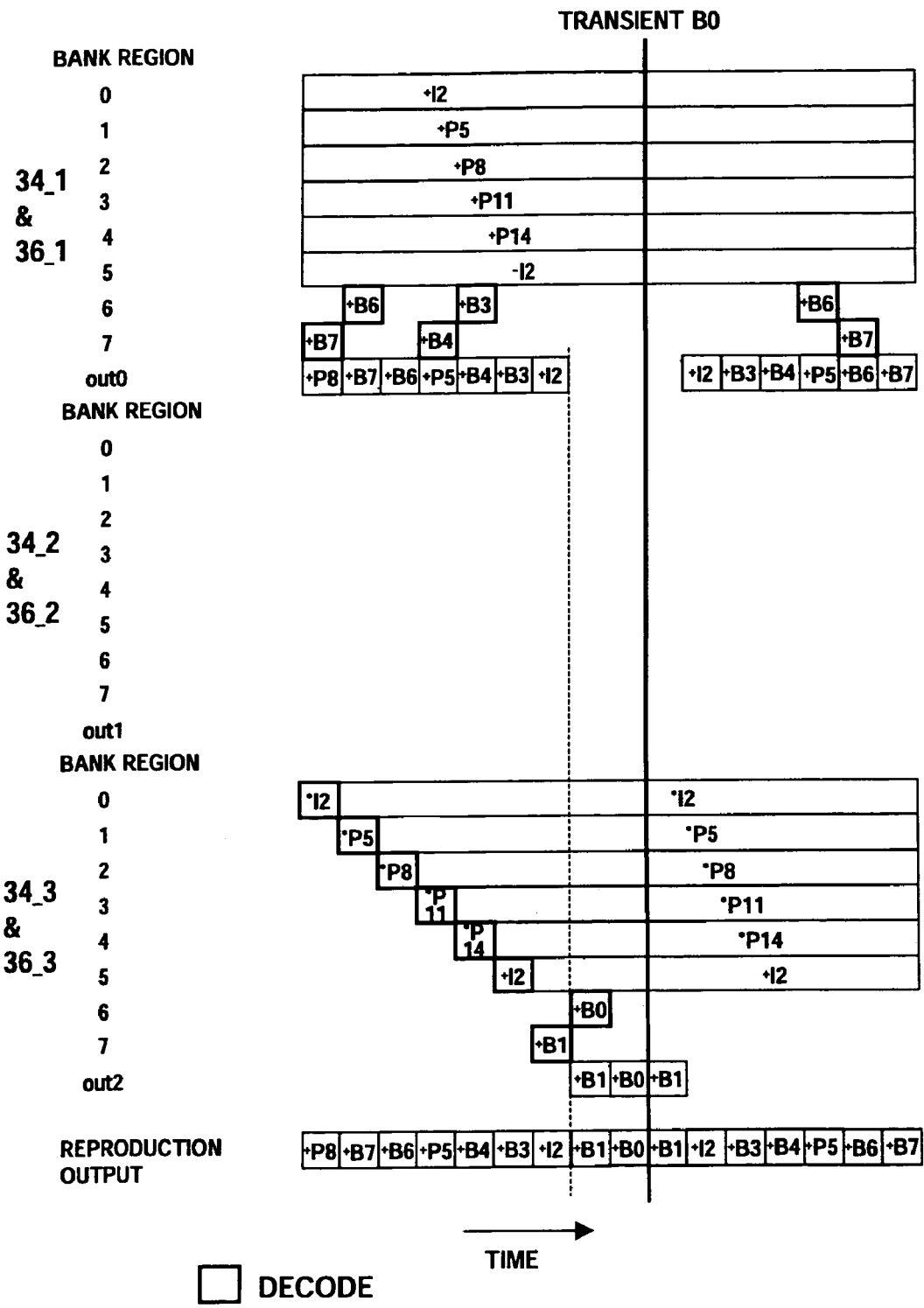
FIG. 24 is a view for explaining the operation of a reproduction apparatus in the case where a transient command occurs right after reproducing and outputting B0 picture data of the GOP(N+1) in reverse reproduction.

FIG. 24 is a diagram for explaining the operation of the reproduction apparatus 4 where a transient command is generated right after the reproduction and output of the B0 picture data of the GOP(N+1) in the reverse reproduction. The decoder 34_3 reads the decoding results of the B1 picture data of the GOP(N+1) from the reproduction memory 36_3 and reproduces and outputs it following the reproduction and output of the decoding results of the B0 picture data of the GOP(N+1) by the decoder 34_3. Due to this, the transient reproduction can be performed without a time lag.

Figure 25:
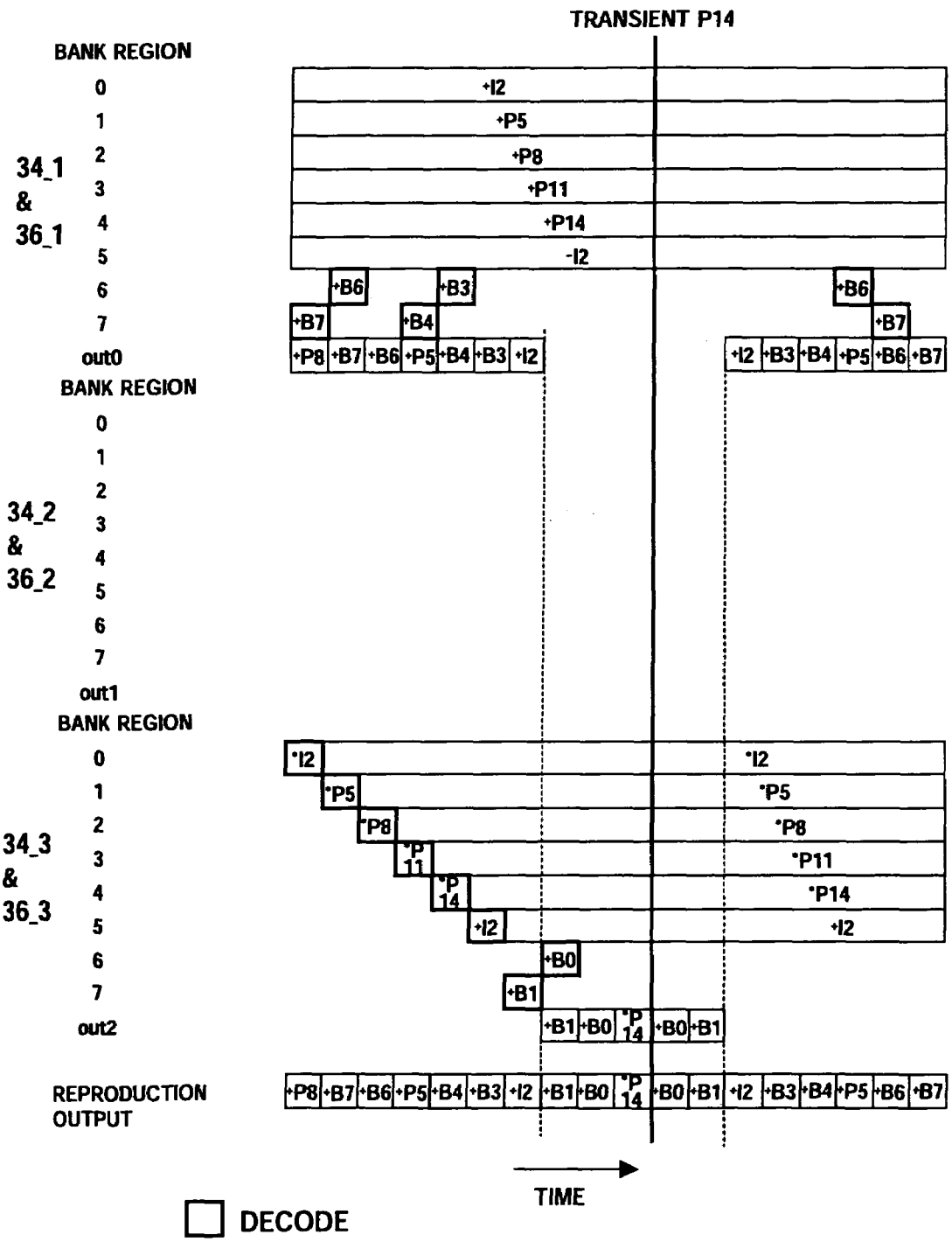
FIG. 25 is a view for explaining the operation of a reproduction apparatus in the case where a transient command occurs right after reproducing and outputting P14 picture data of the GOP(N) in reverse reproduction.

FIG. 25 is a diagram for explaining the operation of the reproduction apparatus 4 where a transient command is generated right after the reproduction and output of the P14 picture data of the GOP(N) in the reverse reproduction. The decoder 34_3 reads the decoding results of the B0 picture data of the GOP(N+1) from the reproduction memory 36_3 and reproduces and outputs it following the reproduction and output of the decoding results of the P14 picture data of the GOP(N) by the decoder 34_3. Due to this, the transient reproduction can be performed without a time lag.

Figure 26:
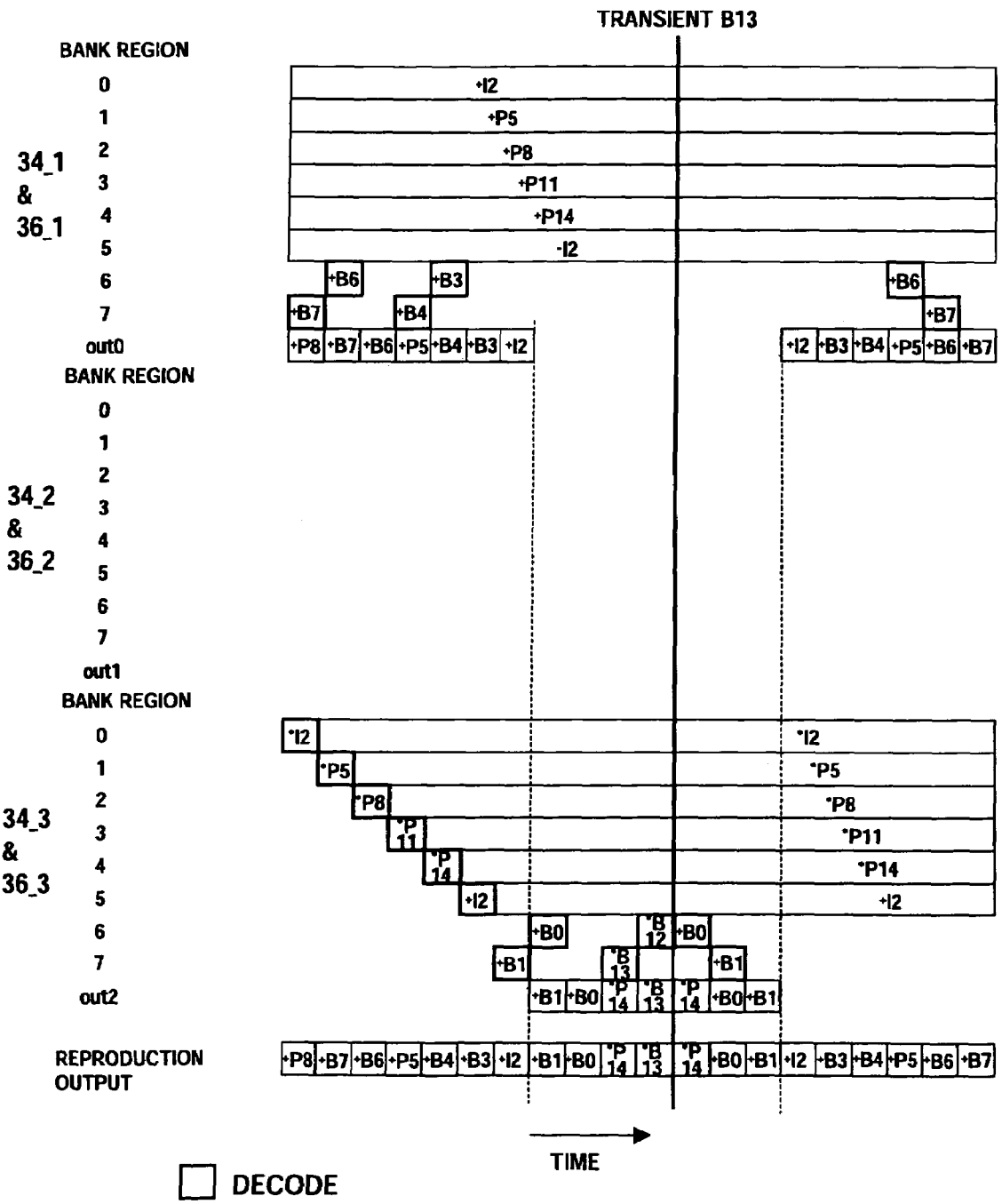
FIG. 26 is a view for explaining the operation of a reproduction apparatus in the case where a transient command occurs right after reproducing and outputting B13 picture data of the GOP(N) in reverse reproduction.

FIG. 26 is a diagram for explaining the operation of the reproduction apparatus 4 where a transient command is generated right after the reproduction and output of the B13 picture data of the GOP(N) in the reverse reproduction. The decoder 34_3 reads the decoding results of the P14 picture data of the GOP(N) from the reproduction memory 36_3 and reproduces and outputs it following the reproduction and output of the decoding results of the B13 picture data of the GOP(N) by the decoder 34_3. Due to this, the transient reproduction can be performed without a time lag.

Figure 27:
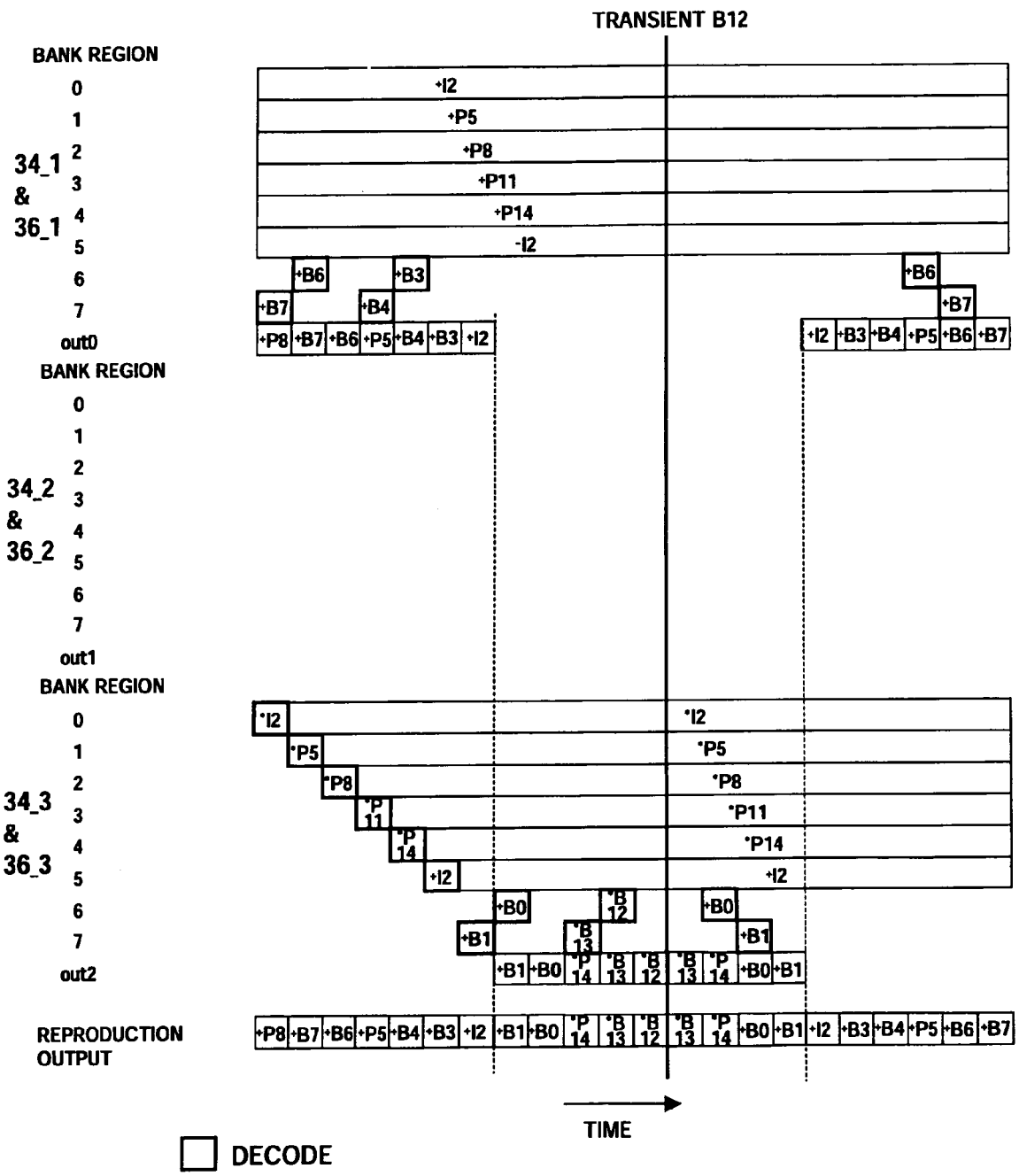
FIG. 27 is a view for explaining the operation of a reproduction apparatus in the case where a transient command occurs right after reproducing and outputting B12 picture data of the GOP(N) in reverse reproduction.

FIG. 27 is a diagram for explaining the operation of the reproduction apparatus 4 where a transient command is generated right after the reproduction and output of the B12 picture data of the GOP(N) in the reverse reproduction. The decoder 34_3 reads the decoding results of the B13 picture data of the GOP(N) from the reproduction memory 36_3 and reproduces and outputs it following the reproduction and output of the decoding results of the B12 picture data of the GOP(N) by the decoder 34_3. Due to this, the transient reproduction can be performed without a time lag.

Figure 28:
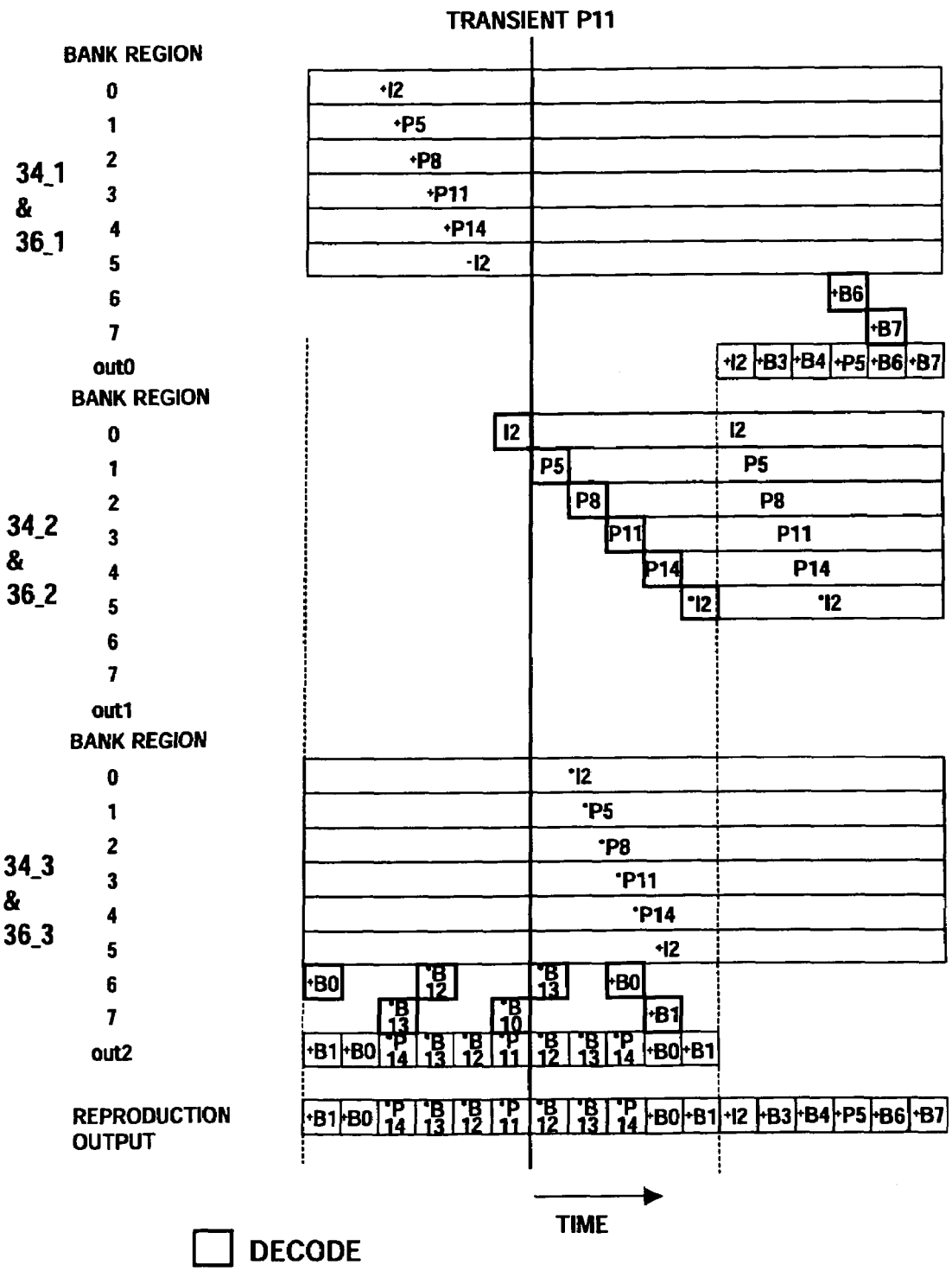
FIG. 28 is a view for explaining the operation of a reproduction apparatus in the case where a transient command occurs right after reproducing and outputting P11 picture data of the GOP(N) in reverse reproduction.

FIG. 28 is a diagram for explaining the operation of the reproduction apparatus 4 where a transient command is generated right after the reproduction and output of the P11 picture data of the GOP(N) in the reverse reproduction. The decoder 34_3 reads the decoding results of the B12 picture data of the GOP(N) from the reproduction memory 36_3 and reproduces and outputs it following the reproduction and output of the decoding results of the P11 picture data of the GOP(N) by the decoder 34_3. Due to this, the transient reproduction can be performed without a time lag. The decoder 34_3 decodes the B13 picture data of the GOP(N) read from the input memory 32 parallel to the reproduction and output and writes the decoding results into the reproduction memory 36_3.

SIXTH EXAMPLE OF OPERATION

Figure 29:
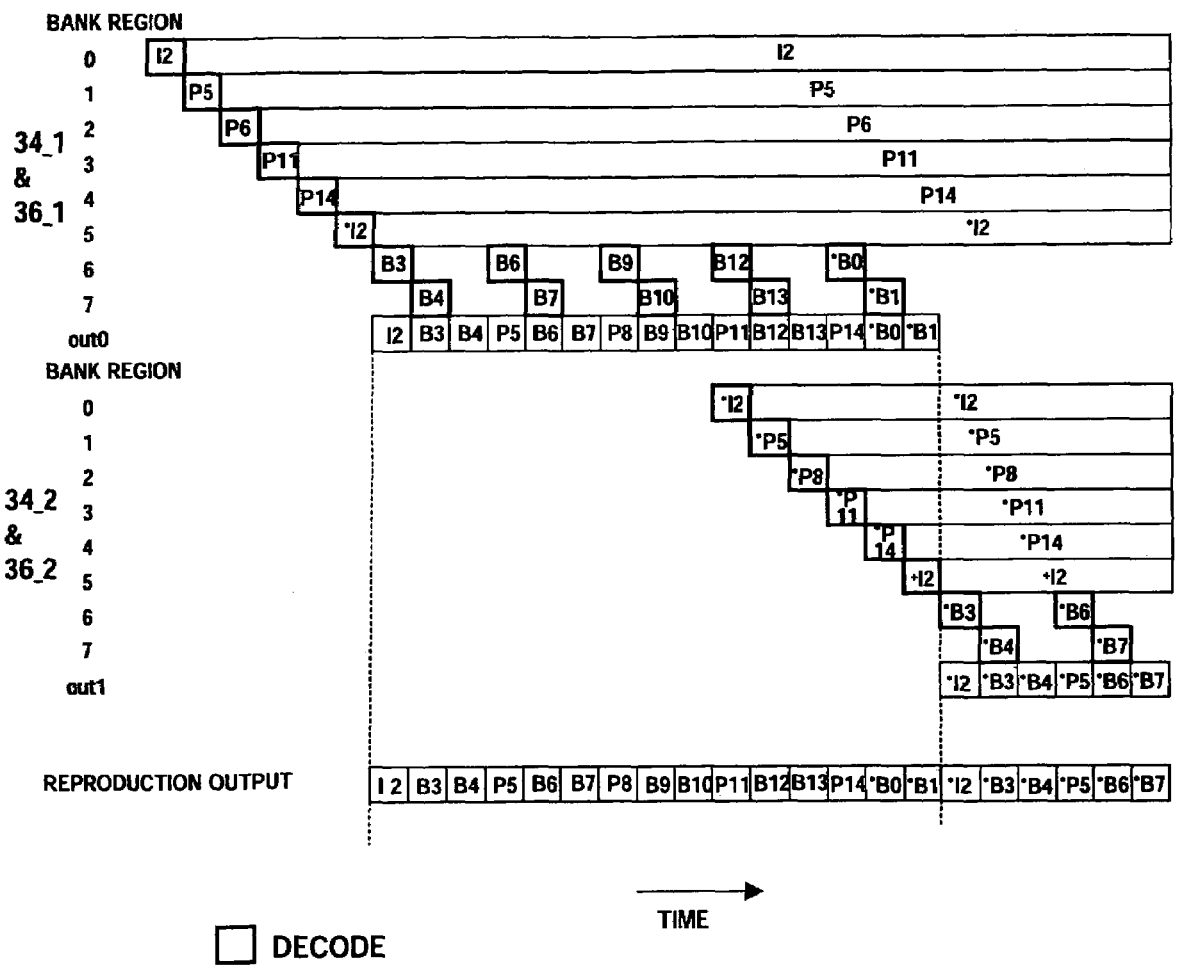
FIG. 29 is a view explaining the operation of the reproduction apparatus in the case where a transient command occurs after reproducing and outputting B13 picture data by forward reproduction the case of using only the decoders 34_1 and 34_2 shown in FIG. 1.
Figure 30:
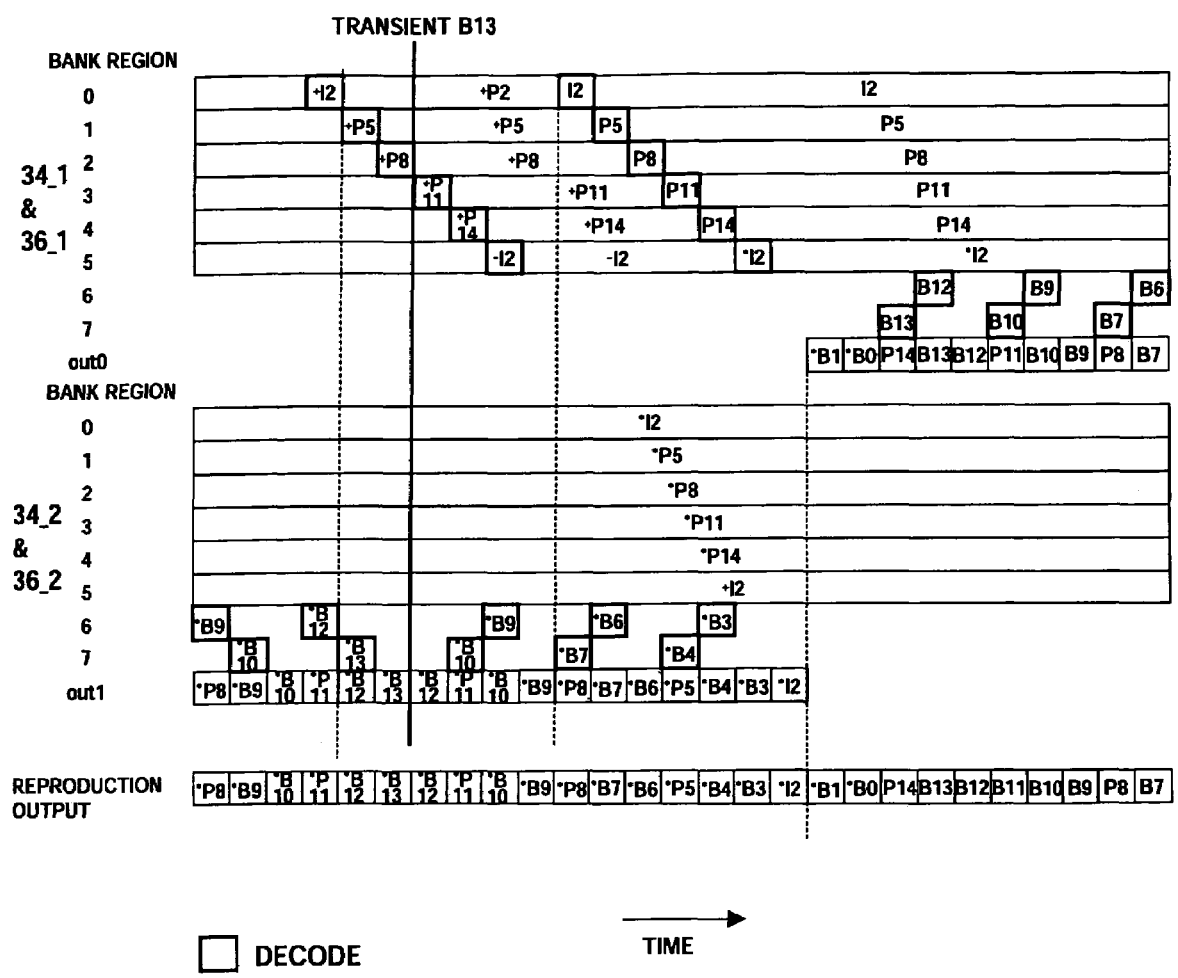
FIG. 30 is a view explaining the operation of the reproduction apparatus in the case where a transient command occurs after reproducing and outputting B13 picture data by forward reproduction the case of using only the decoders 34_1 and 34_2 shown in FIG. 1.

Below, an example of operation of the reproduction apparatus 4 where a transient command is generated during forward reproduction where only the decoders 34_1 and 34_2 shown in FIG. 1 are used will be explained. FIG. 29 and FIG. 30 are diagrams for explaining the operation of the reproduction apparatus 4 where a transient command is generated after the reproduction and output of the B13 picture data in the forward reproduction when using only the decoders 34_1 and 34_2 shown in FIG. 1. As shown in FIG. 29 and FIG. 30, in the example of operation, a transient command is generated after the decoder 34_2 reproduces and outputs the B13 picture data of the GOP(N), The decoder 34_2 reads the decoding results of the B12 picture data of the GOP(N) from the reproduction memory 36_2 and reproduces and outputs it.

As explained above, according to the data processing system 1, in the reproduction apparatus 4, as shown in FIG. 3 and FIG. 4, the decoding circuits 34_1 to 34_3 make the reproduction memories 36_1 to 36_3 hold the storage of the decoding results even when the decoding results stored in the reproduction memories 36_1 to 36_3 are no longer used when the reproduction is continued in the designated reproduction direction, and when the transient command is input, as explained by using FIG. 7 to FIG. 30, performs the decoding and the reproduction and output by using the decoding results already stored in the reproduction memories 36_1 to 36_3 before input of the transient command. That is, by utilizing the decoding results stored in the reproduction memories 36_1 to 36_3 without being cleared right after the generation of the transient command, the reproduction and output after reverse can be performed right after the generation of the transient command without the retransfer of the picture data (GOP) from the computer 2 to the reproduction apparatus 4. Further, according to the data processing system 1, there is no need to provide a large buffer memory for storing the decoding results after reproduction in order to perform the reproduction and output after reverse right after a transient command. This system can be accomplished by a small scale configuration.

The above effect is particularly remarkable when the amount of data is large, for example, the picture data is the HD (high definition) image, and where a long GOP having a large number of picture data in 1 GOP in comparison with the usual GOP is employed. That is, when the picture data is HD image, due to the generation of a transient, the penalty of retransfer the picture data from the computer 2 to the reproduction apparatus 4 is large. According to the data processing system 1, as explained above, when a transient is generated, the reproduction apparatus holds the picture data to be reproduced and output right after that, therefore there is no need to retransfer the picture data from the computer 2 to the reproduction apparatus 4. Further, in the picture data using the reference structure of I, P, B, and so on, a long time is taken until all picture data necessary for the decoding next by the transient are arranged. This tendency becomes strong particularly where a long GOP is employed. In the present embodiment, as explained above, by holding a plurality of picture data which become necessary right after the transient in the reproduction apparatus 4, there is no need to transfer the picture data right after the transient from the computer 2 to the reproduction apparatus.

Further, in the data processing system 1, the reproduction apparatus 4 writes the decoding results of the I and P picture data into the fixed bank regions of the reproduction memories 36_1 to 36_3, continuously holds this, and successively overwrites the decoding results of the B picture data. Due to this, the reproduction and output after reverse can be performed in a short time without much increasing the storage capacities of the reproduction memories 36_1 to 36_3.

Further, in the data processing system 1, the reproduction apparatus 4 performs the scheduling of the decoding in units of GOPs as explained at step ST8 of FIG. 5, but performs the decoding and reproduction and output of the picture data shown at steps ST9 to ST13 in units of picture data. Due to this, after the generation of a transient command, the reproduction and output after reverse can be quickly carried out in units of picture data.

Further, in the data processing system 1, the reproduction apparatus 4 assigns the decoding of the picture data decoded with reference to the decoding results of the same I and P picture data to the same decoder among the decoders 34_1 and 34_2 and 34_3. Due to this, the decoding results can be efficiently referred to.

Second Embodiment

Figure 31:
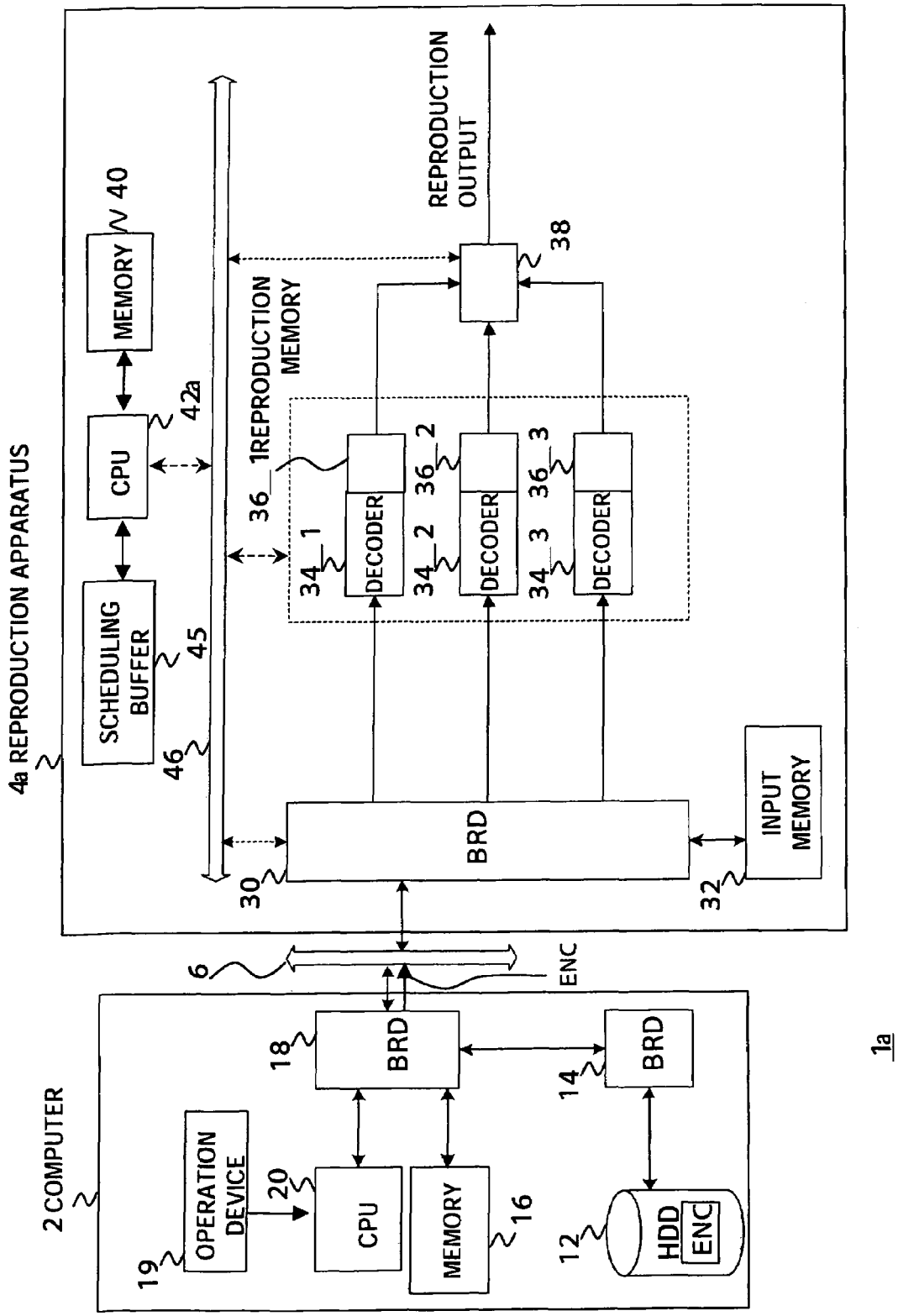
FIG. 31 is a view of the overall configuration of a data processing system according to a second embodiment of the present invention.

FIG. 31 is a view of the overall configuration of a data processing system 1a according to an embodiment of the present invention. As shown in FIG. 31, the data processing system 1a, for example, has a computer 2 and a reproduction apparatus 4a. The data processing system 1a in the reproduction apparatus 4a is characterized in the processing of scheduling the picture data to be decoded in the decoders 34_1 to 34_3 by using a scheduling buffer 45.

[Computer 2]

As shown in FIG. 31, the computer 2 has an HDD 12, a bridge 14, a memory 16, a bridge 18, an operation device 19, and a CPU 20. The computer 2 is the same as the computer 2 explained in the first embodiment.

[Reproduction Apparatus 4a]

As shown in FIG. 31, the reproduction apparatus 4a, for example, has a PCI bridge 30, an input memory 32, decoders 34_1 to 34_3, reproduction memories 36_1 to 36_3, a selector 38, a control memory 40, a CPU 42a, the scheduling buffer 45, and a control bus 46. The reproduction apparatus 4a is characterized in the CPU 42a and the scheduling buffer 45. In the reproduction apparatus 4a, the PCI bridge 30, the input memory 32, the decoders 34_1 to 34_3, the reproduction memories 36_1 to 36_3, the selector 38, and the control memory 40 assigned the same reference numerals as those in FIG. 1 are basically the same as those explained in the first embodiment. Note that the control memory 40 stores a predetermined program (program of the present invention), and the CPU 42 reads and executes the program to perform the following processing. The predetermined program may be stored in a semiconductor memory or other control memory 40 or may be stored on an HDD, optical disk, or other storage medium.

Figure 32:
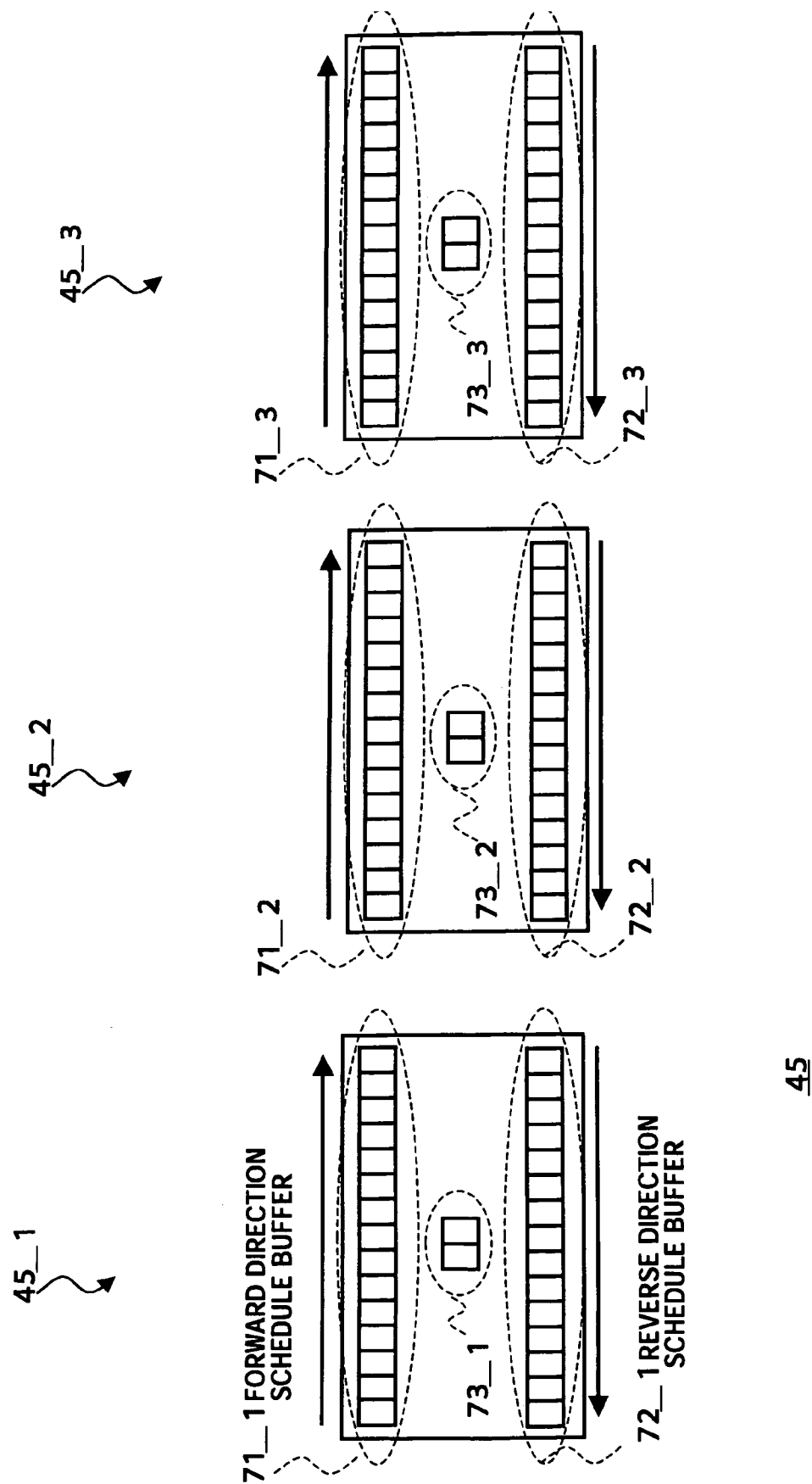
FIG. 32 is a view for explaining a scheduling buffer shown in FIG. 31.
Figure 34:
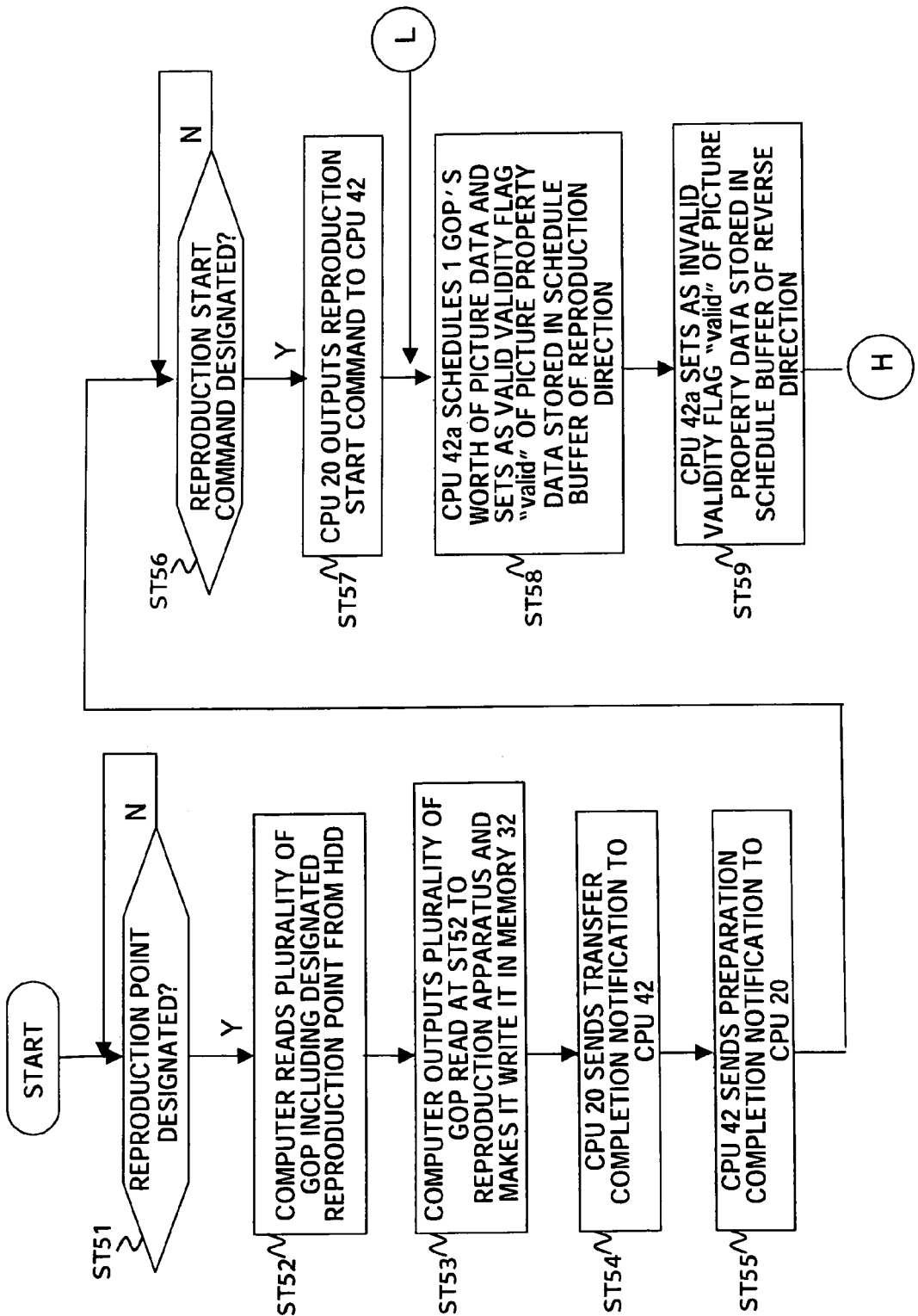
FIG. 34 is a flow chart explaining an example of the operation of the data processing system shown in FIG. 31.
Figure 35:
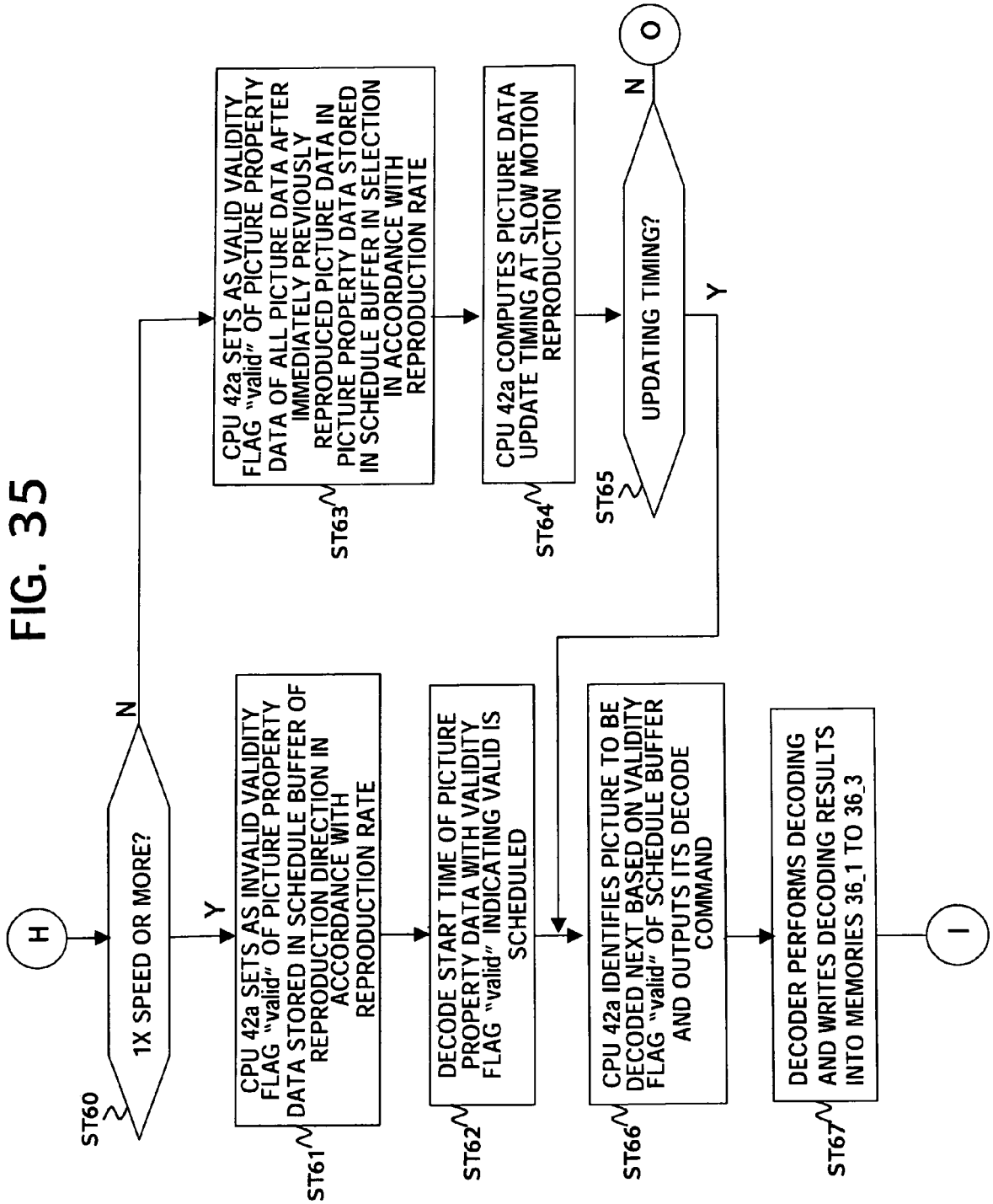
FIG. 35 is a flow chart following FIG. 34 explaining an example of the operation of the data processing system shown in FIG. 31.
Figure 36:
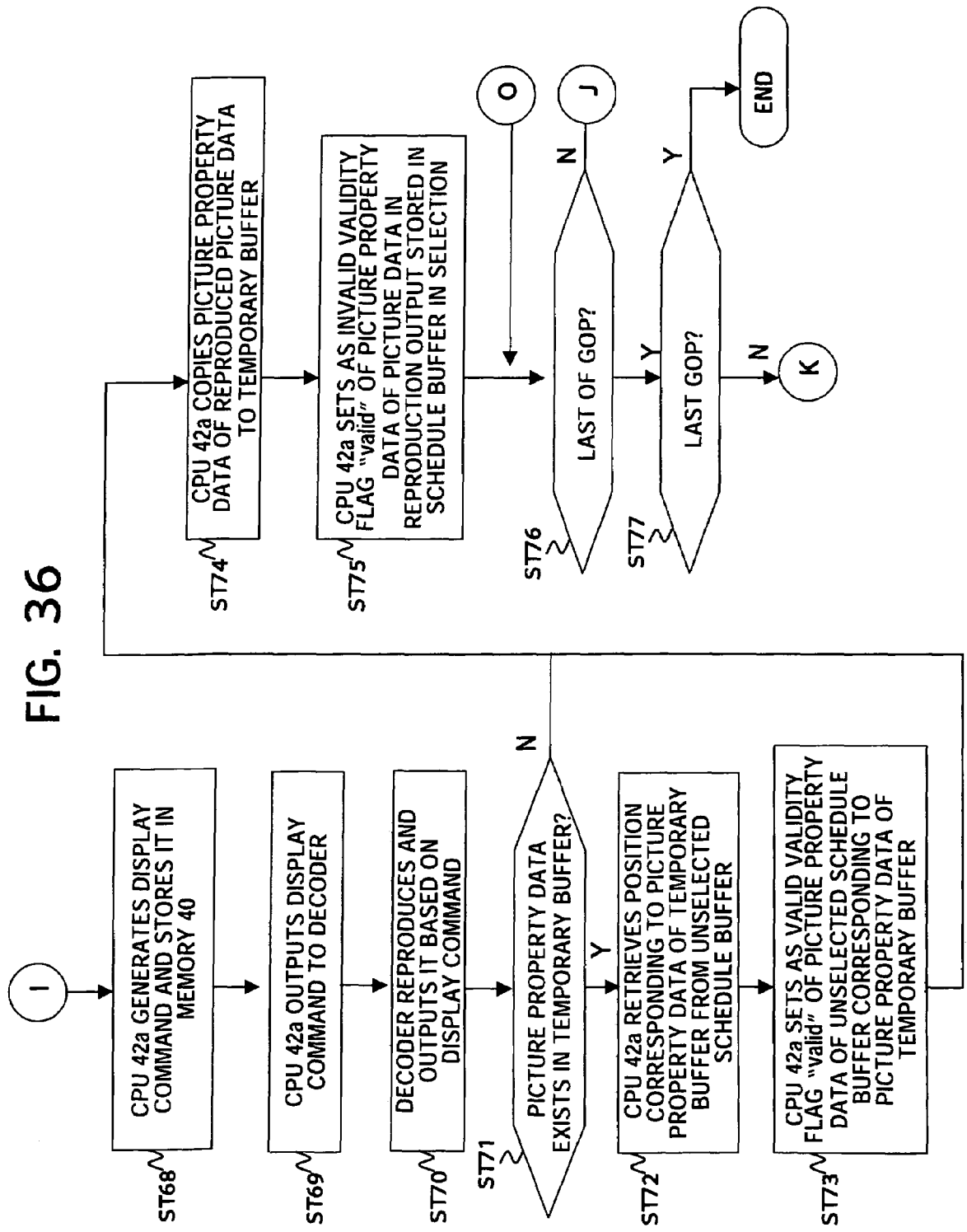
FIG. 36 is a flow chart following FIG. 35 explaining an example of the operation of the data processing system shown in FIG. 31.
Figure 37:
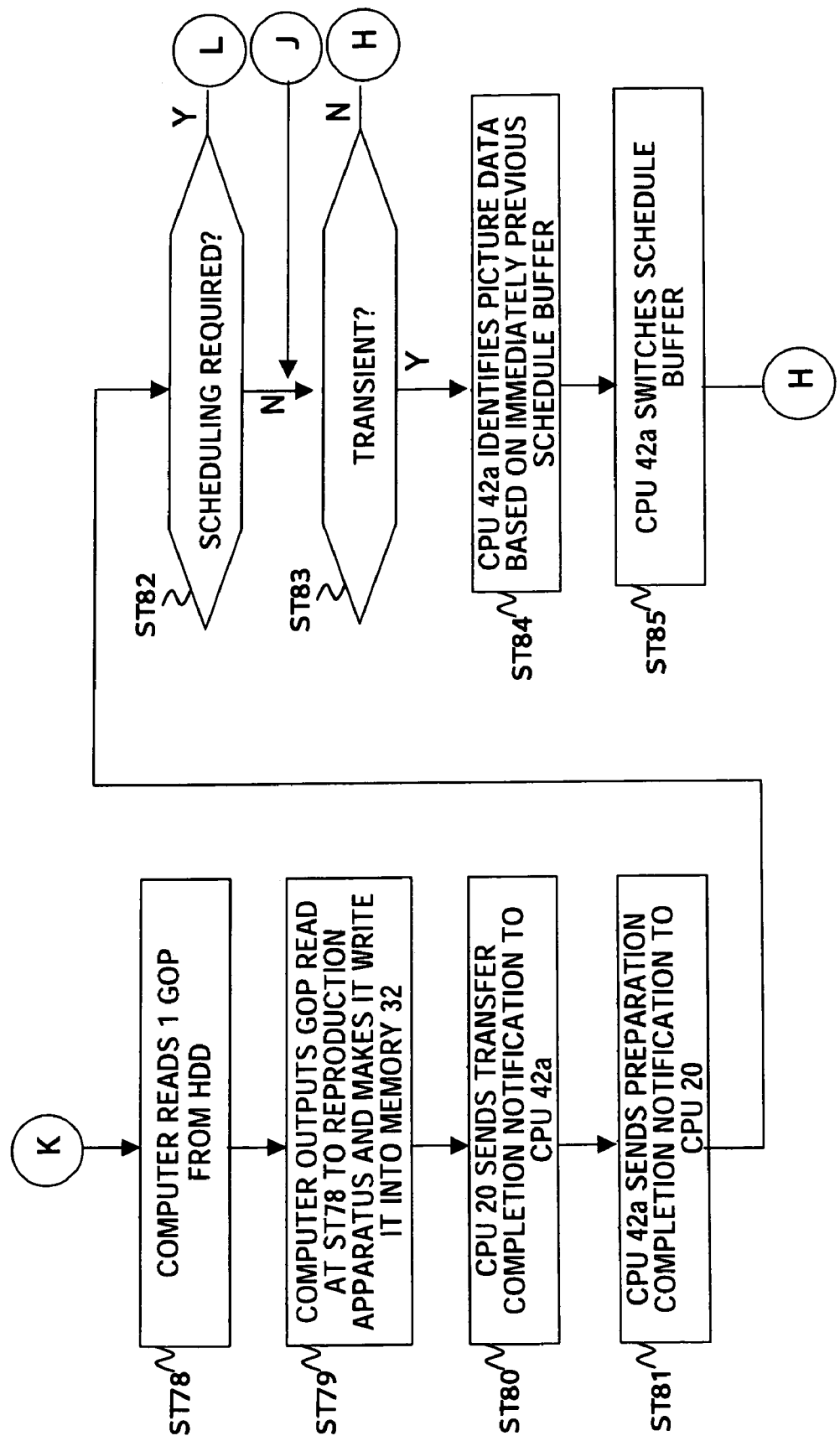
FIG. 37 is a flow chart following FIG. 35 explaining an example of the operation of the data processing system shown in FIG. 31.

FIG. 32 is a diagram for explaining the scheduling buffer 45. As shown in FIG. 32, the scheduling buffer 45 for example has three scheduling buffer 45_1, 45_2, and 45_3. The scheduling buffer 45_1 is used for managing the picture data to be decoded in the decoder 34_1 shown in FIG. 31 and has a forward direction scheduling buffer 71_1, a reverse direction scheduling buffer 72_1, and a temporary buffer 73_1. The scheduling buffer 45_2 is used for managing the picture data to be decoded in the decoder 34_2 shown in FIG. 31 and has a forward direction scheduling buffer 71_2, a reverse direction scheduling buffer 72_2, and a temporary buffer 73_2. The scheduling buffer 45_3 is used for managing the picture data to be decoded in the decoder 34_3 shown in FIG. 31 and has a forward direction scheduling buffer 71_3, a reverse direction scheduling buffer 72_3, and a temporary buffer 73_3. Here, each of the forward direction scheduling buffers 71_1, 71_2, and 71_3 is an example of the first control storage means of the present invention, and the reverse direction scheduling buffer 72_1, 72_2, and 72_3 are examples of the second control storage means of the present invention.

Each of the forward direction scheduling buffers 71_1, 71_2, and 71_3 and the reverse direction scheduling buffers 72_1, 72_2, and 72_3 stores picture property data PP concerning the picture data stored in the input memory 32 and to be output to each of the decoders 34_1 to 34_3 in the order of the decoding. The forward direction scheduling buffers 71_1, 71_2, and 71_3 for example have a FIFO (First In First Out) structure and are the same in the order of writing of the picture property data PP and the order of reading of the picture property data PP at the time of the scheduling. From the reverse direction scheduling buffers 72_1, 72_2, and 72_3, for example, the picture property data PP are read from the reverse order to the order of writing the picture property data PP. For example, the CPU 42a, in the example of FIG. 38, writes the picture property data PP into the forward direction scheduling buffers 71_1, 71_2, and 71_3 and the reverse direction scheduling buffers 72_1, 72_2, and 72_3 in order from the picture property data PP of the picture data "B0" toward the picture property data PP of the picture data "P14". Then, the CPU 42a, for the forward direction scheduling buffers 71_1, 71_2, and 71_3, reads the picture property data PP in order from the picture property data PP of the picture data "B0" toward the picture property data PP of the picture data "P14" at the time of the scheduling. Further, the CPU 42a, for the reverse direction scheduling buffers 72_1, 72_2, and 72_3, reads the picture property data PP in order from the picture property data PP of the picture data "P14" toward the picture property data PP of the picture data "B0" at the time of the scheduling.

The temporary buffers 73_1 to 73_3 are buffer memories of the depth 2.

FIG. 33 is a view for explaining the format of picture property data PP. As shown in FIG. 33, the picture property data PP has a pointer data (curp) to the banks of the reproduction memories 36_1 to 36_3 for writing decoding results of the picture data corresponding to that, pointer data (fore_p) to the banks of the reproduction memories 36_1 to 36_3 storing the forward direction predicted image (picture data) used for the decoding, pointer data (back_p) to the banks of the reproduction memories 36_1 to 36_3 storing the reverse direction predicted image (picture data) used for the decoding, the number of the GOP as the decoding target, a time when the decoding (reproduction) is started, and a validity flag data ("valid") indicating presence/absence of the decoding.

FIG. 34 to FIG. 37 are flow charts for explaining an example of operation of the data processing system 1a shown in FIG. 31. The CPU 42a determines the picture data read from the input memory 32 and decoded in the decoders 34_1 to 34_3 based on the validity flag data "valid" of the picture property data PP stored in the scheduling buffers 45_1, 45_2, and 45_3 shown in FIG. 32 with the routines shown in FIG. 34 to FIG. 37.

FIG. 38 to FIG. 49 are diagrams for explaining a method for determining the picture data to be decoded in the decoders 34_1 to 34_3 by the CPU 42a of the reproduction apparatus 4a by performing the scheduling by using the scheduling buffers 45_1 to 45_3. FIG. 38 to FIG. 46 are diagrams for explaining a case where the reproduction apparatus 4a uses reverse direction scheduling buffers 72_1, 72_2, and 72_3 able to read data in the reverse order of the order of writing. On the other hand, in the technique shown in FIG. 47 to FIG. 49, the case where the reverse direction scheduling buffers 72_1, 72_2, and 72_3 able to read data in only one direction will be explained.

Figure 38:
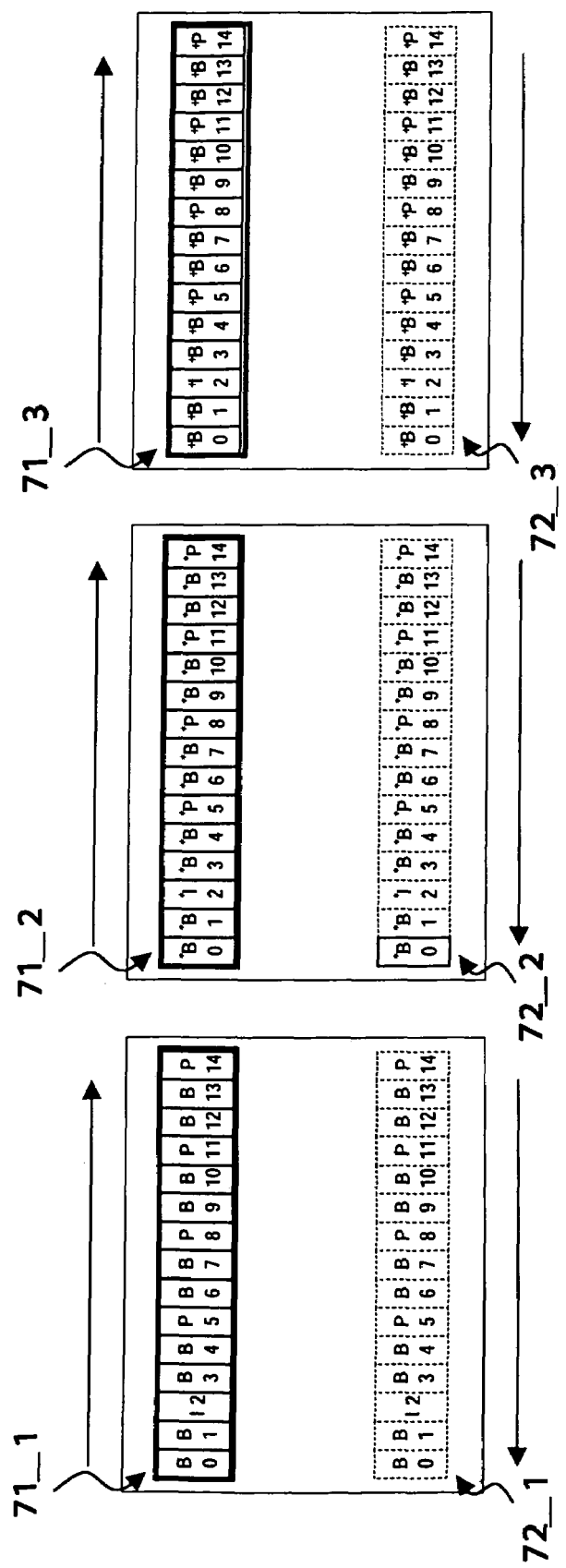
FIG. 38 is a view for explaining a method of use of a scheduling buffer in the case where a transient command occurs while the reproduction apparatus shown in FIG. 31 is engaged in 1× speed reproduction in the forward direction.
Figure 39:
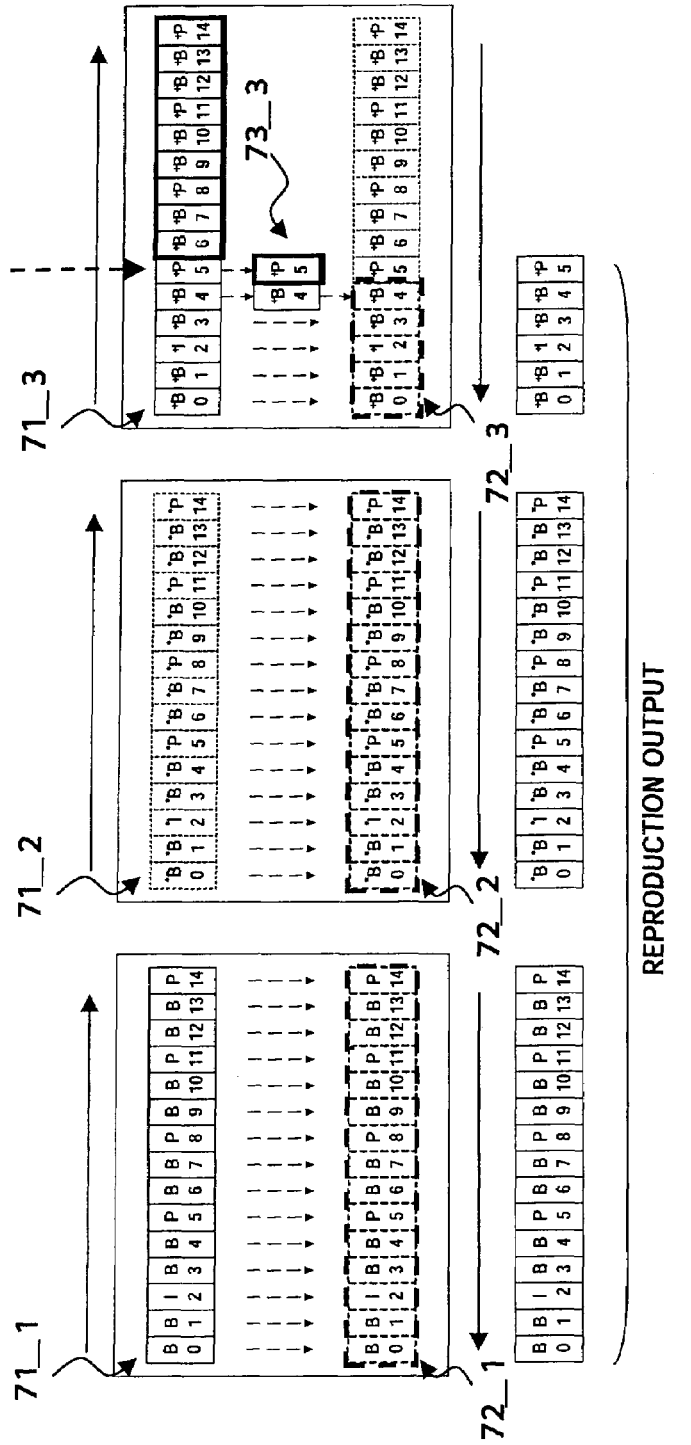
FIG. 39 is a view following FIG. 38 for explaining a method of use of a scheduling buffer in the case where a transient command occurs while the reproduction apparatus shown in FIG. 31 is engaged in 1× speed reproduction in the forward direction.
Figure 40:
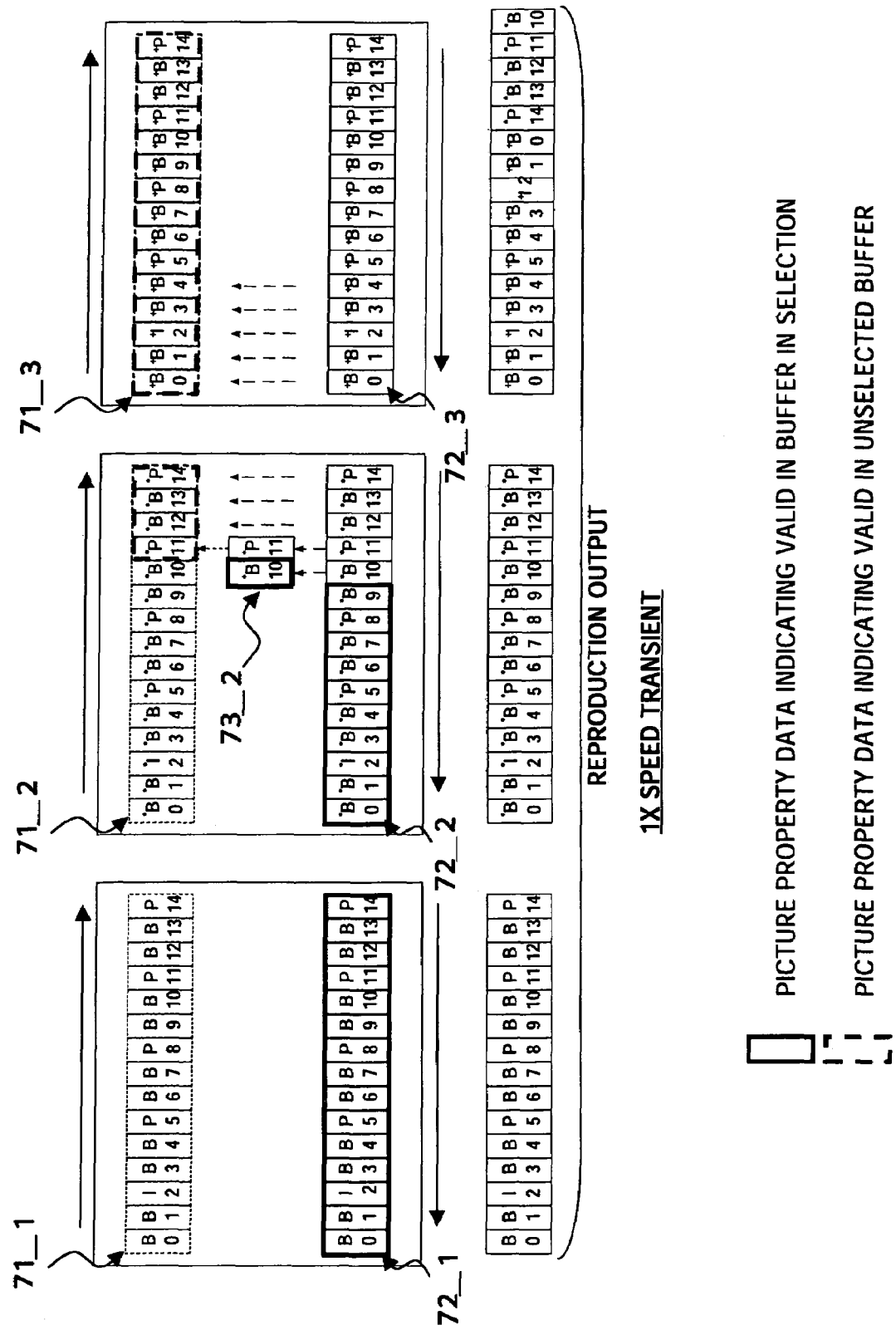
FIG. 40 is a view following FIG. 39 for explaining a method of use of a scheduling buffer in the case where a transient command occurs while the reproduction apparatus shown in FIG. 31 is engaged in 1× speed reproduction in the forward direction.

First, the technique of FIG. 38 to FIG. 46 will be explained. FIG. 38 to FIG. 40 are diagrams for explaining a method of use of the scheduling buffers 45_1 to 45_3 where a transient command is generated during reproduction by the reproduction apparatus 4a in the forward direction at 1× speed. Note that, in FIG. 38 to FIG. 49, among the forward direction scheduling buffers 71_1, 71_2, and 71_3 and the reverse direction scheduling buffers 72_1, 72_2, and 72_3, buffers indicated by solid lines are buffers selected in accordance with the reproduction direction. Further, the validity flag data "valid" of the picture property data PP surrounded by the bold solid line and the bold dotted line indicate validity, and the validity flag data "valid" of the picture property data PP surrounded by the thin solid line and the thin dotted line indicate invalidity.

The CPU 42a makes the decoders 34_1 to 34_3 decode the picture data corresponding to that indicated as valid by the validity flag data "valid" among the picture property data PP read in order from the left direction in the figure of the forward direction scheduling buffers 71_1, 71_2, and 71_3 in the forward direction reproduction. The CPU 42a makes the decoders 34_1 to 34_3 decode the picture data corresponding to that indicated as valid by the validity flag data "valid" among the picture property data PP read in order from the left-right direction in the figure of the reverse direction scheduling buffers 72_1, 72_2, and 72_3 in the reverse direction reproduction.

Below, the method of the forward direction scheduling buffers 71_1, 71_2, and 71_3 and reverse direction scheduling buffers 72_1, 72_2, and 72_3 in FIG. 38 to FIG. 40 will be briefly explained. Details will be explained later by using FIG. 34 to FIG. 37. In FIG. 38 to FIG. 40, the CPU 42a of the reproduction apparatus 4a performs the reproduction in the forward direction at the 1× speed based on the validity flag data "valid" of the picture property data PP stored in the forward direction scheduling buffers 71_1, 71_2, and 71_3 from the initial state shown in FIG. 38 and receives as input the transient command during the reproduction of the picture data "+P5" shown in FIG. 39. Then, the CPU 42a switches to the reverse direction reproduction, and as shown in FIG. 40, performs the reproduction in the reverse direction at the 1× speed based on the validity flag data "valid" of the picture property data PP stored in the reverse direction scheduling buffers 72_1, 72_2, and 72_3. In FIG. 38 to FIG. 40, because of the 1× speed reproduction, the validity flag data "valid" of all picture property data PP stored on the reproduction direction side of each of the forward direction scheduling buffers 71_1, 71_2, and 71_3 and reverse direction scheduling buffers 72_1, 72_2, and 72_3 indicate validity.

Figure 41:
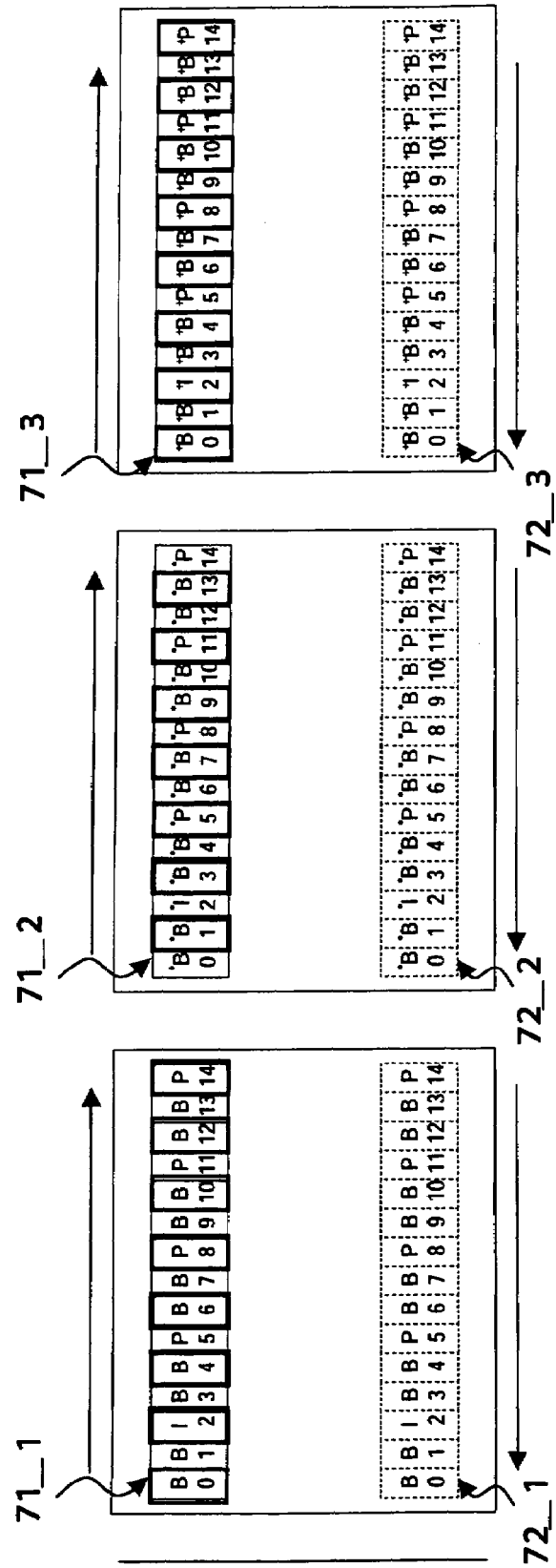
FIG. 41 is a view for explaining a method of use of a scheduling buffer in the case where a transient command occurs while the reproduction apparatus shown in FIG. 31 is engaged in 2× speed reproduction in the forward direction.
Figure 42:
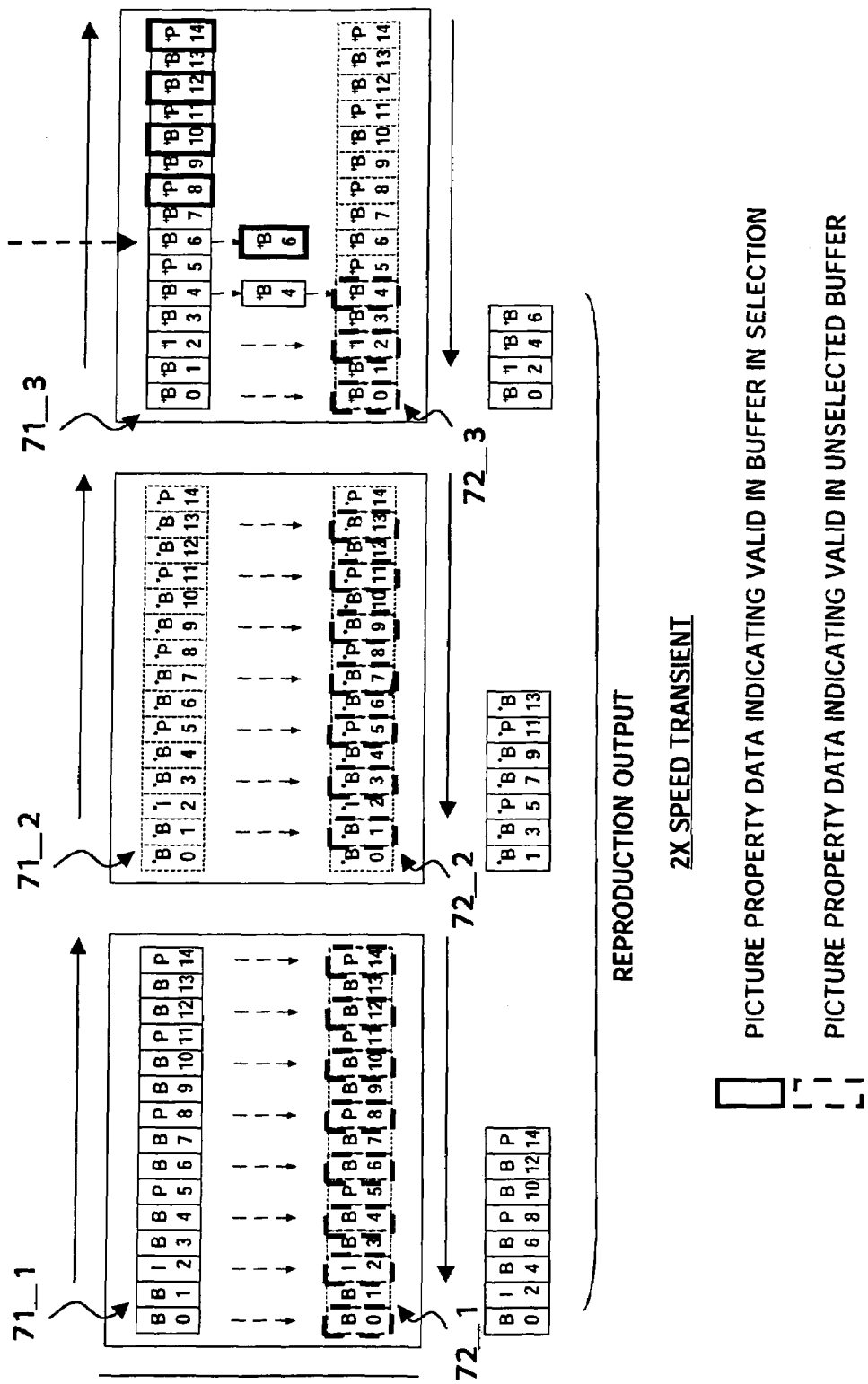
FIG. 42 is a view following FIG. 41 for explaining a method of use of a scheduling buffer in the case where a transient command occurs while the reproduction apparatus shown in FIG. 31 is engaged in 2× speed reproduction in the forward direction.
Figure 43:
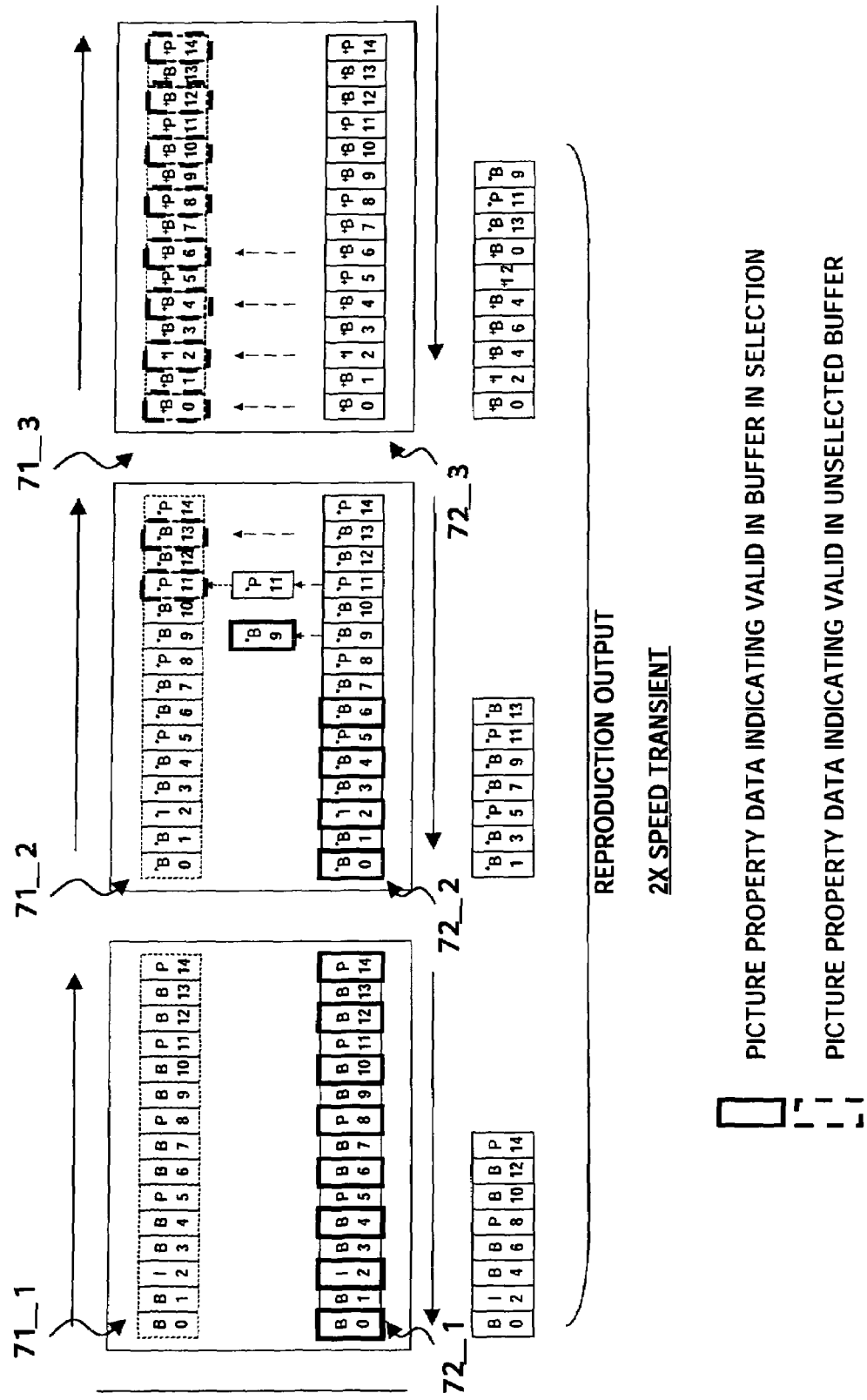
FIG. 43 is a view following FIG. 42 for explaining a method of use of a scheduling buffer in the case where a transient command occurs while the reproduction apparatus shown in FIG. 31 is engaged in 2× speed reproduction in the forward direction.

In FIG. 41 to FIG. 43, the CPU 42a of the reproduction apparatus 4a performs the reproduction in the forward direction at the 2× speed based on the validity flag data "valid" of the picture property data PP stored in the forward direction scheduling buffers 71_1, 71_2, and 71_3 from the initial state shown in FIG. 41 and receives as input the transient command during the reproduction of the picture data "+B6" shown in FIG. 42. Then, the CPU 42a switches to the reverse direction reproduction, and as shown in FIG. 43, performs the reproduction in the reverse direction at the 2× speed based on the validity flag data "valid" of the picture property data PP stored in the reverse direction scheduling buffers 72_1, 72_2, and 72_3.

In FIG. 41 to FIG. 43, because of the 2× speed reproduction, every other validity flag data "valid" of the picture property data PP stored on the side of the reproduction direction corresponding to each of the forward direction scheduling buffers 71_1, 71_2, and 71_3 and reverse direction scheduling buffers 72_1, 72_2, and 72_3 indicates validity.

Figure 44:
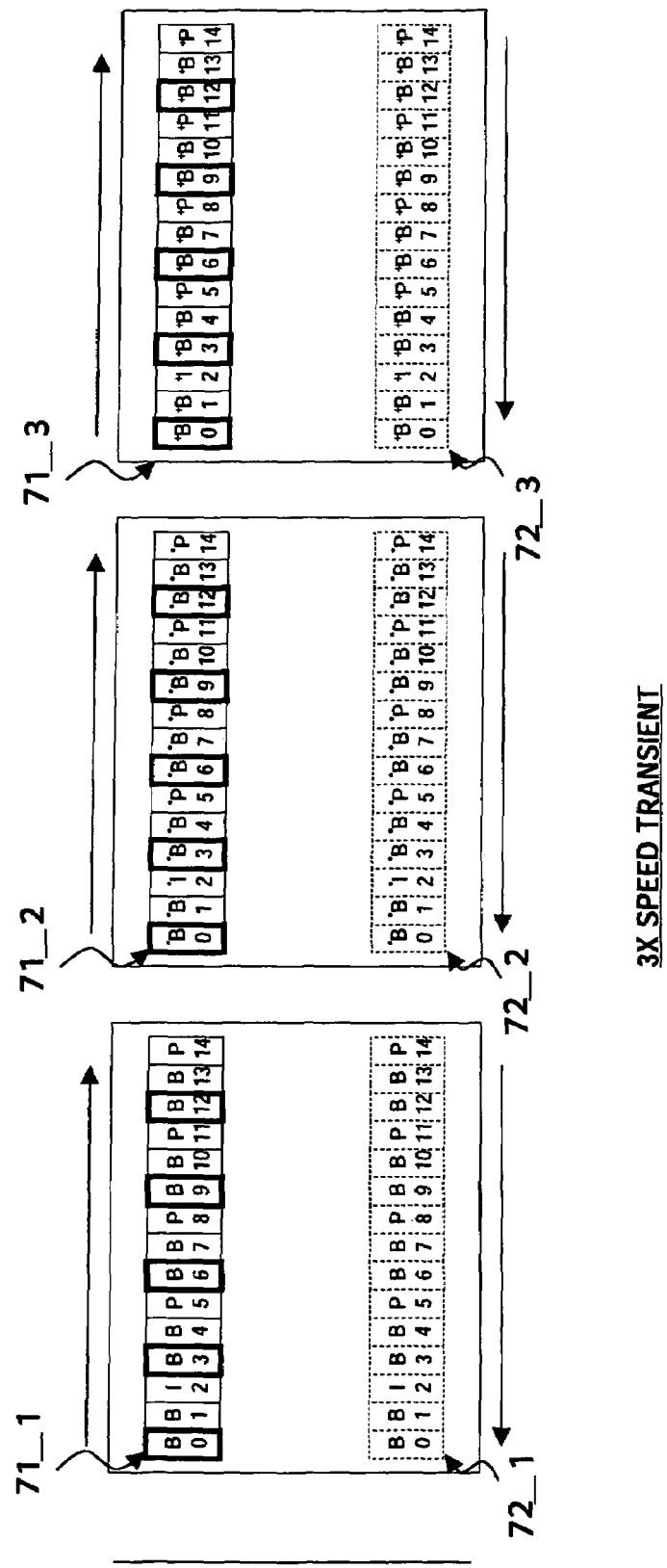
FIG. 44 is a view for explaining a method of use of a scheduling buffer in the case where a transient command occurs while the reproduction apparatus shown in FIG. 31 is engaged in 3× speed reproduction in the forward direction.
Figure 45:
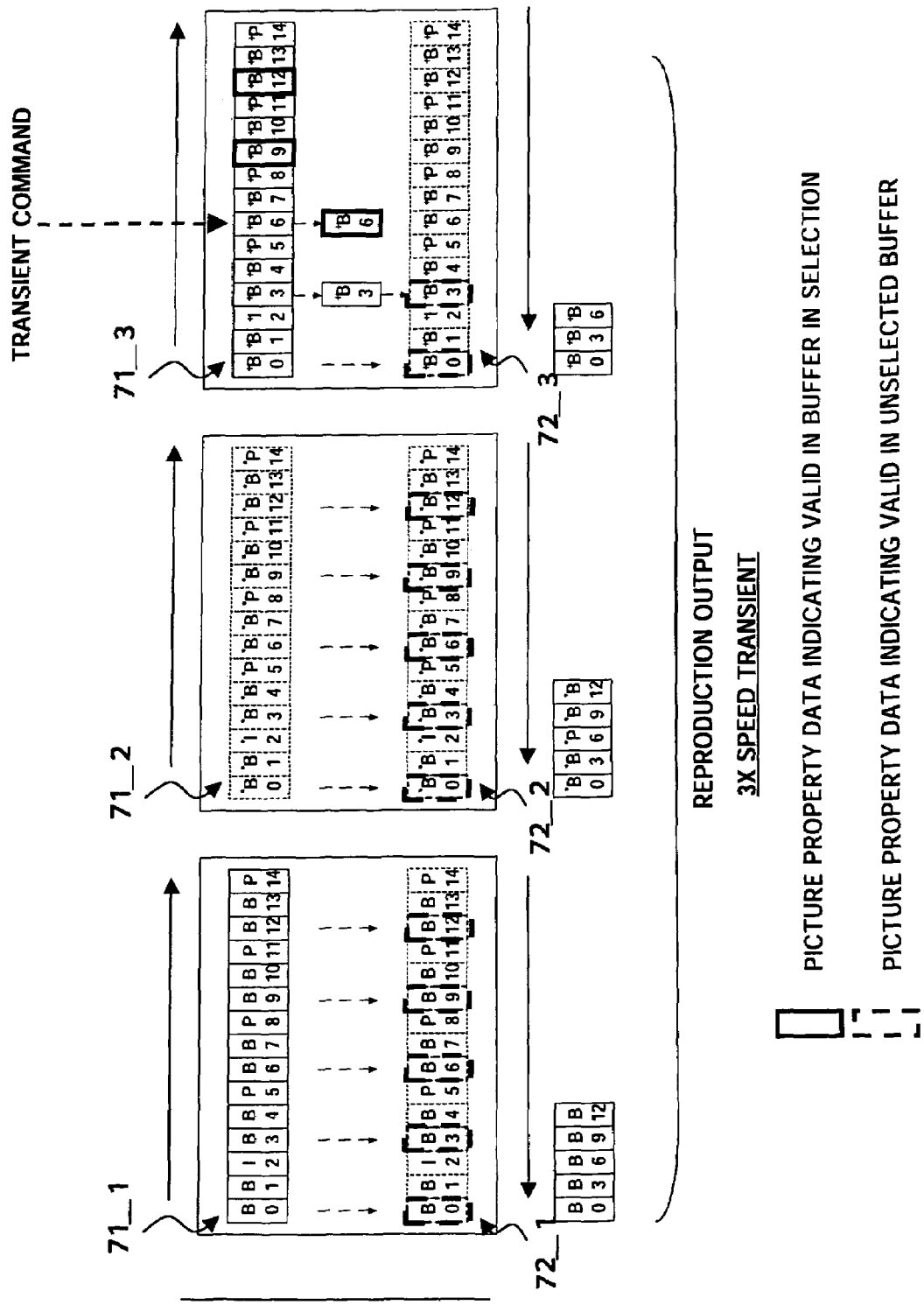
FIG. 45 is a view following FIG. 44 for explaining a method of use of a scheduling buffer in the case where a transient command occurs while the reproduction apparatus shown in FIG. 31 is engaged in 3× speed reproduction in the forward direction.
Figure 46:
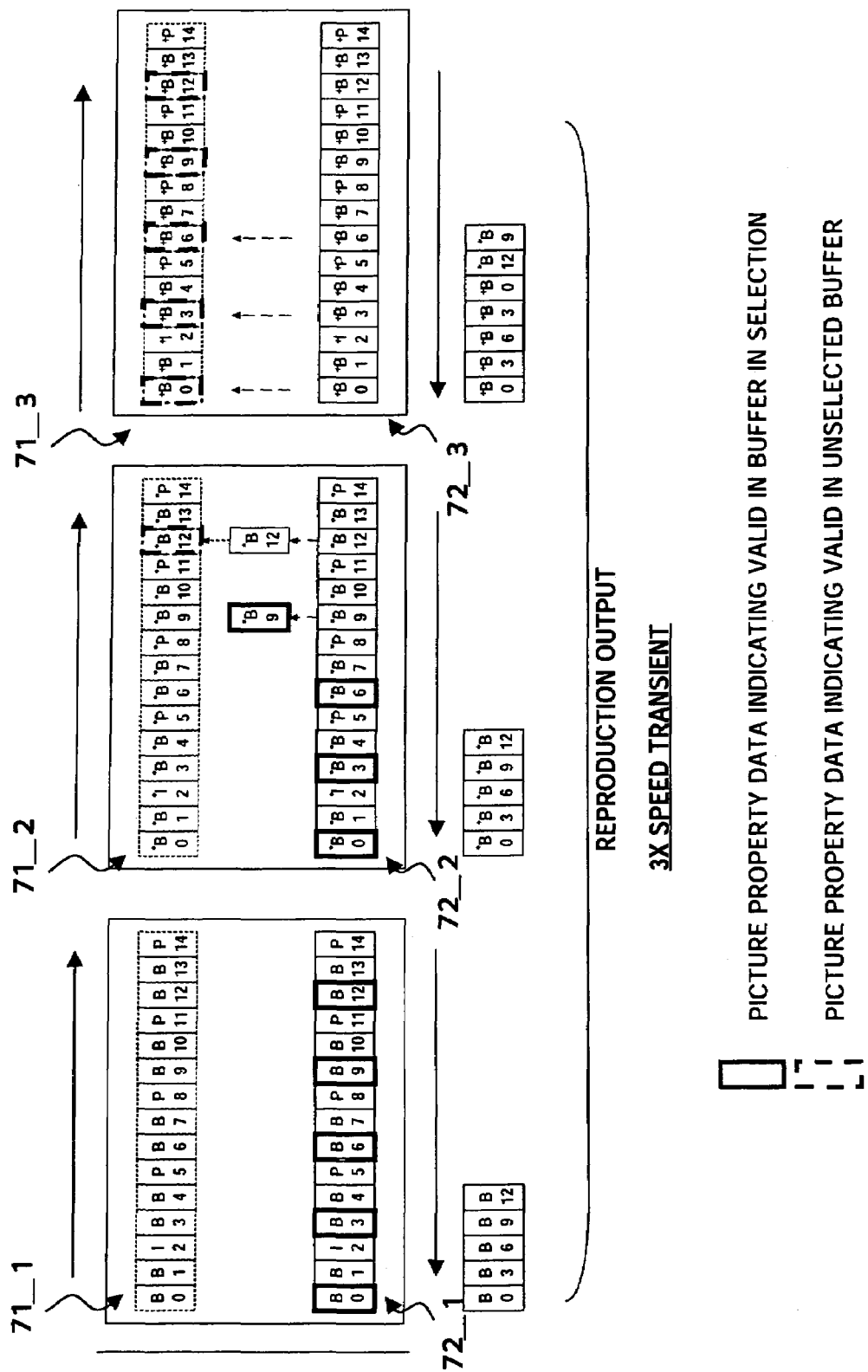
FIG. 46 is a view following FIG. 45 for explaining a method of use of a scheduling buffer in the case where a transient command occurs while the reproduction apparatus shown in FIG. 31 is engaged in 3× speed reproduction in the forward direction.

In FIG. 44 to FIG. 46, the CPU 42a of the reproduction apparatus 4a performs the reproduction in the forward direction at the 3× speed based on the validity flag data "valid" of the picture property data PP stored in the forward direction scheduling buffers 71_1, 71_2, and 71_3 from the initial state shown in FIG. 44 and receives as input the transient command during the reproduction of the picture data "+B6" shown in FIG. 45. Then, the CPU 42a switches to the reverse direction reproduction, and as shown in FIG. 46, performs the reproduction in the reverse direction at the 3× speed based on the validity flag data "valid" of the picture property data PP stored in the reverse direction scheduling buffers 72_1, 72_2, and 72_3. In FIG. 44 to FIG. 46, because of the 3× speed reproduction, every two other validity flag data "valid" of the picture property data PP stored on the side of the reproduction direction of each of the forward direction scheduling buffers 71_1, 71_2, and 71_3 and reverse direction scheduling buffers 72_1, 72_2, and 72_3 indicates the validity.

Below, an example of the operation of the data processing system 1a shown in FIG. 31 will be explained. FIG. 34 to FIG. 37 are flow charts for explaining an example of the operation of the data processing system 1a shown in FIG. 31.

Step ST51:

The CPU 20 of the computer 2 judges if an operation signal indicating an operation for designation of a reproduction point in the reproduced data ENC has been input from the operation device 19. It proceeds to step ST52 when judging it has been designated, while repeats the processing of step ST51 when judging it has not.

Step ST52:

The CPU 20 of the computer 2 reads from the HDD 12 the GOP including the picture data of the reproduction point designated at step ST51 and the surrounding GOPs or a total of three (plurality of) GOPs.

Step ST53:

The CPU 20 of the computer 2 outputs the plurality of GOPs read at step ST52 through the bridge 18 and PCI bus 6 to the reproduction apparatus 4a. The CPU 42 of the reproduction apparatus 4a writes the GOPs input from the computer 2 through the PCI bridge 30 into the input memory 32.

Step ST54:

The CPU 20 of the computer 2 outputs a transfer completion notification to the CPU 42a of the reproduction apparatus 4a. This transfer completion notification shows the identification data of the GOPs output (transferred) at step ST53 from the computer 2 to the reproduction apparatus 4a, the addresses in the input memory 32 where the GOPs are written, and the sizes of the data of the GOPs. Further, the transfer completion notification shows the identification data of each picture data in the output GOP, the address in the input memory 32 where the picture data has been written, and the size of the picture data. The CPU 42a writes the transfer completion notification into the control memory 40.

Step ST55:

The CPU 42a of the reproduction apparatus 4a, after finishing the processing of step ST54, outputs a preparation completion notification to the CPU 20 of the computer 2.

Step ST56:

The CPU 20 of the computer 2 judges whether or not an operation signal indicating a reproduction start command operation designating a reproduction point has been input from the operation device 19. It proceeds to step ST57 when judging it has been input, while repeats the processing of step ST66 when judging it has not.

Step ST57:

When judging it has input, the CPU 20 of the computer 2 outputs a reproduction start command designating the reproduction point to the CPU 42a of the reproduction apparatus 4a.

Step ST58:

The CPU 42a of the reproduction apparatus 4a newly schedules the decode order of 1 GOP's worth of the picture data, and writes the picture property data PP of the picture data into the forward direction scheduling buffers 71_1, 71_2, and 71_3 and reverse direction scheduling buffers 72_1, 72_2, and 72_3 shown in FIG. 32 in the scheduled order. Then, as shown in FIG. 38, all of the validity flag data "valid" of the picture property data PP stored in the scheduling buffer on the reproduction direction (in the case of FIG. 38, forward direction) side (in the case of FIG. 38, the forward direction scheduling buffers 71_1, 71_2, and 71_3) are set valid.

Step ST59:

The CPU 42a of the reproduction apparatus 4a sets as invalid all of the validity flag data "valid" of the picture property data PP stored in the scheduling buffer (in the case of FIG. 38, the reverse direction scheduling buffers 72_1, 72_2, and 72_3) at the side of a direction reverse to the reproduction direction (in the case of FIG. 38, the reverse direction).

Step ST60:

The CPU 42a of the reproduction apparatus 4a judges whether or not the designated reproduction rate is 1× speed or more. If judging it is 1× speed or more, it proceeds to step ST61, while if not, it proceeds to step ST63.

Step ST61:

The CPU 42a of the reproduction apparatus 4a sets as invalid part of the validity flag data "valid" of the picture property data PP stored in the scheduling buffer (in the case shown in FIG. 38, FIG. 41, and FIG. 44, the forward direction scheduling buffers 71_1, 71_2, and 71_3) at the side of the reproduction direction (in the case of FIG. 38, FIG. 41, and FIG. 44, the forward direction) based on the designated reproduction rate in accordance with need (where a speed change command is issued etc.). For example, when 2× speed reproduction is designated, as shown in FIG. 41, it sets as invalid every other validity flag data "valid" of the picture property data stored in the forward direction scheduling buffer 71. Further, when 3× speed reproduction is designated, as shown in FIG. 44, it sets as invalid the validity flag data "valid" of the picture property data every other two data stored in the forward direction scheduling buffer 71.

Step ST62:

The CPU 42a of the reproduction apparatus 4a determines the reproduction (decode) start time for the picture property data with validity flag data "valid" indicating validity among the picture property data PP stored in the reproduction direction scheduling buffers and sets this as the reproduction start time "time" of the picture property data PP. The CPU 42a updates the time_base based on the following equation (1) for each GOP. The CPU 42a determines the reproduction start time "time" based on the "time_base".

$$\text{time\_base} = \text{time\_base} + (\text{number of picture property data PP with validity flag data "valid" stored in scheduling buffer indicating valid}) - (\text{deviation from cyclic GOP structure}) + (\text{number of pictures increasing/decreasing by rescheduling}) \quad (1)$$

Further, the CPU 42a determines the time_base based on the following equation (2) when handling a transient and change in reproduction rate.

$$\text{time\_base} = (\text{time of picture data reproduced immediately previously}) + (\text{number of picture property data PP with validity flag data "valid" in scheduling buffer indicating valid}) + 1 - (\text{deviation from cyclic GOP structure}) \quad (2)$$

Step ST63:

The CPU 42a of the reproduction apparatus 4a; in accordance with need (when there is a speed change command etc.), makes valid the validity flag data "valid" of the picture property data of all picture data after the picture data reproduced immediately previously in the picture property data PP stored in the scheduling buffer at the side of the reproduction direction (in the case shown in FIG. 38, FIG. 41, and FIG. 44, the forward direction) (in the case shown in FIG. 38, FIG. 41 and FIG. 44, the forward direction scheduling buffers 71_1, 71_2, 71_3) based on the designated reproduction rate.

Step ST64:

The CPU 42a of the reproduction apparatus 4a calculates the next update timing of the picture data being displayed at the time of reproduction of less than 1× speed (slow motion reproduction)

Step ST65:

When the CPU 42a of the reproduction apparatus 4a judges that the timing indicated by a not shown timer provided at the reproduction apparatus 4a has reached the update timing calculated at step ST64, it proceeds to step ST66, while when it does not, proceeds to step ST76.

Step ST66:

The CPU 42a of the reproduction apparatus 4a reads the picture property data PP stored in the scheduling buffer in the reproduction direction (in the case shown in FIG. 38, FIG. 41, and FIG. 44, the forward direction scheduling buffers 71_1, 71_2, and 71_3) in the FiFO scheme (the case of the forward direction reproduction), and, under the condition that the read validity flag data "valid" of the picture property data PP indicates valid, outputs the decode command of the picture data corresponding to that to the decoders 34_1 to 34_3. On the other hand, the CPU 42a, in the case of the reverse direction reproduction, reads the picture property data PP stored in the reverse direction scheduling buffers 72_1, 72_2, and 72_3 in the order from the latest writing and, under the condition that the read validity flag data "valid" of the picture property data PP indicates valid, outputs the decode command of the picture data corresponding to that to the decoders 34_1 to 34_3. Note that, since decoding results of the I and P picture data to be reproduced and output next are already stored in the reproduction memories 36_1 to 36_3 during a time for processing several picture data right after the transient command, the CPU 42a does not output the decode command for the I and P picture data, but outputs only the display command of step ST69. Note that, the CPU 42a, for the B picture data, outputs the decode command in only the case the decoding results are not stored in the reproduction memories 36_1 to 36_3.

Step ST67:

The decoders 34_1 and 34_2, and 34_3 read the picture data indicated by the decode command input at step ST66 from the input memory 32 and decode and write the decoding results to the reproduction memories 36_1 to 36_3.

Step ST68:

The CPU 42a of the reproduction apparatus 4a identifies decoding results to be reproduced and output next based on the designated reproduction direction and the scheduling results, generates a display command showing the decoding results and a switch command of the selector 38 for performing the desired reproduction and output, and writes this into the control memory 40.

Step ST69:

The CPU 42a of the reproduction apparatus 4a outputs the display command generated at step ST68 to the decoders 34_1, 34_2, and 34_3 and outputs the switch command to the selector 38.

Step ST70:

The decoders 34_1, 34_2, and 34_3 read the decoding results indicated by the input display command from the reproduction memories 36_1 to 36_3 and output them to the selector 38. Further, the selector 38 selects the decoding results input from the decoders 34_1, 34_2, and 34_3 by switching based on the switch command input at step ST12 and reproduces and outputs them.

Step ST71:

The CPU 42a of the reproduction apparatus 4a judges whether or not the picture property data PP has been stored in the temporary buffers 73_1 to 73_3 of the scheduling buffers 45_1 to 45_3 in reproduction. It proceeds to step ST72 when judging it has been stored, while if otherwise, proceeds to step ST74.

Step ST72:

The CPU 42a of the reproduction apparatus 4a retrieves the storage position in the scheduling buffer (in the case of FIG. 39, FIG. 40, FIG. 42, FIG. 43, FIG. 45, and FIG. 46, reverse direction scheduling buffers 72_1, 72_2, and 72_3) on the side reverse to the reproduction direction corresponding to the picture property data PP stored in the temporary buffers 73_1 to 73_3 of the scheduling buffers 45_1 to 45_3 in reproduction.

Step ST73:

The CPU 42a of the reproduction apparatus 4a sets as valid the validity flag data "valid" of the picture property data PP stored at the storage position in the scheduling buffer (in the case of FIG. 39, FIG. 40, FIG. 42, FIG. 43, FIG. 45, and FIG. 46, the reverse direction scheduling buffers 72_1, 72_2, and 72_3) on the side reverse to the reproduction direction.

Step ST74:

The CPU 42a of the reproduction apparatus 4a reads the picture property data of the picture data finishing being reproduced from the scheduling buffer in the reproduction direction (in the case of FIG. 39, FIG. 40, FIG. 42, FIG. 43, FIG. 45, and FIG. 46, the forward direction scheduling buffers 71_1, 71_2, and 71_3) and writes it into the temporary buffers 73_1 to 73_3. In the case of FIG. 39, it writes the picture property data PP of picture data P5 stored in the forward direction scheduling buffer 71_3 into the temporary buffer 73_1.

Step ST75:

The CPU 42a of the reproduction apparatus 4a sets as invalid the validity flag data "valid" of the picture property data PP of the reproduced picture data in the scheduling buffer in the reproduction direction (in the case of FIG. 39, FIG. 40, FIG. 42, FIG. 43, FIG. 45, and FIG. 46, the forward direction scheduling buffers 71_1, 71_2, and 71_3). In the case of FIG. 39, it sets as invalid the validity flag data "valid" of the picture property data PP of the picture data P5 stored in the forward direction scheduling buffer 71_3.

Step ST76:

The CPU 20 and CPU 42a judges whether or not the above processed picture data is the last picture data in the GOP, proceed to step ST77 when judging it as the last picture data, while if otherwise, proceeds to step ST83 and performs the processing for the next picture data.

Step ST77:

The CPU 20 and CPU 42a judge whether or not the GOP to which the processed picture data belongs is the last GOP in the reproduced data EN. When judging that it is the last GOP, they end the processing, while if otherwise, they proceed to step ST78.

Step ST78:

The CPU 20 of the computer 2 reads a next GOP from the HDD 12 in accordance with the reproduction direction.

Step ST79:

The CPU 20 of the computer 2 outputs the GOP read at step ST78 via the bridge 18 and PCI bus 6 to the reproduction apparatus 4a. The CPU 42a of the reproduction apparatus 4a writes the GOP input from the computer 2 through the PCI bridge 30 into the input memory 32.

Step ST80:

The CPU 20 of the computer 2 outputs the transfer completion notification of the GOP to the CPU 42a of the reproduction apparatus 4a. The CPU 42a writes the transfer completion notification into the control memory 40.

Step ST81:

The CPU 42a of the reproduction apparatus 4a outputs a preparation completion notification to the CPU 20 of the computer 2.

Step ST82:

The CPU 42a of the reproduction apparatus 4a, for example, judges whether or not the scheduling of the GOP including the picture data of the reproduction point next in accordance with the reproduction direction has been finished (that is, whether or not the scheduling is required). When judging that the scheduling is not finished, it proceeds to step ST58, while if otherwise, it proceeds to step ST83.

Step ST83:

The CPU 42a of the reproduction apparatus 4a judges if a transient command has been input. If it has, it proceeds to step ST84, while if otherwise, it proceeds to step ST60.

Step ST84:

The CPU 42a of the reproduction apparatus 4a identifies the picture data at which a transient occurred based on the immediately previous display information held in the memory 40.

Step ST85:

The CPU 42a of the reproduction apparatus 4a switches the reproduction direction. Due to this, the CPU 42a switches the scheduling buffers used for scheduling between the forward direction scheduling buffers 71_1, 71_2, and 71_3 and the reverse direction scheduling buffers 72_1, 72_2, and 72_3.

[Modifications]

Figure 48:
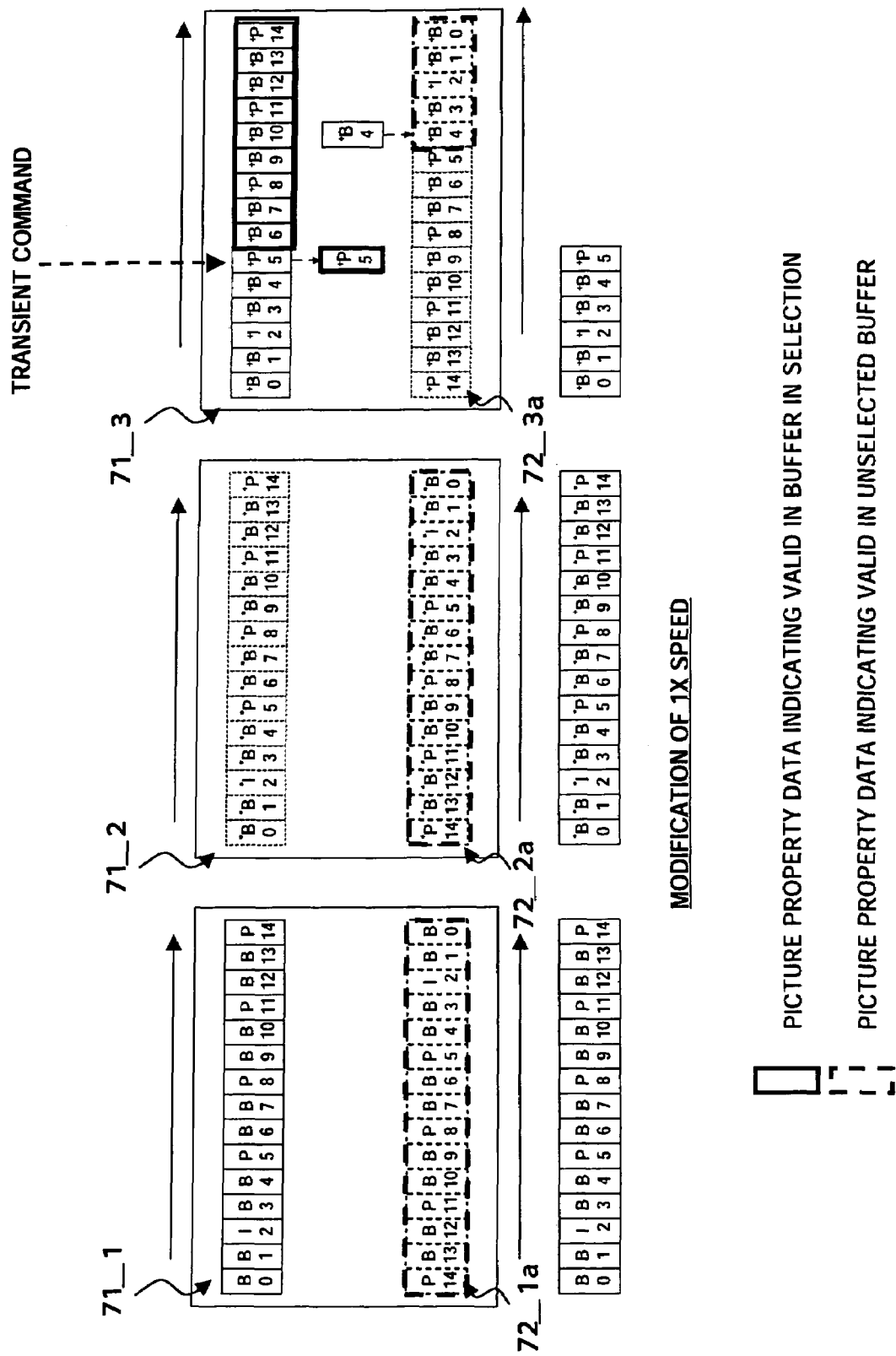
FIG. 48 is a view following FIG. 47 for explaining another method of use of a scheduling buffer in the case where a transient command occurs while the reproduction apparatus shown in FIG. 31 is engaged in 1× speed reproduction in the forward direction.
Figure 49:
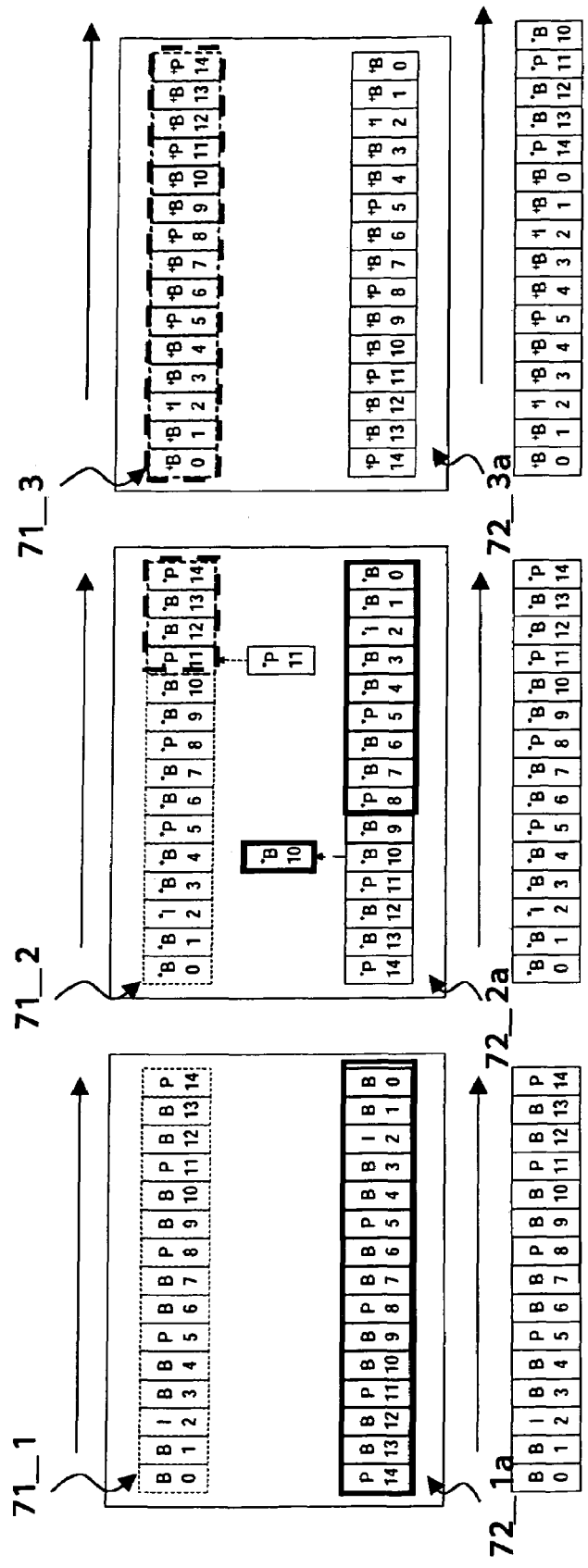
FIG. 49 is a view following FIG. 48 for explaining another method of use of a scheduling buffer in the case where a transient command occurs while the reproduction apparatus shown in FIG. 31 is engaged in 1× speed reproduction in the forward direction.

As explained above, in the technique shown in FIG. 47 to FIG. 49, the case where buffers able to read data in only one direction are used as reverse direction scheduling buffers 72_1a, 72_2a, and 72_3a will be explained. In this case, as shown in FIG. 47, the reverse direction scheduling buffers 72_1a, 72_2a, and 72_3a are made to store the picture property data PP in the reverse reproduction direction in advance. That is, the CPU 42a receives as input the picture property data PP in the order of the forward reproduction direction and writes this in order into the forward direction scheduling buffers 71_1, 71_2, and 71_3. On the other hand, the CPU 42a rearranges the picture property data PP input in the order of the forward reproduction direction, then writes it in order into the reverse direction scheduling buffers 72_1a, 72_2a, and 72_3a in the order of the reverse direction reproduction. Then, the read operation of the picture property data PP from the reverse direction scheduling buffers 72_1a, 72_2a, and 72_3a is started from the left side in the figure as shown in FIG. 47 to FIG. 49 in the same way as the forward direction scheduling buffers 71_1, 71_2, and 71_3.

As explained above, according to the data processing system 1a, in the same way as the data processing system 1 of the first embodiment, in the reproduction apparatus 4a, the decoding circuits 34_1 to 34_3 hold the storage of the decoding results in the reproduction memories 36_1 to 36_3 even after the decoding results stored in the reproduction memories 36_1 to 36_3 are no longer used where the reproduction is continued in the designated reproduction direction. When receiving as input the transient command, it performs the decoding and the reproduction and output by using the decoding results already stored in the reproduction memories 36_1 to 36_3 before the input of the transient command. That is, by utilizing the decoding results stored in the reproduction memories 36_1 to 36_3 without clearing right after the generation of the transient command, the reproduction and output after reverse can be carried out from immediately after the generation of the transient command without the retransfer of the picture data (GOP) from the computer 2 to the reproduction apparatus 4a. Due to this, a smooth transient operation with a short time lag becomes possible.

Further, in the reproduction apparatus 4a of the data processing system 1a, as explained above, regardless of the reproduction direction and reproduction rate, the storage of the picture property data PP is held in the forward direction scheduling buffers 71_1, 71_2, and 71_3 and reverse direction scheduling buffers 72_1, 72_2, and 72_3, and the decoding scheduling of the picture data is carried out in accordance with the setting of the validity flag data "valid" of the picture property data. Due to this, when a command for change of the reproduction direction or the reproduction rate is issued, the reproduction apparatus 4a switches the scheduling buffers used between the forward direction scheduling buffers 71_1, 71_2, and 71_3 and the reverse direction scheduling buffers 72_1, 72_2, and 72_3 and rewrites the setting of the validity flag data "valid", whereby it can handle the command in a short time. Such an effect is particularly conspicuous when the number of picture data as the scheduling target is large, for example, a long GOP is employed.

The present invention is not limited to the above embodiments. That is, a person skilled in the art may make various changes to, form combinations or subcombinations of, or replace components of the embodiments within the technical scope of the present invention and the scope of their equivalents. In the above embodiments, further, as the plurality of picture data, MPEG picture data was illustrated, but the present invention may also be applied to audio picture data so long as it is decoded in order.

Further, in the above embodiments, the case using a plurality of decoders was exemplified, but the present invention can be applied to also the case using a single decoder. Further, in the above embodiments, the MPEG was exemplified as the encoding scheme, but the present invention can be applied in the same way to also the case where the data comprised of first type of picture data having decoding results referred to by the decoding of the other picture data and second type of picture data having decoding results not referred by the decoding of the other picture data as components as in H. 264/AVC (Advanced Video Coding). Further, the above embodiments may generate the results of scheduling of all picture data in the GOP in the decoding scheduling and the property data (flag data) defining to which of valid and invalid is it set in accordance with the reproduction rate in all picture data for each picture data and update the property data in accordance with the reproduction rate designated at that time in the decoding and reproduction of the picture data. Then, in the decoding and reproduction of the picture data, the decoding and reproduction and output of the picture data are carried out based on the updated property data.

In the above embodiments, the case where compressed picture data was stored in the HDD 12 was explained, but the present invention is not limited to this, for example, can also be applied to storage through an input/output interface etc. on an optical disk, magneto-optic disk, semiconductor memory, magnetic disk, or other various storage media. Further, the mode of connection is not limited to connection through cables etc. For example, connection by other types of connection modes such as connection by wires or wirelessly from the outside is also possible.

Further, in the above embodiments, the case of performing a series of processing by hardware having those functions was explained, but the present invention is not limited to this. Use of software for this is also possible. At this time, when performing a series of processing by software, various types of functions may be realized by installing various programs into the computer in which the program forming that software is built into to dedicated hardware. For example, it is installed in a general use personal computer etc. from for example a storage medium. Further, the storage medium for example includes an optical disk, magneto-optic disk, semiconductor memory, magnetic disk or other various storage media needless to say. Further, for example, it is also possible to install various types of programs in a general personal computer etc. for example by downloading them through the Internet or other networks.

Further, in the above embodiments, the steps describing the program stored in the storage medium may of course be performed in time sequence along the described order of course, but the invention is not limited in time sequence. Performance in parallel or individually is also included.

Further, in the above embodiments, the reproduction rate is not particularly limited. The invention may be broadly applied to specific processing of the reproduction apparatus at any variable speed reproduction operations.

Further, the block configurations of the embodiments are examples of the block configurations. The invention is not limited to the illustrated examples.

Further, by suitably providing a group of read flags indicating if the data read from the HDD 12 is valid for the compressed and encoded data stored in the HDD 12, a group of decode flags indicating validity at the time of scheduling of decoding, a group of display flags indicating validity at scheduling for display of the decoded data, etc. as metadata and automatically updating the series of flag groups in accordance with reproduction speed and direction, scheduling can be managed. At this time, the past series of scheduling used in variable speed reproduction processing and update information of the groups of flags may be managed as separate scheduling metadata (history information). This may in accordance with need be described as syntax in the compressed and encoded data or separately stored in a storage medium such as the HDD 12.

Further, the number of the decoders, the number of the banks, the decoder IDs, etc. may also be managed as metadata (component history information). Further, the reproduction speed, reproduction direction, etc. may also be managed as metadata (reproduction history information). At this time, the metadata may if necessary be described as syntax in the compressed and encoded data or separately stored in a storage medium such as the HDD 12. By referring to such metadata (history information), it is possible to reuse scheduling performed in the past and further to perform scheduling faster and more accurately. Note that this metadata may also be comprised so as to be managed at an outside apparatus as for example a database.

Note that, in the above embodiments, the present invention can also be applied to a case when the decoders 34_1 to 34_3 do not completely decode the compressed and encoded data stored on the HDD 12 (decode it up the middle). Specifically, for example, the present invention may also be applied to a case where the decoders 34_1 to 34_3 only perform decoding for variable length encoding and inverse quantization and do not perform inverse DCT, a case where they perform inverse quantization, but do not perform decoding for variable length encoding, etc. In such a case, for example, the decoders 34_1 to 34_3 may generate history information indicating for example up to what stage of encoding and decoding (for example, stage of inverse quantization) they performed processing for and output this linked with the incompletely decoded data.

Further, in the above embodiments, the HDD 12 stored incompletely encoded data (for example, data for which DCT and quantization were performed, but for which variable length encoding was not performed) and, in accordance with need, history information of the encoding and decoding, but the present invention may also be applied to the case where the decoders 34_1 to 34_3 can decode incompletely encoded data supplied under the control of the CPU 20 and convert it to a baseband signal. Specifically, the present invention can also be applied to the case where the decoders 34_1 to 34_3 for example perform inverse DCT and inverse quantization for data to which DCT and quantization have been applied, but variable length encoding has not been applied and do not perform decoding for variable length encoding. Further, in such a case, for example, the CPU 20 may obtain the history information of encoding and decoding stored in the HDD 12 linked with the incompletely encoded data and schedule the decoding by the decoders 34_1 to 34_3 based on that information.

Further, in the above embodiments, the HDD 12 stored the incompletely encoded data and, in accordance with need, history information of encoding and decoding, but the present invention may also be applied to the case where the decoders 34_1 to 34_3 do not completely decode the incompletely encoded data supplied under the control of the CPU 20 (decode it only to an intermediate stage). Further, in such a case as well, for example, the CPU 20 may obtain the history data of encoding and decoding stored in the HDD 12 linked with the incompletely encoded data and schedule the decoding by the decoders 34_1 to 34_3 based on this information. Further, in this case as well, the decoders 34_1 to 34_3 may generate history information of encoding and decoding in accordance with need and output it linked with the incompletely decoded data. In other words, the present invention may also be applied to the case where the decoders 34_1 to 34_3 perform partial decoding under the control of the CPU 20 (execute part of the steps of the decoding). The CPU 20 may obtain the history information of the encoding and decoding stored in the HDD 12 linked with the incompletely encoded data and schedule the decoding by the decoders 34_1 to 34_3 based on the information. The decoders 34_1 to 34_3 may also generate history information of encoding and decoding in accordance with need and output it linked with the incompletely encoded data.

Further, the HDD 12 may further store information on the history of encoding and decoding processing linked with the compressed and encoded stream data, and the CPU 20 may schedule the decoding of the compressed and encoded stream data based on the information on the history of the encoding processing and the decoding processing. Further, even when the decoder 34_1 to 34_3 can decode the compressed and encoded stream data and convert it to a baseband signal under the control of the CPU 20, it is possible to generate the information on the history of encoding and decoding in accordance with need and enable it to be output linked with the baseband signal.

Note that in the above embodiments, the reproduction apparatus 4 was explained as having a plurality of decoders, but the present invention can also be applied to the case of a single decoder. At this time, the single decoder may not only receive, decode, and display or output the compressed and encoded data, but may also, in the same way as explained above, receive the compressed and encoded data, partially decode it up to an intermediate stage, and output it to the outside along with history information of encoding and decoding, receive partially encoded data, decode it, and convert it to a baseband signal for output to the outside, or receive partially encoded data, partially decode it to an intermediate stage, and output it to the outside along with history information of the encoding and decoding.

Further, in the above embodiments, the CPU 20 and CPUs 42 and 42*a* were configured separately, but the invention is not limited to this. For example, the CPU 20 and CPUs 42 and 42*a* may also conceivably be configured by a single CPU controlling the reproduction apparatus 4 as a whole. Further, even when the CPU 20 and CPUs 42 and 42*a* are configured independently, the CPU 20 and CPUs 42 and 42*a* may also be formed on a single chip.

Further, when the CPU 20 and CPUs 42 and 42*a* are configured independently, it is possible to make at least part of the processing performed by the CPU 20 in the above embodiments be performed for example by time division by the CPUs 42 and 42*a* or to make at least part of the processing performed by the CPUs 42 and 42*a* be performed by for example time division by the CPU 20. That is, the CPU 20 and CPUs 42 and 42*a* may also be realized using processors able to perform dispersed processing.

Further, for example, the reproduction apparatus 4 may be configured to be able to be connected to a network and, in the above embodiments, at least part of the processing performed by the CPU 20 or CPUs 42 and 42*a* may be performed at the CPU of another apparatus connected through the network. Similarly, in the above embodiments, the memories 32, 40, etc. were configured separately, but the invention is not limited to this. These memories may conceivably also be configured by a single memory in the reproduction apparatuses 4 and 4*a*.

Further, in the above embodiments, the case of the HDD 12, the decoders 34_1 to 34_3, and the selector 38 being connected via bridges and buses and made integral as a reproduction apparatus was explained, but the present invention is not limited to this. For example, the invention may also be applied to the case where part of these components are connected by wires or wirelessly from the outside and the case where these components are connected to each other in other various modes of connection.

Further, in the above embodiments, the case of the compressed stream data being stored in an HDD was explained, but the present invention is not limited to this. For example, the invention may also be applied to the case of reproducing and processing stream data stored on an optical disk, magneto-optic disk, semiconductor memory, magnetic disk, or other various storage media.

Further, in the above embodiments, the CPUs 42 and 42*a*, memory 32, memory 40, decoders 34_1 to 34_3, and the selector 38 were mounted on the same expansion card (for example, PCI card or PCI-Express card), but the invention is not limited to this. For example, PCI-Express or other technology may be used to mount these components on separate expansion cards when the speed of transfer between cards is high.

Further, in this specification, a "system" means a logical collection of a plurality of apparatuses. It does not matter if the apparatuses of the different configurations are in the same housing or not.

The present invention may be applied to a system for reproducing reproduced data.

It should be understood by those skilled in the art that various modifications, combinations, sub-combinations, and alterations may occur depending on design requirements and other factors insofar as they are within the scope of the appended claims or the equivalents thereof.

We claim:

1. A reproduction apparatus for successively decoding and reproducing a plurality of picture data, comprising:

a receiver for receiving a reversal command; and a decoder for successively decoding said plurality of picture data in an order in accordance with a designated reproduction direction, writing the decoding results in a reproduction memory, and reproducing and outputting said decoding results read from said reproduction memory, wherein said decoder holds the storage of said decoding results in said reproduction memory even after said decoding results stored in said reproduction memory are no longer used when continuing reproduction in said designated reproduction direction and, when said receiver receives the reversal command of said reproduction direction, performs said reproduction and output using said decoding results stored in said reproduction memory before the receipt of said reversal command, said reproduction apparatus defines picture property data indicating whether to decode said picture data for each of said picture data, and said decoder determines whether to decode said picture data corresponding to said picture property based on said picture property data.

2. The reproduction apparatus as set forth in claim 1, wherein said decoder decodes reproduced data, comprised of a first picture data where the results of decoding are referred to in decoding of other picture data and a second picture data where the decoding results are not referred to in decoding of other picture data, in units of said picture data, holds the storage of said decoding results of said first picture data in said reproduction memory, and when said reversal command is received, decodes and reproduces and outputs said second picture data while referring to decoding results of said first picture data already stored in said reproduction memory before receipt of said reversal command.

3. The reproduction apparatus as set forth in claim 2, wherein said decoder decodes said first picture data in said plurality of picture data forming said reproduced data before said second picture data decoded referring to the decoding results of said first picture data.

4. The reproduction apparatus as set forth in claim 2, wherein said apparatus has as said first picture data I picture data decoded without referring to the decoding results of other picture data and P picture data decoded referring to the decoding results of other picture data, said second picture data is B picture data decoded referring to the decoding results of other picture data, and said decoder simultaneously stores and holds in a first storage region of said reproduction memory decoding results of said P picture data and decoding results of said first I picture data positioned between first I picture data with decoding results stored in said memory and second I picture data positioned next in said reproduction direction with respect to said first I picture data in the plurality of said I picture data.

5. The reproduction apparatus as set forth in claim 4, wherein said reproduction memory has a second storage region, separate from said first storage region, for storing said B picture data, and said decoder writes decoding results of said reproduced and output B picture data over decoding results of other B picture data in order until finishing decoding all B picture data positioned between said first I picture data and said second I picture data.

6. The reproduction apparatus as set forth in claim 2, further comprising:

a plurality of said decoders for processing said reproduced data in parallel, a plurality of said reproduction memories provided corresponding to said plurality of decoders, and a processing circuit for making said decoders decode said picture data so that said second picture data referring to the decoding results of a same first picture data are decoded by a same decoder and said first picture data included in said group of picture data are decoded by the same decoder.

7. The reproduction apparatus as set forth in claim 6, wherein said processing circuit makes said plurality of decoders decode pluralities of groups of picture data each comprised of a plurality of picture data consecutively reproduced and output by different decoding circuits.

8. The reproduction apparatus as set forth in claim 7, wherein said decoders write decoding results of said first picture data of a first group of picture data over decoding results of said first picture data of a second group of picture data decoded by said decoders right before said first group of picture data stored in said reproduction memory.

9. The reproduction apparatus as set forth in claim 1, said reproduction apparatus further comprising:
a control storage means for storing said picture property data of said plurality of picture data.

10. The reproduction apparatus as set forth in claim 9, wherein said decoder updates said picture property data stored in said control storage means in accordance with a designated reproduction rate.

11. The reproduction apparatus as set forth in claim 9, further comprising;
a first control storage means enabling said picture property data of said picture data to be read out in the order of decoding said plurality of picture data in a forward direction; and
a second control storage means enabling said picture property data of said picture data to be read out in the order of decoding said plurality of picture data in a reverse direction, wherein
said decoder
determines whether to decode said picture data corresponding to said picture property data based on said picture property data read from said first control storage means when decoding said picture data in the forward direction, and
determines whether to decode said picture data corresponding to said picture property data based on said picture property data read from said second control storage means when decoding said picture data in the reverse direction.

12. The reproduction apparatus as set forth in claim 11, wherein said decoder
sets said picture property data stored in said first control storage means of said picture data finished being decoded to no decoding and sets said picture property data stored in said second control storage means of said picture data finished being decoded to decoding when decoding said picture data in the forward direction, and
sets said picture property data stored in said second control storage means of said picture data finished being decoded to no decoding and sets said picture property data stored in said first control storage means of said picture data finished being decoded to decoding when decoding said picture data in the reverse direction.

13. The reproduction apparatus as set forth in claim 12, wherein said decoder
finishes said decoding, then sets said picture property data stored in said second control storage means of said picture data finished being decoded to decoding when decoding said picture data in the forward direction, and
finishes decoding, then sets said picture property data stored in said first control storage means of said picture data finished being decoded to decoding when decoding said picture data in the reverse direction.

14. A data processing system comprising:
a data processing apparatus for outputting a plurality of picture data forming reproduced data to a reproduction apparatus; and
a reproduction apparatus for successively and reproducing the plurality of picture data input from said data processing apparatus,
said reproduction apparatus including,
a reproduction memory, and
a decoder for successively decoding said plurality of picture data in order by an order according to a designated reproduction direction, writing the decoding results in said reproduction memory, and reproducing and outputting said decoding results read from said reproduction memory, wherein
said decoder holds the storage of said decoding results in said reproduction memory even after said decoding results stored in said reproduction memory are no longer used when continuing reproduction in said designated reproduction direction and, when receiving as input a reversal command of said reproduction direction, performs said reproduction and output using said decoding results stored in said reproduction memory before the input of said reversal command.

15. A reproduction method successively decoding a plurality of picture data with a reproduction apparatus, the reproduction method comprising:
successively decoding, at the reproduction apparatus, said plurality of picture data in an order in accordance with a designated reproduction direction and writing the decoding results in a reproduction memory;
reading, reproducing, and outputting said decoding results written in said reproduction memory;
causing said reproduction memory to hold the storage of said decoding results even after said decoding results stored in said reproduction memory are no longer used when continuing reproduction in said designated reproduction direction; and
performing reproduction and output using said decoding results already stored in said reproduction memory before input of said reversal command when receiving as input said reversal command of said reproduction direction.

16. The reproduction method as set forth in claim 15, further comprising:
determining whether to decode said picture data based on picture property data showing whether to decode said picture data for each picture data.

17. A computer readable storage medium encoded with instructions, which when executed by a reproduction apparatus causes the reproduction apparatus to implement a method of successively decoding a plurality of picture data, said method comprising:
successively decoding, at the reproduction apparatus, said plurality of picture data in an order in accordance with a designated reproduction direction and writing the decoding results in a reproduction memory;
reading, reproducing, and outputting said decoding results written in said reproduction memory;
causing said reproduction memory to hold the storage of said decoding results even after said decoding results stored in said reproduction memory are no longer used when continuing reproduction in said designated reproduction direction; and
performing reproduction an output using said decoding results already stored in said reproduction memory before input of a reversal command for reproduction and output when receiving as input said reversal command of said reproduction direction.

18. A data processing apparatus comprising:
a data processing means for outputting a plurality of picture data forming reproduced data to a reproduction apparatus; and
a reproducing means for successively decoding and reproducing said plurality of picture data input from said data processing means,
said reproducing means including,
a reproduction memory, and
a decoder for successively decoding said plurality of picture data in order by an order according to a designated reproduction direction, writing the decoding results in said reproduction memory, and reproducing and outputting said decoding results read from said reproduction memory, wherein
said decoder holds the storage of said decoding results in said reproduction memory even after said decoding results stored in said reproduction memory are no longer used when continuing reproduction in said designated reproduction direction and, when receiving as input a reversal command of said reproduction direction, performs said reproduction and output using said decoding results stored in said reproduction memory before the input of said reversal command.

\* \* \* \* \*